United States Patent

Ishikawa et al.

[11] Patent Number: 5,818,970
[45] Date of Patent: Oct. 6, 1998

[54] IMAGE ENCODING APPARATUS

[75] Inventors: Hisashi Ishikawa, Washimiya-machi; Hidekazu Tominaga, Kawasaki; Tadayoshi Nakayama; Koichi Honma, both of Tokyo; Nobutaka Miyake; Yuji Konno, both of Yokohama, all of Japan

[73] Assignee: Canon Kabushiki Kaisha, Tokyo, Japan

[21] Appl. No.: 872,988

[22] Filed: Apr. 24, 1992

[30] Foreign Application Priority Data

| Apr. 26, 1991 | [JP] | Japan | 3-096681 |
| Apr. 26, 1991 | [JP] | Japan | 3-096682 |
| Apr. 26, 1991 | [JP] | Japan | 3-096683 |
| Apr. 26, 1991 | [JP] | Japan | 3-096685 |
| Apr. 26, 1991 | [JP] | Japan | 3-096686 |
| Apr. 26, 1991 | [JP] | Japan | 3-096692 |
| Aug. 13, 1991 | [JP] | Japan | 3-202692 |

[51] Int. Cl.$^6$ .................................................. G06K 9/46
[52] U.S. Cl. ............................ 382/248; 348/397; 348/438
[58] Field of Search .............................. 382/16–18, 22, 382/56, 17, 168, 172, 248, 264; 358/75, 80, 262.1, 426, 432, 433, 539, 438; 348/397, 399, 438

[56] References Cited

U.S. PATENT DOCUMENTS

| 4,723,129 | 2/1988 | Endo et al. | 346/1.1 |
| 4,805,030 | 2/1989 | Tanaka | 382/248 |
| 4,825,285 | 4/1989 | Speidel et al. | 382/248 |
| 4,903,124 | 2/1990 | Hoshi et al. | 358/133 |
| 4,941,185 | 7/1990 | Reed | 382/280 |
| 5,016,100 | 5/1991 | Citta et al. | 348/397 |
| 5,038,389 | 8/1991 | Mizuro | 382/56 |
| 5,045,938 | 9/1991 | Sugiyama | 358/133 |
| 5,065,444 | 11/1991 | Garber | 382/172 |
| 5,089,884 | 2/1992 | Suzuki et al. | 358/80 |
| 5,113,457 | 5/1992 | Enomoto et al. | 382/56 |
| 5,148,501 | 9/1992 | Enomoto et al. | 382/56 |

Primary Examiner—Christopher S. Kelley
Attorney, Agent, or Firm—Fitzpatrick, Cella, Harper & Scinto

[57] ABSTRACT

An image encoding apparatus of this invention extracts a character/line image from a multi-value image, and substitutes image information corresponding to the extracted character/line image with substitution data based on the image information. Thereafter, the apparatus encodes the image information corresponding to the character/line image, and the remaining image information by different methods, thereby performing efficient image encoding while preserving quality of a character/line image in a multi-value image.

6 Claims, 48 Drawing Sheets

| 65 | 240 | 240 | 240 |
|----|-----|-----|-----|
| 68 | 240 | 240 | 64  |
| 66 | 240 | 65  | 66  |
| 64 | 66  | 68  | 67  |

FIG. 3A

| 0 | 1 | 1 | 1 |
|---|---|---|---|
| 0 | 1 | 1 | 0 |
| 0 | 1 | 0 | 0 |
| 0 | 0 | 0 | 0 |

FIG. 3B

| 65 | 66 | 66 | 66 |
|----|----|----|----|
| 68 | 66 | 66 | 64 |
| 66 | 66 | 65 | 66 |
| 64 | 66 | 68 | 67 |

F I G. 4

| 65 | 65 | 65 | 65 |
|----|----|----|----|
| 68 | 68 | 68 | 64 |
| 66 | 66 | 65 | 66 |
| 64 | 66 | 68 | 67 |

FIG. 6

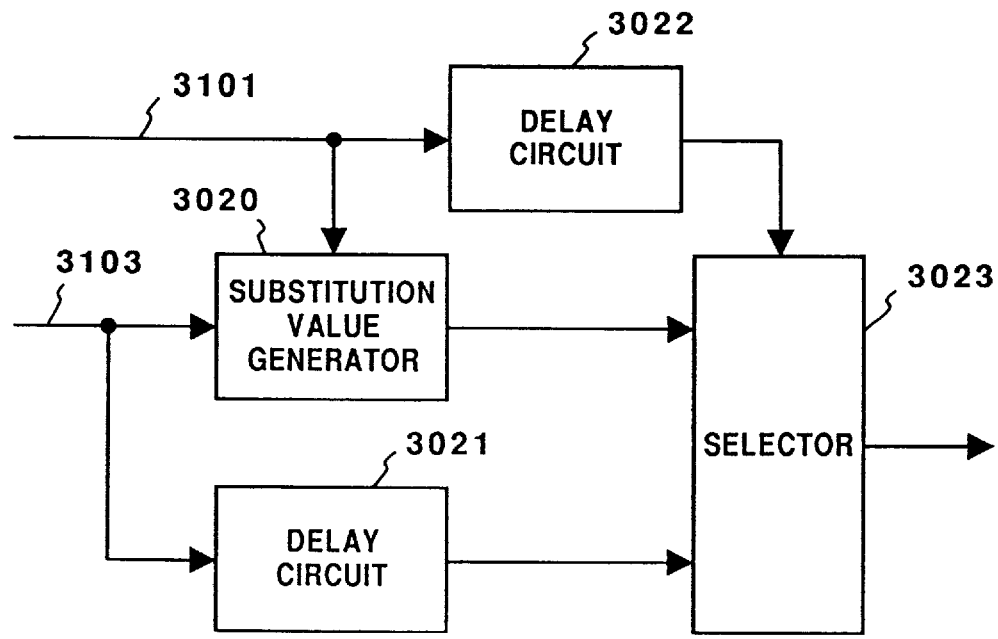
F I G. 14
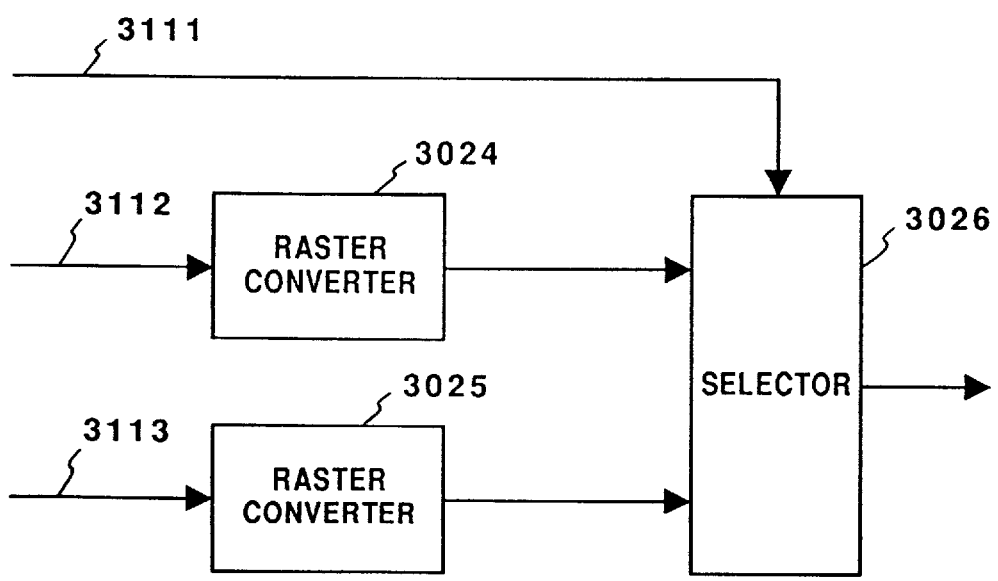
F I G. 15

WHEN BIT MAP COLOR INFORMATION CHANGES

WHEN BIT MAP COLOR INFORMATION DOES NOT CHANGE

WHEN BIT MAP COLOR INFORMATION CHANGES

WHEN BIT MAP COLOR INFORMATION DOES NOT CHANGE

| DENSITY LEVEL | OUT 1 |
|:---:|:---:|
| 98 | 35 |
| 100 | 35 |
| 104 | 33 |
| 105 | 27 |
| 107 | 25 |
| 109 | 25 |
| 125 | 6 |
| 140 | 10 |
| 220 | 110 |

F I G. 25

| 0 | 0 | 1 | 0 |
|---|---|---|---|
| 0 | 1 | 0 | 0 |
| 1 | 0 | 0 | 0 |
| 0 | 0 | 0 | 0 |

F I G. 26A

| 98 | 100 | 110 | 105 |
|---|---|---|---|
| 100 | 110 | 104 | 109 |
| 110 | 104 | 107 | 125 |
| 104 | 109 | 125 | 140 |

F I G. 26B

| 98 | 100 | 220 | 105 |
|---|---|---|---|
| 100 | 220 | 104 | 109 |
| 220 | 104 | 107 | 125 |
| 104 | 109 | 125 | 140 |

F I G. 28A

| 10 | 10 | 38 | 10 |
|---|---|---|---|
| 10 | 38 | 11 | 10 |
| 38 | 11 | 10 | 11 |
| 10 | 10 | 11 | 11 |

F I G. 28B

| 130 | 129 | 62 | 127 |
|---|---|---|---|
| 129 | 62 | 127 | 126 |
| 62 | 126 | 125 | 124 |
| 126 | 125 | 124 | 123 |

F I G. 28C

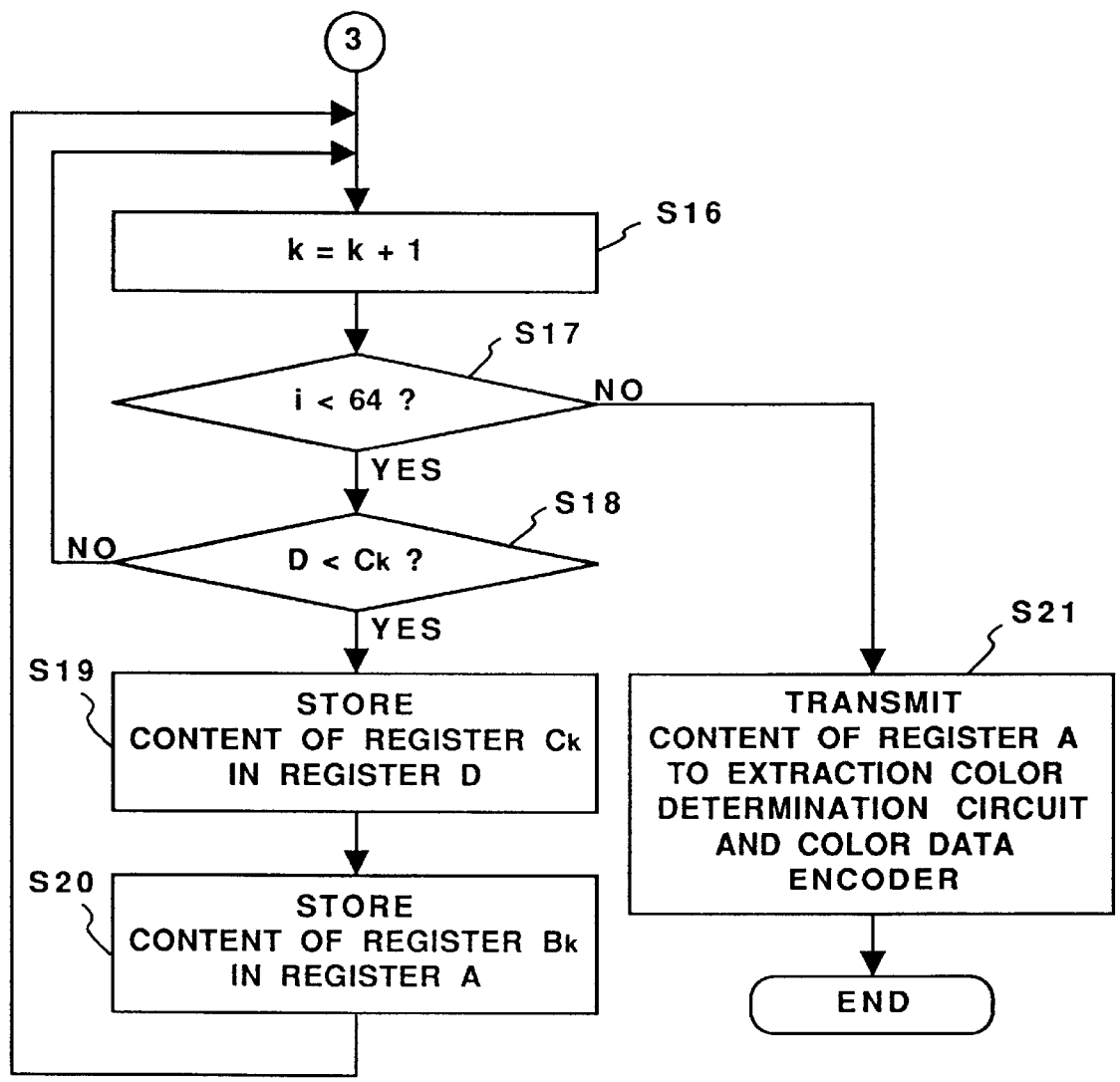
F I G. 31C

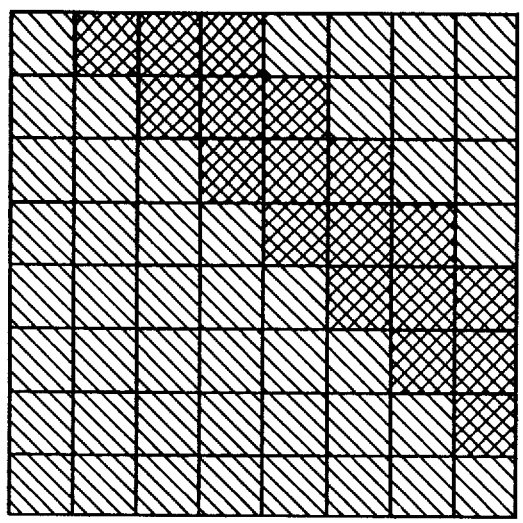
F I G. 33
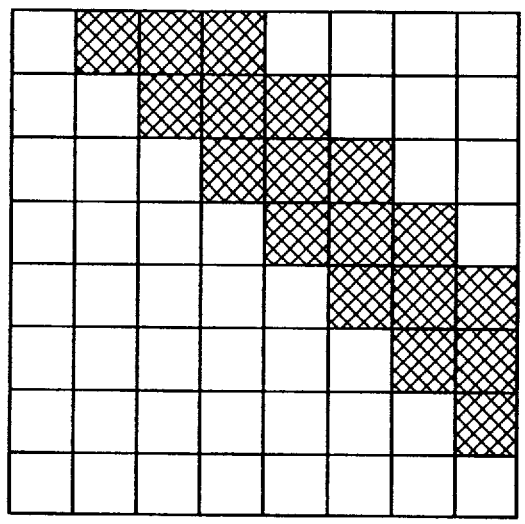
F I G. 34

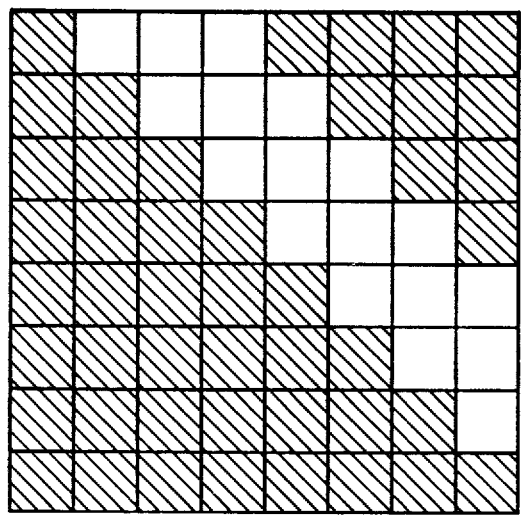
F I G. 35
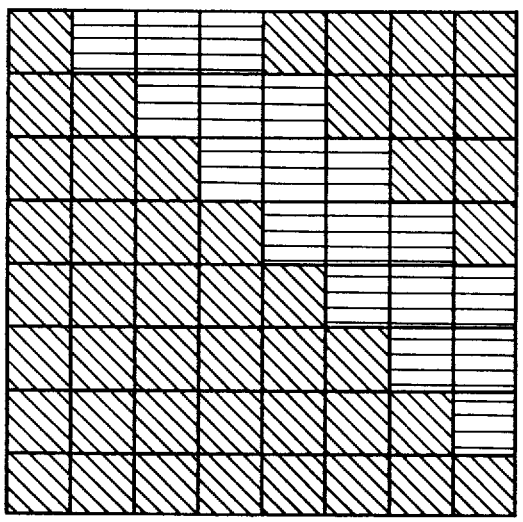
F I G. 36

IN

| 20 | 20 | 136 | 139 | 152 | 169 | 167 | 150 |
|---|---|---|---|---|---|---|---|
| 141 | 141 | 20 | 145 | 155 | 170 | 168 | 153 |
| 150 | 156 | 156 | 20 | 148 | 160 | 164 | 153 |
| 163 | 168 | 161 | 148 | 20 | 146 | 149 | 140 |
| 171 | 167 | 152 | 139 | 133 | 20 | 135 | 119 |
| 168 | 158 | 139 | 131 | 136 | 146 | 20 | 106 |
| 153 | 142 | 128 | 128 | 145 | 156 | 20 | 107 |
| 150 | 135 | 128 | 128 | 140 | 152 | 20 | 104 |

F I G. 44A

DCT

| 4 | 39 | 9 | 26 | 11 | -45 | 44 | -27 |
|---|---|---|---|---|---|---|---|
| 28 | -181 | 22 | 6 | -51 | 63 | -57 | 34 |
| -39 | -97 | -106 | 49 | 38 | -34 | 42 | -22 |
| -28 | -8 | -73 | -36 | 48 | 16 | -8 | 7 |
| -18 | -11 | -17 | -83 | -13 | 75 | -8 | 11 |
| -8 | -21 | -17 | -28 | -57 | 14 | 77 | -12 |
| -9 | -6 | -14 | -5 | -36 | -35 | 59 | 53 |
| -6 | -8 | 0 | -16 | 1 | -23 | -21 | 103 |

F I G. 44B

IN

| 146 | 146 | 136 | 139 | 152 | 169 | 167 | 150 |
|---|---|---|---|---|---|---|---|
| 141 | 141 | 146 | 145 | 155 | 170 | 168 | 153 |
| 150 | 156 | 156 | 146 | 148 | 160 | 164 | 153 |
| 163 | 168 | 161 | 148 | 146 | 146 | 149 | 140 |
| 171 | 167 | 152 | 139 | 133 | 146 | 135 | 119 |
| 168 | 158 | 139 | 131 | 136 | 146 | 146 | 106 |
| 153 | 142 | 128 | 128 | 145 | 156 | 146 | 107 |
| 150 | 135 | 128 | 128 | 140 | 152 | 146 | 104 |

F I G. 44C

DCT

| 146 | 24 | 5 | 53 | -36 | 11 | -6 | 2 |
|---|---|---|---|---|---|---|---|
| 50 | -43 | 5 | -27 | 4 | -8 | 4 | -3 |
| -18 | -43 | -12 | 23 | 0 | 4 | -1 | 2 |
| -10 | 15 | 6 | 14 | -2 | 0 | -3 | -3 |
| -2 | 14 | 4 | -4 | 3 | -2 | 1 | -3 |
| 4 | -2 | 1 | 0 | 1 | -4 | -4 | 2 |
| 0 | 4 | 6 | -1 | -3 | 3 | -3 | 1 |
| -2 | -1 | 1 | 1 | -1 | -2 | 3 | -4 |

F I G. 44D

| | | | | | | | |
|---|---|---|---|---|---|---|---|
| 54 | 45 | 31 | 22 | 19 | 24 | 20 | 36 |
| 50 | 45 | 35 | 23 | 13 | 20 | 10 | 12 |
| 48 | 51 | 53 | 48 | 41 | 20 | 42 | 47 |
| 14 | 21 | 27 | 27 | 24 | 20 | 38 | 48 |
| 51 | 53 | 53 | 50 | 48 | 20 | 64 | 74 |
| 21 | 19 | 16 | 18 | 20 | 36 | 47 | 54 |
| 25 | 20 | 19 | 29 | 20 | 57 | 62 | 61 |
| 25 | 17 | 12 | 20 | 20 | 37 | 28 | 17 |

FIG. 45A

| | | | | | | | |
|---|---|---|---|---|---|---|---|
| 38 | 49 | 56 | 51 | 42 | 46 | 67 | 88 |
| 41 | 48 | 52 | 48 | 41 | 43 | 57 | 70 |
| 44 | 47 | 47 | 45 | 41 | 41 | 45 | 50 |
| 20 | 20 | 43 | 44 | 45 | 44 | 41 | 38 |
| 45 | 20 | 42 | 45 | 49 | 49 | 44 | 39 |
| 44 | 20 | 20 | 45 | 48 | 49 | 46 | 43 |
| 44 | 45 | 20 | 20 | 33 | 32 | 33 | 44 |
| 45 | 47 | 20 | 20 | 37 | 35 | 38 | 33 |

FIG. 45B

| | | | | | | | |
|---|---|---|---|---|---|---|---|
| 38 | 39 | 36 | 35 | 32 | 34 | 37 | 38 |
| 31 | 38 | 34 | 34 | 33 | 34 | 37 | 37 |
| 34 | 34 | 37 | 34 | 33 | 35 | 35 | 37 |
| 20 | 20 | 33 | 33 | 35 | 34 | 34 | 38 |
| 35 | 20 | 32 | 33 | 36 | 35 | 34 | 39 |
| 34 | 20 | 20 | 33 | 36 | 36 | 36 | 33 |
| 34 | 35 | 20 | 20 | 33 | 32 | 33 | 33 |
| 35 | 37 | 20 | 20 | 34 | 34 | 35 | 33 |

FIG. 49

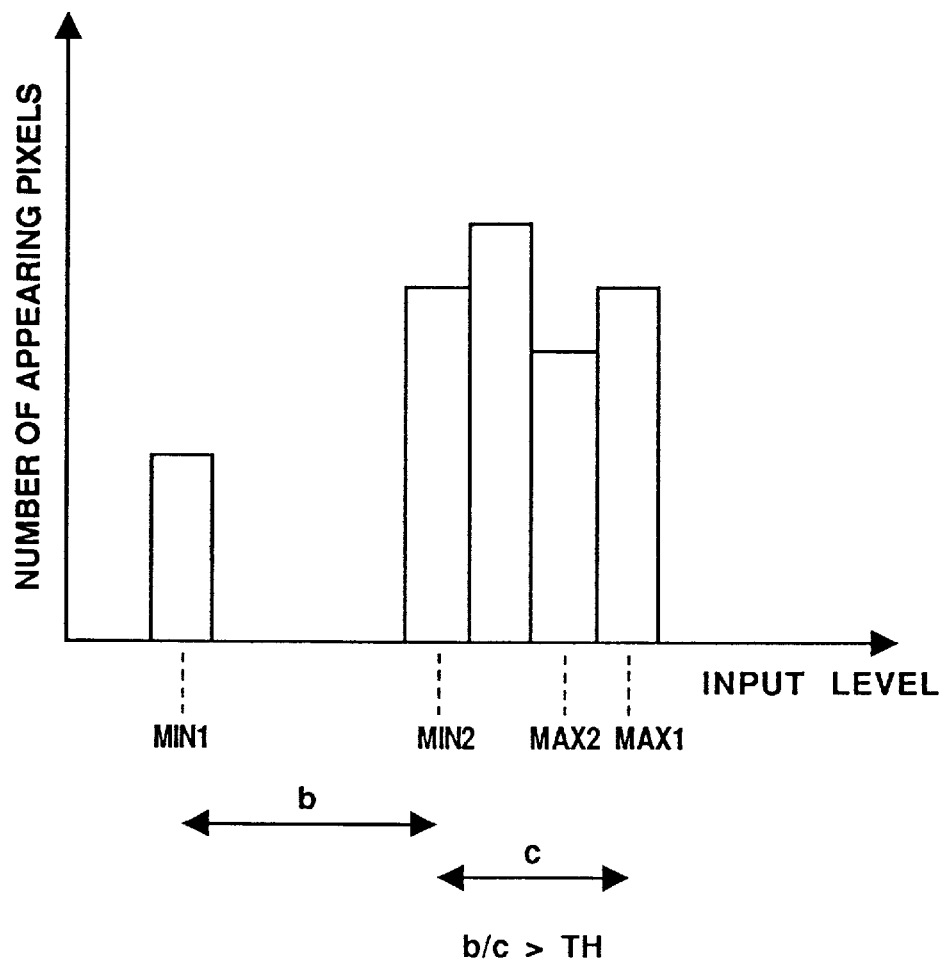
F I G. 50

|     |     |     |     |     |     |     |     |
|-----|-----|-----|-----|-----|-----|-----|-----|
| 20  | 20  | 136 | 139 | 152 | 169 | 167 | 150 |
| 141 | 141 | 20  | 145 | 155 | 170 | 168 | 153 |
| 150 | 156 | 156 | 20  | 148 | 160 | 164 | 153 |
| 163 | 168 | 161 | 148 | 20  | 146 | 149 | 140 |
| 171 | 167 | 152 | 139 | 133 | 20  | 135 | 119 |
| 168 | 158 | 139 | 131 | 136 | 146 | 20  | 106 |
| 153 | 142 | 128 | 128 | 145 | 156 | 20  | 107 |
| 150 | 135 | 128 | 128 | 140 | 152 | 20  | 104 |

F I G. 52A

|     |     |     |     |     |     |     |     |
|-----|-----|-----|-----|-----|-----|-----|-----|
| 130 | 130 | 129 | 130 | 135 | 137 | 130 | 127 |
| 135 | 136 | 130 | 132 | 134 | 139 | 144 | 134 |
| 132 | 130 | 131 | 130 | 131 | 131 | 132 | 133 |
| 129 | 128 | 130 | 132 | 130 | 128 | 128 | 130 |
| 147 | 139 | 136 | 134 | 128 | 130 | 128 | 121 |
| 128 | 159 | 147 | 141 | 129 | 128 | 130 | 121 |
| 134 | 130 | 130 | 130 | 127 | 127 | 130 | 127 |
| 128 | 128 | 128 | 128 | 128 | 127 | 130 | 128 |

F I G. 52B

|     |     |     |     |     |     |     |     |
|-----|-----|-----|-----|-----|-----|-----|-----|
| 108 | 108 | 116 | 114 | 113 | 112 | 111 | 111 |
| 117 | 117 | 108 | 115 | 114 | 113 | 112 | 111 |
| 118 | 118 | 117 | 108 | 115 | 113 | 113 | 112 |
| 119 | 119 | 118 | 117 | 108 | 115 | 114 | 113 |
| 121 | 120 | 119 | 118 | 117 | 108 | 115 | 115 |
| 122 | 121 | 121 | 119 | 118 | 117 | 108 | 116 |
| 123 | 122 | 121 | 120 | 119 | 118 | 108 | 117 |
| 123 | 123 | 122 | 121 | 120 | 118 | 108 | 117 |

F I G. 52C

|   |   |   |   |   |   |   |   |
|---|---|---|---|---|---|---|---|
| 1 | 1 | 0 | 0 | 0 | 0 | 0 | 0 |
| 0 | 0 | 1 | 0 | 0 | 0 | 0 | 0 |
| 0 | 0 | 0 | 1 | 0 | 0 | 0 | 0 |
| 0 | 0 | 0 | 0 | 1 | 0 | 0 | 0 |
| 0 | 0 | 0 | 0 | 0 | 1 | 0 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |

F I G. 52D

IMAGE ENCODING APPARATUS

BACKGROUND OF THE INVENTION

The present invention relates to an image encoding apparatus for encoding an input image, for example, an image obtained by synthesizing a natural image with a character/line image, or for separating character/line image information from a natural image in a multi-value image, and encoding the character/line image information and the natural image by different methods.

As a conventional method of encoding a multi-value image, the following method is proposed. In this method, character/line image information having a designated color or density value is temporarily extracted in the form of, e.g., bit map data from the multi-value image. The bit map data is entropy-encoded, and the multi-value image is encoded by, e.g., orthogonal transform. Another method is also proposed. In this method, a multi-value image is divided into blocks serving as orthogonal transform units, color information or the density value of a character/line image is detected in units of blocks, and the character/line image having the detected color information or density value is extracted in the form of bit map data. The bit map data and the multi-value image are encoded by the above-mentioned methods, and the color information in units of blocks is encoded by, e.g., predictive encoding.

In these methods, a multi-value image is assumed as a synthesized image of a natural image having a relatively low high-frequency power, and a character/line image as binary-like information which locally has the same density value. In order to protect character/line image information from a signal distortion generated upon compression/expansion of the multi-value image using orthogonal transform encoding, the character/line image binary information is extracted in advance, and reversible encoding free from deterioration is performed for the binary information.

However, in a multi-value image to be subjected to orthogonal transform encoding, a character/line image is mixed in a natural image, and edge components present in the edge portion of the character/line image include a strong high-frequency power. For this reason, the edge portion of the character/line image has considerably different nature from that of a normal natural image having a low high-frequency power, and it is difficult to efficiently perform encoding.

As for ADCT encoding using discrete cosine transform, when edge components are included in a multi-value image, a very unique distortion called mosquito noise is generated around the edge components of a compressed/expanded multi-value image, and this is a main factor causing deterioration of image quality.

On the other hand, in a color facsimile apparatus in the above-mentioned cases, a method of separating a black character/line image included in a color image from a natural image portion, and performing different encoding operations to the separated image portions is proposed.

However, image information input to the printer includes various types of image information such as multi-value information (to be referred to as an image hereinafter) having gradation input from an image input apparatus such as a color image scanner, a CG (Computer Graphics) image formed by a host computer, font information such as characters, line image information used in, e.g., CAD (Computer Aided Design), and the like.

Along with recent improvement in performance of host computers, DTP (Desk Top Publishing) is popular. In the DTP, the above-mentioned various types of image information are synthesized and combined by a host computer, and are transmitted to a printer. In this case, the density value of a character/line image is not always determined in advance, and only extraction of a black character/line image cannot realize perfect separation of a character/line image.

When image information from which a character/line image cannot be separated is compressed by orthogonal transform and quantization like in an image, since the character/line image in the image includes many high-frequency components in orthogonal transform, the high-frequency components are omitted in quantization. Thus, when the image information is expanded, ringing noise is generated not only in a character/line image portion but also around the character/line image portion, resulting in a deteriorated image.

An image encoding apparatus, which comprises an image memory unit for separately storing an image such as a character requiring high resolution, and an image such as a natural image placing an importance on gradation characteristics, is proposed in the above-mentioned cases.

However, in the conventional apparatus, a process for extracting text data (data requiring resolution) from a given block is independently performed in each block. Therefore, text data in a given region cannot reach a threshold value for extracting text data depending on blocks, and text data cannot be extracted from some blocks. Since gradation data indicating a color of a pixel extracted as text data is independently transferred in units of blocks, compression efficiency of gradation data is impaired accordingly.

SUMMARY OF THE INVENTION

The present invention has been made in consideration of the above situation, and has as its object to provide an image encoding apparatus, which can realize efficient encoding of image data while maintaining high quality of a character/line image in a multi-value image.

In order to achieve the above object, according to the present invention, there is provided an image encoding apparatus for encoding image information including both a multi-value image and a line image, comprising extraction means for extracting line image information from the image information, calculation means for calculating substitution data of a line image region corresponding to the line image information on the basis of the extracted line image information, delay means for delaying the image information during the calculation by said calculation means, substitution means for substituting the line image region with the substitution data according to the line image information, and encoding means for encoding the image information substituted with the substitution data.

It is another object of the present invention to provide an image encoding apparatus for extracting a line image region exactly and properly.

In order to acieve this object, according to the present invention, there is provided an image processing apparatus comprising input means for inputting image information, dividing means for dividing the image information into blocks each having a plurality of pixels, and extraction means for extracting line image information for each said block, wherein said extracting means extracts the line image information on the basis of a distribution of color in said block.

It is another object of the present invention to provide an image processing apparatus for decreasing edge components of a multi-value image to decrease the high-frequency power, thereby suppressing image quality deterioration after compression/expansion.

In order to achieve this object, according to the present invention, there is provided an image processing apparatus comprising input means for inputting image information, first extraction means for extracting line image information from the image information, second extraction means for extracting a color information of a line image corresponding to the line image information, third extraction means for extracting multi-value image information, first encoding means for encoding the line image information extracted by the first extraction means, second encoding means for encoding the color information extracted by the second extraction means, third encoding means for encoding the multi-value image information extracted by the third extraction means.

It is further object of the present invention to provide a printing apparatus for storing an image information in compressed form.

It is still further object of the present invention to extract a line image portion from input image information at a high speed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3A and 3B are views showing bit map information according to the first embodiment;

FIG. 4 is a view showing image data after substitution processing according to the first embodiment;

FIG. 6 is a view showing image data after substitution processing according to the first modification;

FIG. 14 is a block diagram showing the arrangement of an extracted pixel substitution circuit according to the second embodiment;

FIG. 15 is a block diagram showing the arrangement of a synthesizer according to the second embodiment;

FIG. 25 is a table showing output values calculated by the extraction density calculation circuit on the basis of the density, frequency, and the like according to the fourth embodiment;

FIGS. 26A and 26B are views showing resolution information stored in a bit map memory, and substituted pixels according to the fourth embodiment;

FIGS. 28A to 28C are views for explaining equivalence judgment of density levels according to the fifth embodiment;

FIGS. 31A to 31C are flow charts showing calculation processing in a histogram calculation circuit according to the sixth embodiment;

FIGS. 33 to 36 are views showing extracted images and non-extracted images in one block according to the modification of the sixth embodiment;

FIGS. 44A to 44D are views for comparing DCT components with and without separation;

FIGS. 45A and 45B are views showing a case without separation;

FIG. 49 is a view showing a block which can be extracted in the second modification;

FIG. 50 is a view for explaining discrimination in the second modification using a histogram;

FIGS. 52A to 52D are views showing color component blocks and a bit map in the ninth embodiment.

DETAILED DESCRIPTION OF THE PREFERRED EMBODIMENTS

The preferred embodiments of the present invention will be described in detail hereinafter with reference to the accompanying drawings.

<First Embodiment>

Figure 1:
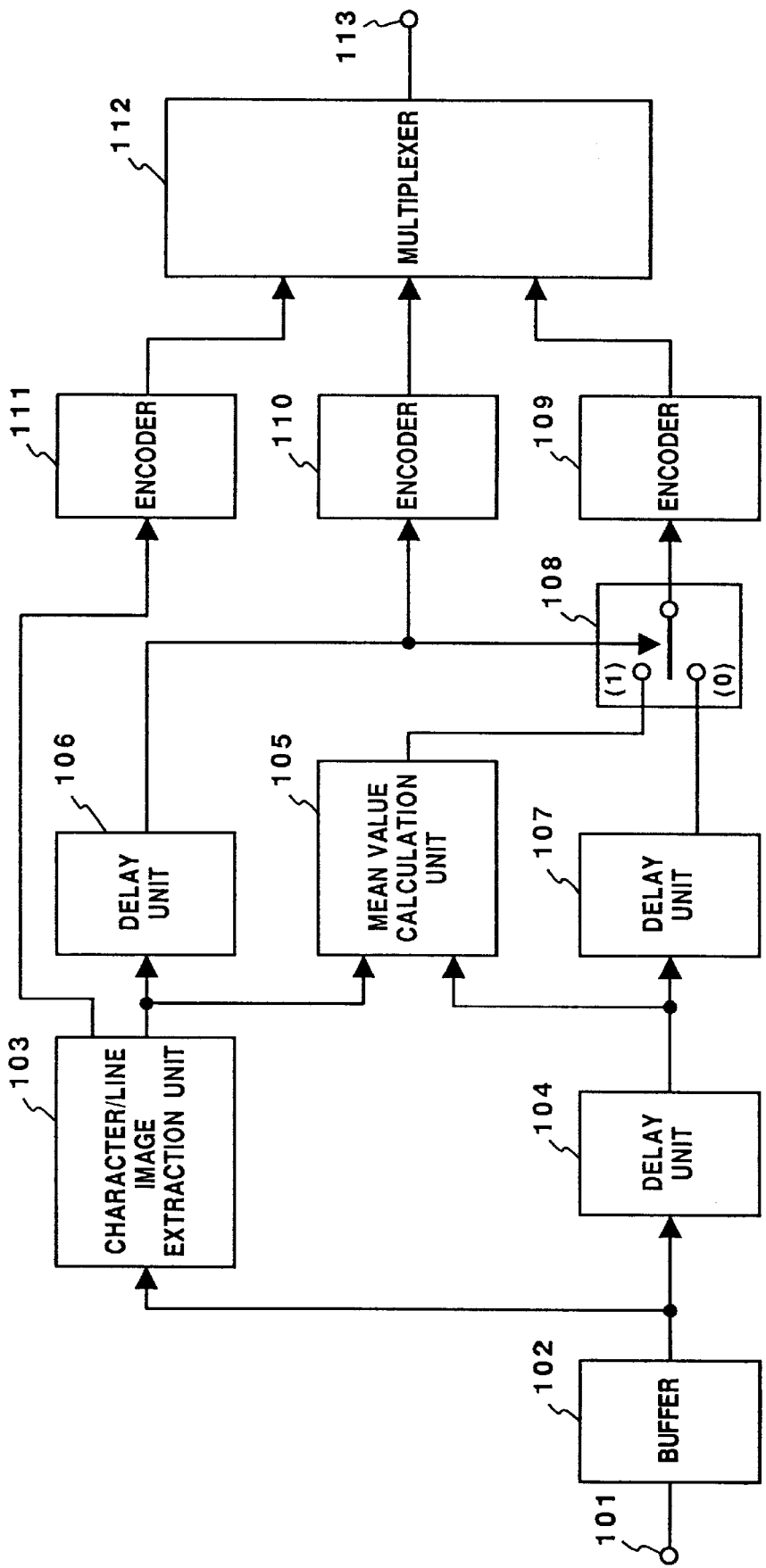
FIG. 1 is a schematic block diagram showing the arrangement of an image encoding apparatus according to the first embodiment of the present invention.

FIG. 1 is a schematic block diagram showing the arrangement of an image encoding apparatus according to the first embodiment. In FIG. 1, reference numeral 101 denotes an input terminal for inputting a multi-value image; 102, a buffer for temporarily storing image data when a multi-value image data is divided into blocks; 103, a character/line image extraction unit for extracting color information and bit map information of a character/line image from a multi-value image; 104, a delay unit having the same delay amount as a data delay time generated by the character/line image extraction unit 103; and 105, a mean value calculation unit as a substitution data calculation means. Reference numerals 106 and 107 denote delay units arranged in correspondence with a data delay time generated in the mean value calculation unit 105; 108, a selector as a means for substituting a portion of a multi-value image with substitution data; 109, a first encoder for encoding a multi-value image; 110, a second encoder for encoding bit map information; and 111, a third encoder for encoding color information. Reference numeral 112 denotes a multiplexer for multiplexing encoded data output from the first to third encoders 109 to 111; and 113, an output terminal for outputting the multiplexed data.

The operation of this apparatus with the above arrangement will be described below.

A multi-value image input from the input terminal 101 is temporarily stored in the buffer 102, and is sequentially read out in units of blocks. The blocks are then supplied to the character/line image extraction unit 103 and the delay unit 104. The character/line image extraction unit 103 extracts the most frequent value in a block as color information of a character/line image, and supplies the color information to the third encoder 111. In addition, the unit 103 compares the color information and pixel data in the block to check if they are equal to each other, and supplies comparison results as bit map information to the mean value calculation unit 105 and the delay unit 106.

A data transfer period of at least one block is required from when pixel data is input to the character/line image extraction unit 103 until corresponding bit map data is output. This is because the color information cannot be determined before all the pixel data in one block are input to the character/line image extraction unit 103. Therefore, pixel data output from the buffer 102 advances by one block or more from bit map data output from the character/line image extraction unit 103. For this reason, the pixel data is delayed by the delay unit 104, and the delayed data is supplied to the mean value calculation unit 105. Thus, pixel data and bit map data input to the mean value calculation unit 105 can be simultaneously input as spatially coinciding information.

The mean value calculation unit 105 calculates a mean value from only pixel data corresponding to bit map data= "0" in units of blocks.

Figure 2:
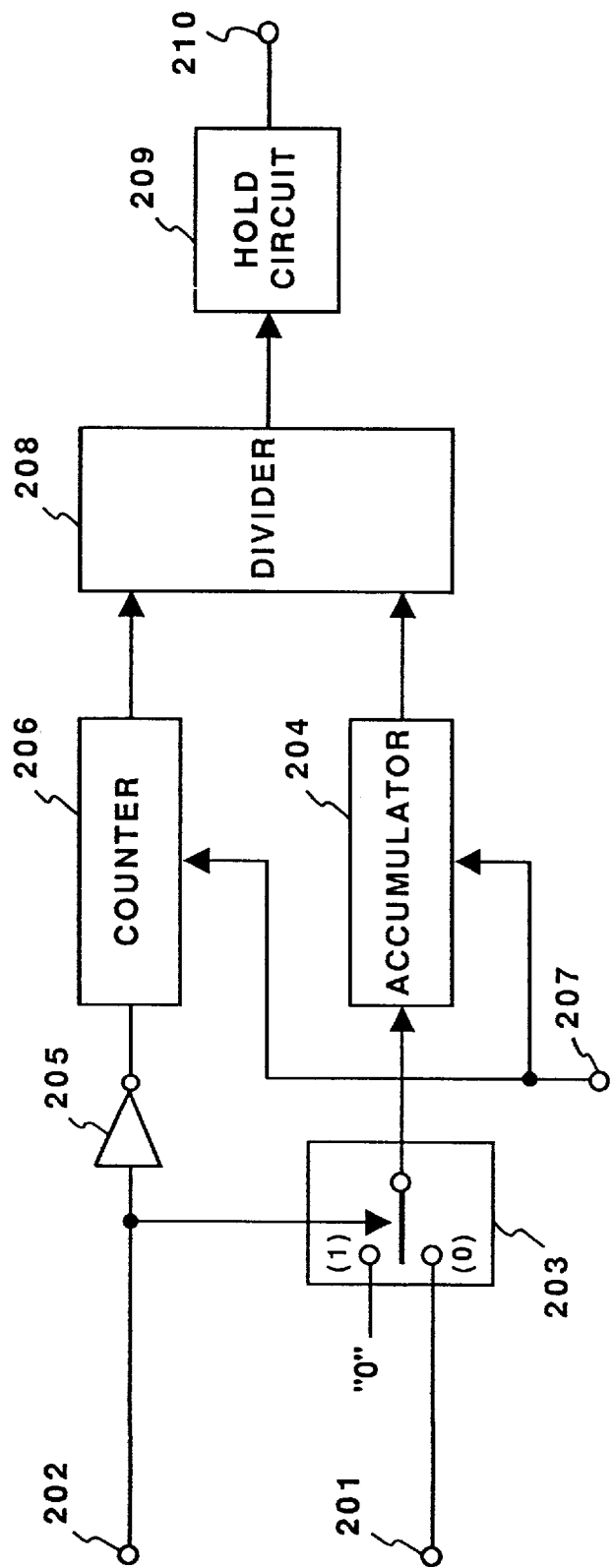
FIG. 2 is a block diagram showing the arrangement of a mean value calculation unit according to the first embodiment.

FIG. 2 is a diagram showing the arrangement of the mean value calculation unit 105. The operation of the unit 105 will be briefly described below with reference to FIG. 2.

In FIG. 2, the above-mentioned pixel data is input to one input terminal (0) of a selector 203 through a terminal 201. The bit map data is input from a terminal 202, and is applied as a selection control signal of the selector 203. At the same time, the bit map data is inverted by an inverter 205, and the inverted data is input to a counter 206. The other input terminal (1) of the selector 203 receives "0". When the bit map data is "0", the selector 203 selects pixel data; otherwise, it selects "0", and outputs the selected data. The output from the selector 203 is input to an accumulator 204, and is accumulated.

On the other hand, the counter 206 for receiving the inverted bit map data counts the number of "1"s output from the inverter 205, i.e., the number of "0"s in the bit map data. As described above, since the mean value calculation is performed in units of blocks, the above-mentioned counter 206 and accumulator 204 must be cleared prior to input of the first data of each block. For this purpose, a necessary clear signal is input to a terminal 207 from a controller (not shown).

The output value from the accumulator 204 immediately after the final data of each block is input corresponds to a total sum of values of pixel data corresponding to bit map data="0". The output value from the counter 206 indicates the number of "0"s in the bit map data. Thus, the output value from the accumulator 204 is divided by the output value from the counter 206 by a divider 208 to obtain a mean value of pixel data in a region where the bit map data are "0", i.e., a region which is not equal to the extracted color information. Since the output timing of the mean value from the divider 208 is only immediately after the final data in a block is input, the mean value is kept held for one block period by a hold circuit 209, and thereafter, is output to a terminal 210.

In FIG. 1, the output from the mean value calculation unit 105 is input to one terminal of the selector 108 as substitution data to substitute some pixel data. As can be understood from the description of the operation of the mean value calculation unit 105, a calculation delay time of about one block is generated in the calculation unit 105. For this reason, in order to synchronize all the signals input to the selector 108, the pixel data is delayed by the delay unit 107, and the delayed data is input to the other input terminal of the selector 108. The bit map data is delayed by the delay unit 106, and the delayed data is input as a selection control signal of the selector 108.

For a region where bit map data="1", i.e., a character/line image region in a multi-value image, the selector 108 selects the output from the mean value calculation unit 105, i.e., the mean value of pixel data other than a character/line image region in each block. For a region where bit map data="0", i.e., a natural image region in a multi-value image, the selector 108 selects and outputs original image data.

Figure 4:
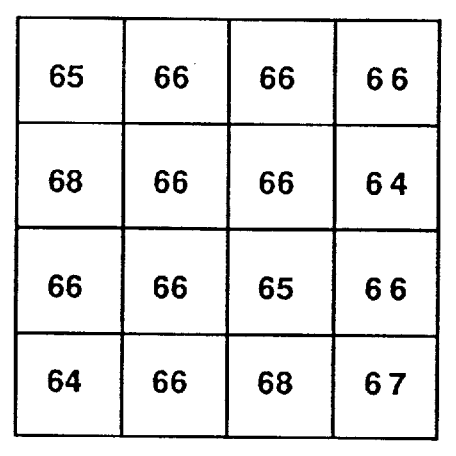

The output from the selector 108 will be described below. When pixel data in one block assume values shown in, e.g., FIG. 3A, extracted color information of a character/line image is "240", and bit map information becomes, as shown in FIG. 3B. A mean value of pixel data corresponding to a region where the values in the bit map information are "0" is calculated to be "66". When a region where values are "1" in the bit map information is substituted with the calculated mean value, the substitution results have values shown in FIG. 4. The values shown in FIG. 4 are output pixel data from the selector 108. The output data are encoded by the first encoder 109.

Therefore, in this case, since data to be encoded having values shown in FIG. 3A are substituted with data having almost no edge, as shown in FIG. 4, and the entropy after orthogonal transform is greatly reduced, and encoding efficiency can be improved.

On the other hand, the bit map data input to the selector 108 are also input to the second encoder 110, and are encoded. The character/line image color information is encoded by the third encoder 111. The data encoded by the first to third encoders 109 to 111 are multiplexed by the multiplexer 112, and the multiplexed data are output to the terminal 113.

<First Modification>

The first modification of the first embodiment will be described below.

Figure 5:
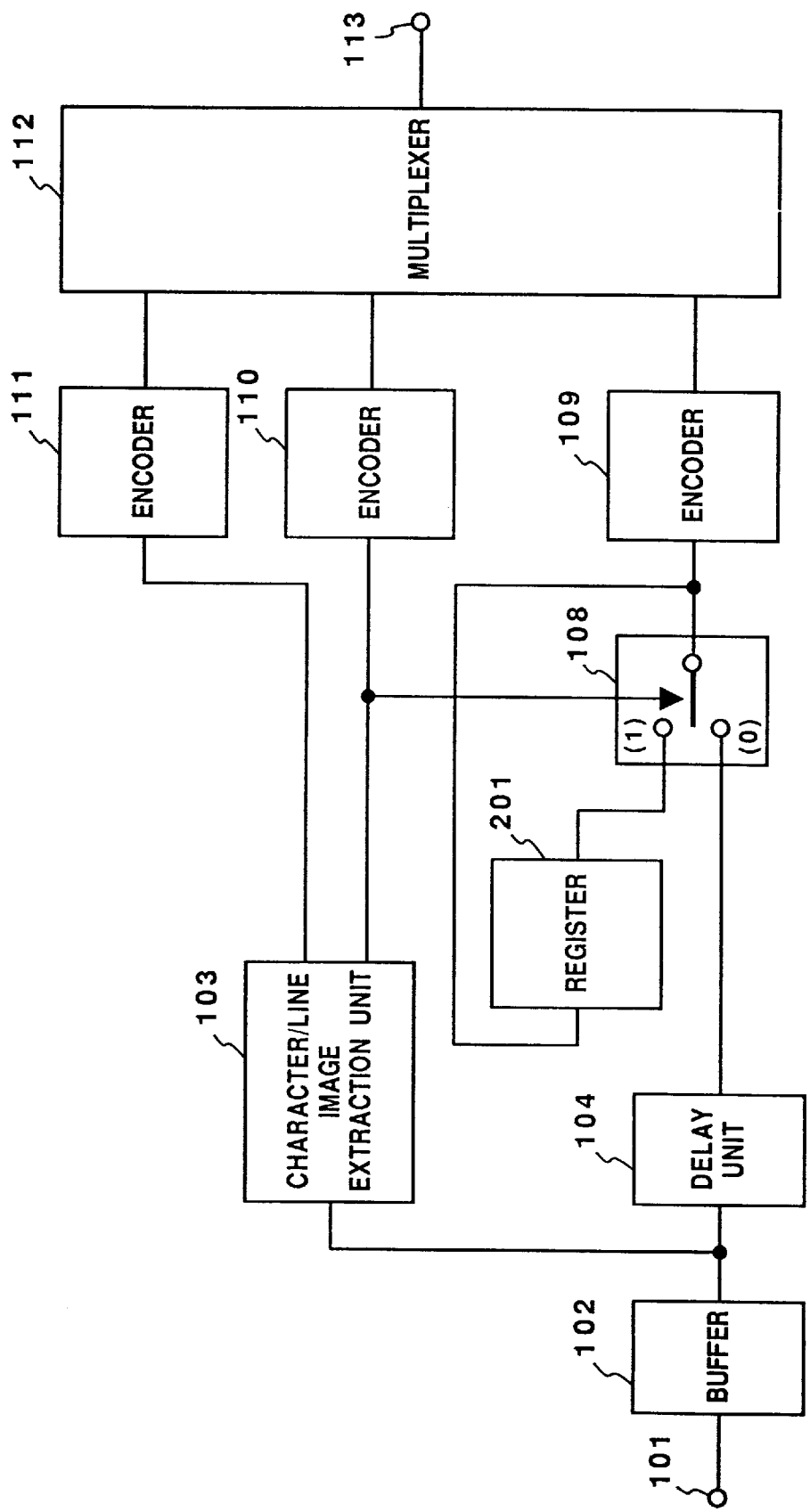
FIG. 5 is a schematic block diagram showing the arrangement of an image encoding apparatus according to the first modification of the first embodiment.

FIG. 5 is a schematic block diagram showing the arrangement of an image encoding apparatus of this modification. The same reference numerals in FIG. 5 denote the parts having the same functions as in the first embodiment, and a detailed description thereof will be omitted. Only a processing unit unique to this modification will be explained below.

In this modification, a difference from the first embodiment described above is the arrangement of a substitution value calculation means, and this means is realized by only a register 201.

Since the arrangement of the substitution value calculation means can be greatly simplified, a delay time in this calculation means can be ignored, and the delay units 106 and 107 required in the first embodiment can be omitted.

In the first embodiment, a character/line image portion is substituted with the mean value of other pixel data in a block, i.e., pixel data in a natural image region. However, in this modification, a character/line image portion is substituted with pixel data in the immediately preceding natural image region. Briefly speaking, the first embodiment relates to mean value substitution, while this modification relates to previous value substitution.

The operation of the apparatus of this modification will be described below.

In FIG. 5, a multi-value image input from the terminal 101 is divided into blocks in the buffer 102, and the blocks are supplied to the character/line image extraction unit 103 and the delay unit 104. The extraction unit 103 extracts color information of a character/line image in a block, and forms bit map information representing the character/line image region. The delay unit 104 delays pixel data according to processing executed by the extraction unit 103, and the delayed pixel data and bit map data are input to the selector 108 at the same timing.

The selector 108 selects the pixel data input from the delay unit 104 or data input from the register 201 according to the above-mentioned bit map data values. When the bit map data is "0", the selector 108 selects the pixel data; when it is "1", the selector 108 selects the output data from the register 201. The input data to the register 201 is the output data from the selector 108, and its content is pixel data of a natural image when the bit map data is "0", i.e., in a natural image region, or is the output data from the register 201 when the bit map data is "1", i.e., in a character/line image region.

Figure 6:
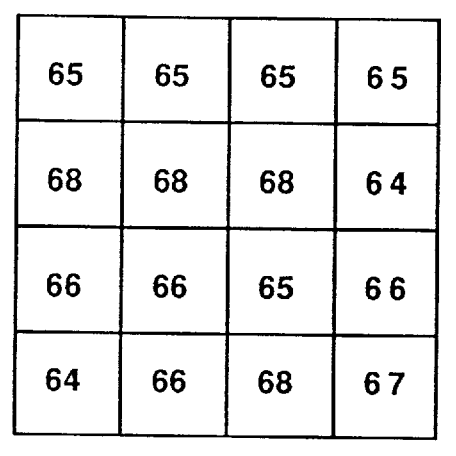

As can be seen from the above description, only pixel data of a natural image region are input to the register 201. The same applies to output data. Therefore, pixel data after a character/line image region is substituted with another value consist of pixel data in only a natural image region. For example, when pixel data for one block shown in FIG. 3A described above are read out from the buffer 102, and are processed according to this modification, the output from the selector 108 assumes values shown in FIG. 6. In this case, pixel data in a block are scanned in the line direction from the upper left corner toward the lower right corner.

The pixel data output from the selector 108, and the bit map data and color information output from the character/line image extraction unit 103 are respectively encoded by the first to third encoders 109 to 111 like in the first embodiment, and are multiplexed by the multiplexer 112. The multiplexed data are output to the terminal 113.

<Second Modification>

The second modification of the first embodiment will be described below.

Figure 7:
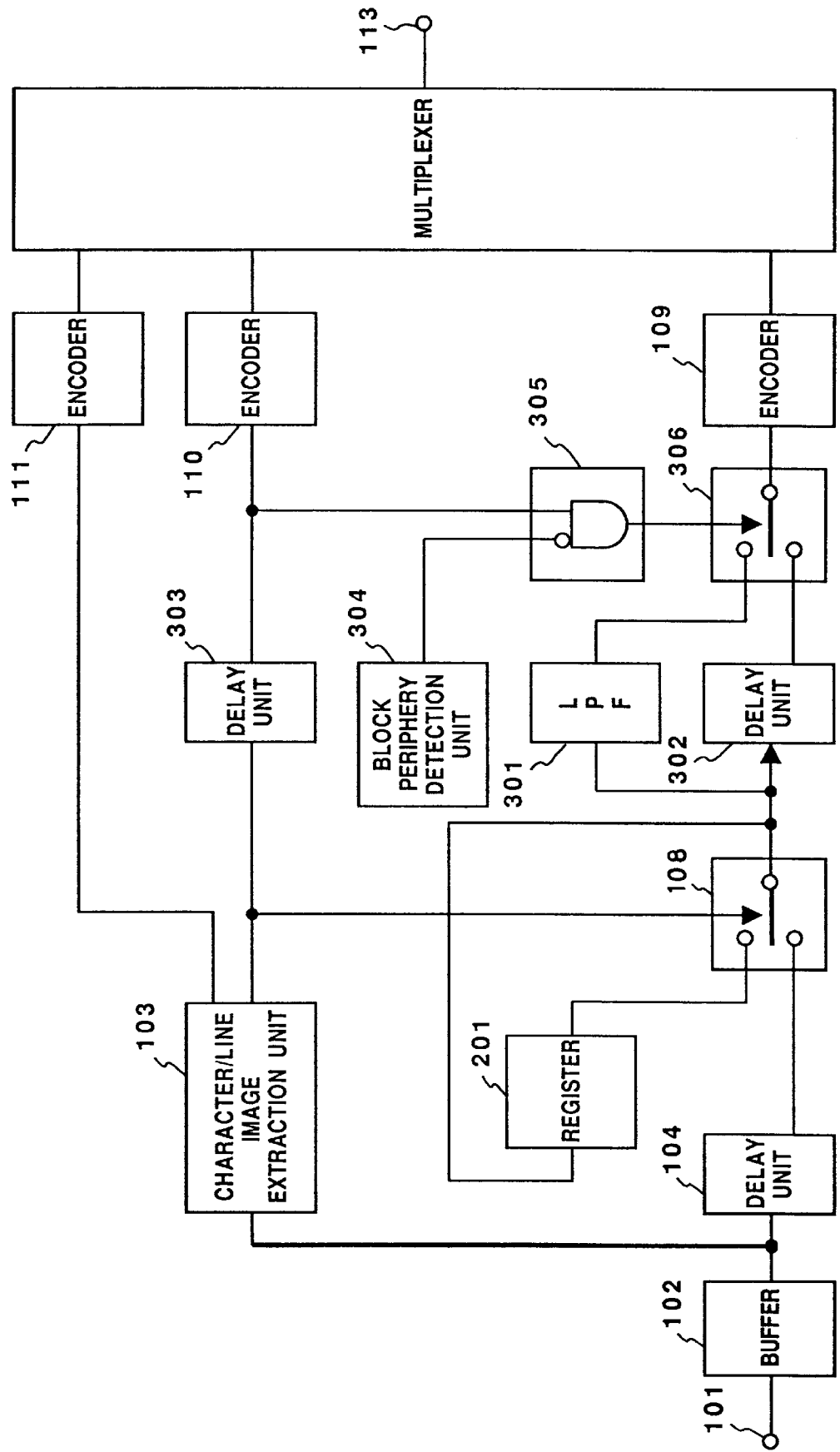
FIG. 7 is a schematic block diagram showing the arrangement of an image encoding apparatus according to the second modification of the first embodiment.

FIG. 7 is a schematic block diagram showing the arrangement of an image encoding apparatus according to this modification. The same reference numerals in FIG. 7 denote the parts having the same functions as in the first embodiment and the first modification, and a detailed description thereof will be omitted.

In this modification, two sets of substitution value calculation means and substitution means are arranged. The substitution value calculation means and the substitution means used in the first modification are respectively arranged as a first substitution value calculation means and a first substitution means. In addition to these means, a low-pass filter (to be abbreviated to as an "LPF" hereinafter) 301 is arranged as a second substitution value calculation means, and another selector 306 is arranged as a second substitution means.

In addition, means added to the first modification include delay units 302 and 303, a block periphery detection unit 304, and a substitution controller 305.

The characteristic feature of this embodiment is that pixel data are smoothed by the LPF 301 so as to further reduce an edge remaining between pixel data substituted with previous values, and non-substituted pixel data in a natural image region like in the first modification.

The operation of the apparatus of this modification will be described below.

The output data from the character/line image extraction unit 103 and the selector 108 are the same as those in the first modification, and a description of the processing unit before these units will be omitted.

The output from the selector 108 is input to and smoothed by the LPF 301. The smoothed data is input to one input terminal of the selector 306. At the same time, the output from the selector 108 is input to the delay unit 302, and is delayed by a predetermined period of time. The delayed data is input to the other input terminal of the selector 306. The delay amount of the delay unit 302 is the same as the delay amount generated by calculation processing in the LPF 301.

On the other hand, the bit map data output from the character/line image extraction unit 103 is input to the delay unit 303 having the same delay amount as that of the delay unit 302, and is delayed by this delay amount. Thereafter, the delayed data is applied to the selector 306 as a selection control signal of the selector 306 through the substitution controller 305. The substitution controller 305 is used for inhibiting processing for substituting the output from the delay unit 302 to the output from the LPF 301 in a peripheral portion of a block. For this purpose, the block periphery detection unit 304 outputs a signal for informing a processing timing of a block peripheral portion at that timing, and the substitution controller 305 performs substitution control based on this signal.

The reason why substitution is inhibited in a peripheral portion is that smoothing processing refers to data in the peripheral portion, and reference data cannot be obtained in the peripheral portion. Of course, the characteristics of the LPF 301 may be properly switched to allow a calculation, which need not use reference data that cannot be obtained in a peripheral portion, and the substitution controller 305 may be omitted.

The output data from the selector 306 obtained from the above arrangement is as follows.

Figures 8, 9:
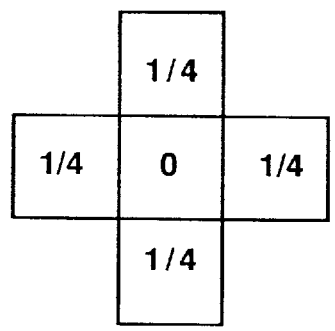
FIG. 8 is a view showing filter coefficients of a low-pass filter according to the second modification.
FIG. 9 is a view showing image data after substitution processing according to the second modification.

In the case of a block peripheral portion or when the bit map data value is "0", the output data from the delay unit 302 is selected as the output data from the selector 306; otherwise, the output data from the LPF 301 is selected. When filter coefficients of the LPF 301 are set, as shown in FIG. 8, the output from the selector 306 becomes as shown in FIG. 9. As compared to the data shown in FIG. 6 as the output from the selector 108, smoothness of gradation can be enhanced. Like in the first embodiment and the first modification, the pixel data output from the selector 306, the bit map data output from the delay unit 303, and the color information output from the character/line image extraction unit 103 are respectively encoded by the first to third encoders 109 to 111, and thereafter, are multiplexed by the multiplexer 112. The multiplexed data are output to the terminal 113.

Note that the substitution data calculation means is not limited to the above-mentioned methods. For example, in the first embodiment, when a mean value is calculated, all the pixel data excluding a character/line image region are used. However, when the mean value is calculated based on only pixel data contacting the character/line image region, the mean value of the magnitudes of edges formed between substituted and non-substituted data can be minimized. A mean value may be calculated based on only the maximum and minimum values of pixel data contacting a character/line image region, and may be used as substitution data. In this case, the maximum value of the magnitudes of edges formed between substituted and non-substituted data can be minimized.

The combination of methods of using a plurality of substitution data calculation means and substitution means is not limited to the above modification. Combinations with various substitution data calculation means described above are available.

In this manner, the edge components of a multi-value image can be decreased, and a compression ratio upon compression encoding a multi-value image can be increased. Thus, transmission cost upon encoding and transmission of a multi-value image, and cost of a memory device upon storage of encoded data in, e.g., a memory can be greatly reduced.

<Second Embodiment>

Figure 10:
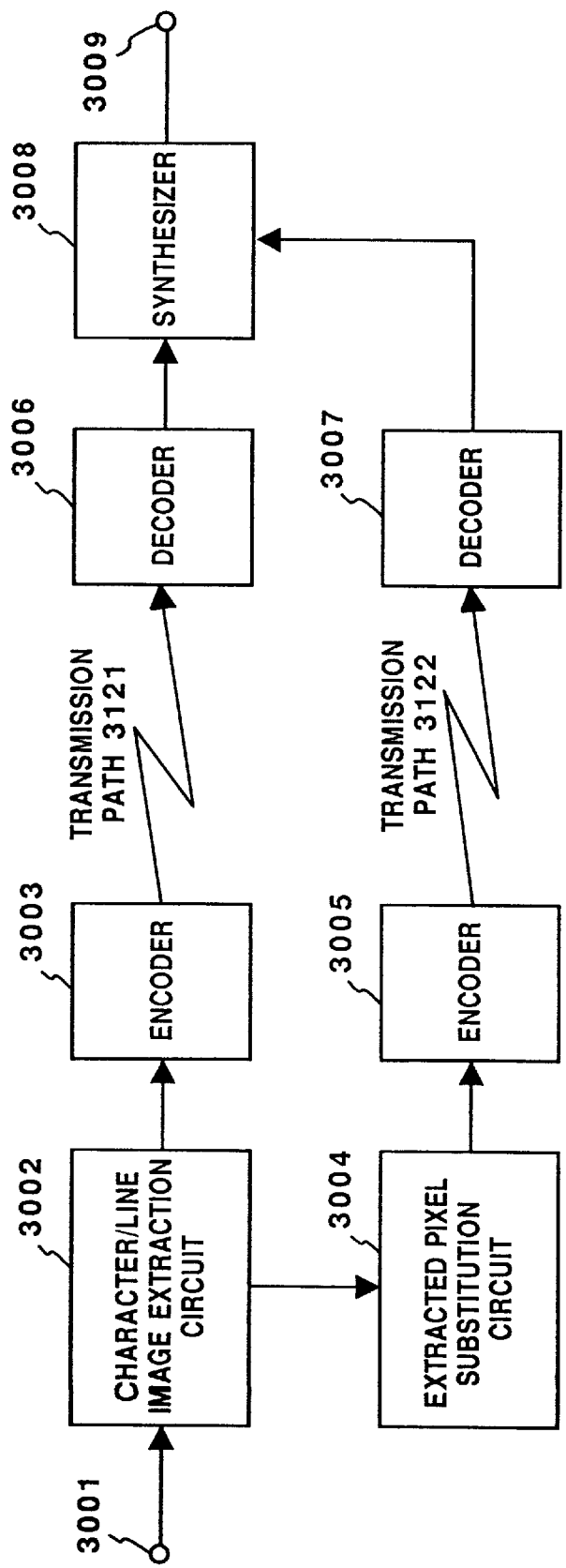
FIG. 10 is a schematic block diagram showing the arrangement of an image encoding apparatus according to the second embodiment of the present invention.

FIG. 10 is a schematic block diagram showing the arrangement of an image encoding apparatus according to the second embodiment. In FIG. 10, reference numeral 3001 denotes an input terminal for receiving image data from, e.g., a computer (not shown). Reference numeral 3002 denotes a character/line image extraction circuit for extracting a character/line image from image data, and outputting gradation data and a discrimination result (to be described later). An encoder 3003 encodes the extracted character/line image. An extracted pixel substitution circuit 3004 substitutes pixels corresponding to the extracted character/line image with a predetermined value. An encoder 3005 encodes substituted image data. A decoder 3006 decodes data encoded by the encoder 3003. A decoder 3007 decodes data decoded by the encoder 3005. Reference numeral 3008 denotes a synthesizer for synthesizing data from the decoders 3006 and 3007 to original image data.

In the above arrangement, image data input from the input terminal 3001 is input to the character/line image extraction circuit 3002. The extraction circuit 302 extracts pixels corresponding to a character/line image synthesized by, e.g., a computer, from the image data. The extraction circuit 3002 outputs, to the encoder 3003, gradation data (including color data of the character/line image) of the extracted pixels, and discrimination results (1 bit per pixel: in this embodiment, "1" is output for an extracted pixel; otherwise, "0" is output) indicating whether pixels of interest are extracted pixels (pixels extracted as the character/line image) or not. The discrimination results input to the encoder 3003 are encoded by a known entropy encoding such as arithmetic encoding, Huffman encoding, MH, MR, MMR, or the like suitable for encoding binary data. The gradation data of the extracted pixels are multiplexed on the discrimination result codes encoded by the entropy encoding, and the multiplexed data are output onto a transmission path.

Pixel data input to the extracted pixel substitution circuit 3004 are substituted with values suitable for encoding to be described later (e.g., a mean value, the central value, or the most frequent value of pixels other than extracted pixels in a block, or data interpolated based on surrounding pixels of the extracted pixels), and the substituted data are input to the encoder 3005. The substituted pixel data are encoded by the encoder 3005 having an encoding means suitable for encoding a multi-value image such as ADCT (Adaptive Discrete Cosine Transform) of a color still image encoding method proposed by the JPEG (Joint Photographic Expert Group), or DCT, DST (Discrete Sine Transform), or the like, and the encoded data are output onto a transmission path.

Thereafter, the discrimination results and gradation data of the extracted pixels transmitted from the encoder 3004 are decoded by the decoder 3006, and the decoded data are output to the synthesizer 3008. The image data transmitted from the encoder 3003 are decoded by the decoder 3007, and the decoded data are output to the synthesizer 3008. When the discrimination result of the decoded extracted pixel is "1" (i.e., an extracted pixel), the synthesizer 3008 selects the gradation data of the extracted pixel; when it is "0", the synthesizer selects the image data, thus restoring an original input image signal.

Figure 11:
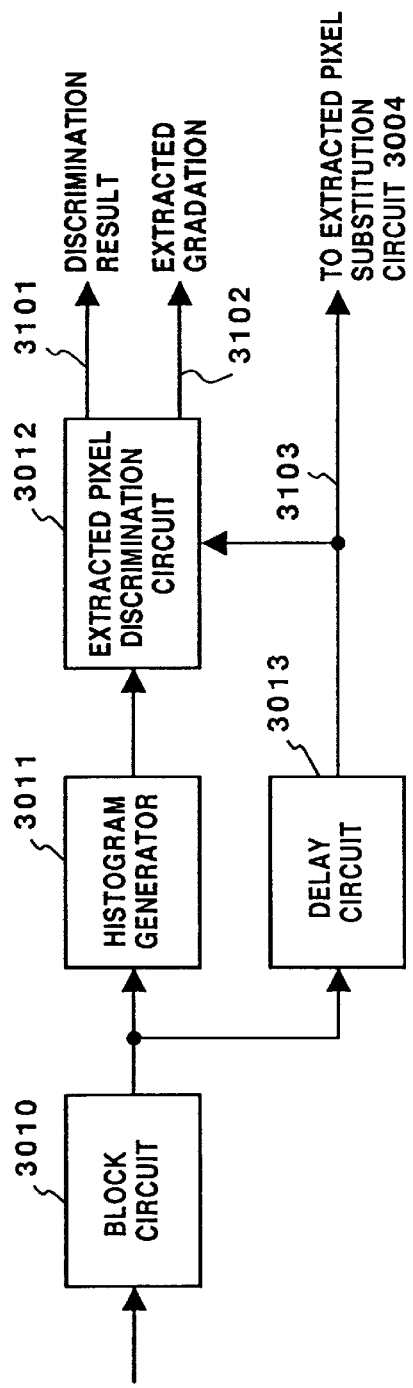
FIG. 11 is a block diagram showing the arrangement of a character/line image extraction circuit according to the second embodiment.

The detailed arrangement of the character/line image extraction circuit 3002 will be described below with reference to the block diagram shown in FIG. 11.

Input image data are divided into small blocks each consisting of, e.g., 8×8 pixels (the block size is the same size as a block for encoding), by a block circuit 3010. A histogram generator 3011 generates histograms in units of blocks on the basis of the divided pixel data, and outputs the results to an extracted pixel discrimination circuit 3012. On the other hand, image data input to a delay circuit 3013 are delayed by a time necessary for generating histograms, and thereafter, the delayed data are output to the extracted pixel discrimination circuit 3012 and the extracted pixel substitution circuit 3004.

The extracted pixel discrimination circuit 3012 detects extracted gradation data on the basis of the input histogram results, and compares the image data input from the delay circuit 3013 with the extracted gradation data. When the two data coincide with each other, it is determined that the pixel of interest is an extracted pixel, and "1" is output from a signal line 3101 as a discrimination result; otherwise, "0" is output.

Figure 12:
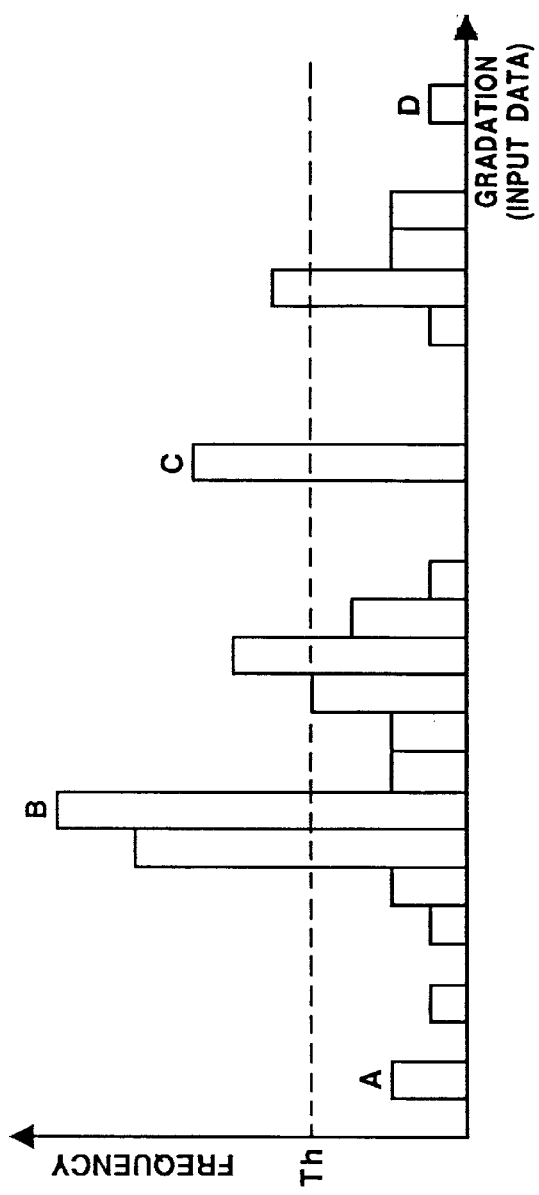
FIG. 12 shows a histogram generated by the apparatus according to the second embodiment.

A method of detecting the extracted gradation data in this embodiment will be described below with reference to FIG. 12.

Since character/line image data added to a natural image by, e.g., a computer has no correlation with a background image of the natural image, gradation becomes discontinuous. The added character/line image data normally has the same gradation data in a specific region.

On the other hand, natural image data such as a photograph has a strong correlation among pixels, and its gradation data is widely distributed due to noise superposed in an input operation or shading. Therefore, by detecting gradation data corresponding to a histogram which is not widely distributed, and having a frequency exceeding a predetermined threshold value Th, the added character/line image data can be discriminated. For example, when histograms shown in FIG. 12 are generated, gradation data C is isolated since frequencies near the data C are "0", and its frequency exceeds the threshold value Th. Therefore, the gradation data C is determined as extracted gradation data. Although gradation data A and D are isolated, their frequencies are low, and these data may be isolated points due to, e.g., noise. Therefore, the gradation data A and B are not discriminated as extracted gradation data.

Figure 13:
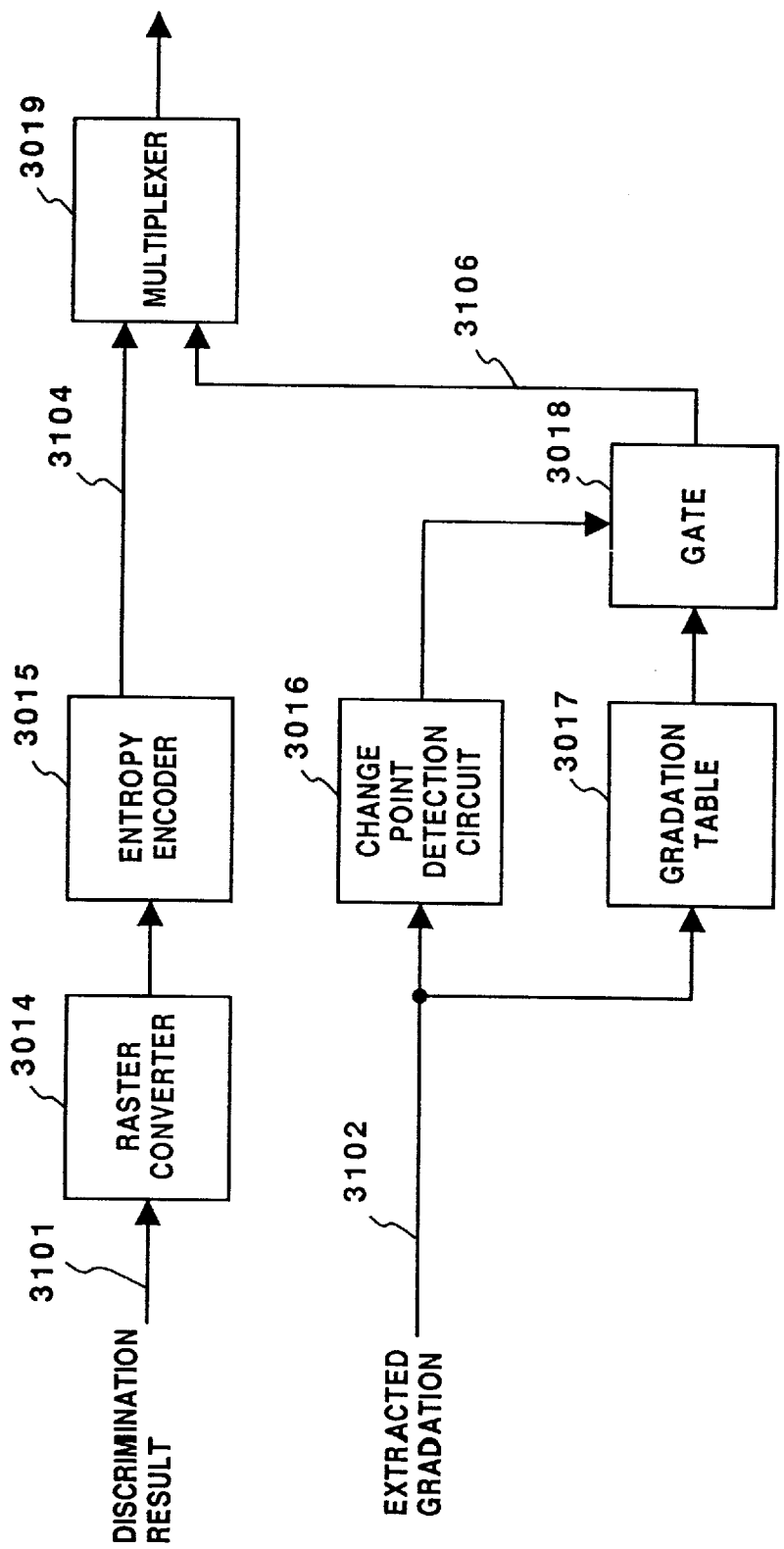
FIG. 13 is a block diagram showing the arrangement of an encoding circuit according to the second embodiment.

The detailed arrangement of the encoder 3003 for receiving the above-mentioned discrimination results and extracted gradation data will be described below with reference to the block diagram shown in FIG. 13.

As described above, the discrimination results input from the signal line 3101 are converted into raster scanning data by a raster converter 3014 to improve encoding efficiency, and the converted data are input to an entropy encoding circuit 3015. The data encoded by the entropy encoding circuit 3015 are input to a multiplexer 3019. Note that the entropy encoding circuit 3015 is a known encoding circuit suitable for encoding binary data such as arithmetic encoding, Huffman encoding, or the like.

The extracted gradation data input from a signal line 3102 are input to a change point detection circuit 3016 and a gradation table 3017. The change point detection circuit 3016 controls a gate circuit 3018, so that when input extracted gradation data is different from data of a previous block, the gate of the gate circuit 3018 is opened; otherwise, the gate is closed. When there is no extracted pixel, the same extracted gradation data is determined. When new gradation data is input, the gradation table 3017 registers the input gradation data on the table, and outputs the gradation data and corresponding index data to the gate circuit 3018. When input data has already been registered, the table 3017 does not register it, and outputs only index data to the gate circuit 3018.

Therefore, only when the extracted gradation data changes, the gate circuit 3018 inputs index data (or gradation data) corresponding to the gradation data to the multiplexer 3019. The multiplexer 3019 multiplexes the index data and the encoded discrimination result data, and transmits the multiplexed data. As a multiplexing method, the encoded discrimination result data and gradation data may be alternately transmitted in units of pages or n block lines. When data are multiplexed during transmission, the data may be stored in separate memories.

With this arrangement, transmission data can be greatly reduced. In particular, in the case of full color data, since a total of 24-bit gradation data (8 bits for each of R, G, and B data) must be transmitted, the effect is remarkable.

The detailed arrangement of the extracted pixel substitution circuit 3004 of this embodiment will be described below with reference to the block diagram shown in FIG. 14.

The extracted discrimination result data input from the signal line 3101 are input to a substitution value generator 3020 and a delay circuit 3022. Input image data input from a signal line 3103 are input to the substitution value generator 3020 and a delay circuit 3021. The substitution value generator 3020 is a circuit for generating data to be substituted with the extracted pixel data, and generates data for improving encoding efficiency when substituted image data is encoded by the encoder 3005. More specifically, the generator 3020 generates, e.g., a block mean value of pixel data excluding extracted pixels.

The delay circuits 3021 and 3022 are circuits for delaying the input image data and the extracted discrimination result data by a time necessary for generating a substitution value. The delayed signals are input to a selector 3023. The selector 3023 selects input data according to the extracted discrimination result data. That is, when the input image data is an extracted pixel, the selector 3023 selects the substitution value from the substitution value generator 3020; otherwise, it selects image data from the delay circuit 3021, thus substituting data in the extracted pixel portion.

FIG. 15 is a block diagram showing the arrangement of the synthesizer 3008. Assume that the extracted discrimination result data decoded by the decoder 3006 are input onto a signal line 3111, the extracted gradation data are input onto a signal line 3112, and the image data decoded by the decoder 3007 are input onto a signal line 3113. In FIG. 15, the extracted gradation data and image data are respectively converted into raster scanning data by raster converters 3024 and 3025, and are input to a selector 3026 while their timings are adjusted to a timing of a pixel at the same position as a pixel corresponding to the extracted discrimination result data input from the signal line 3111. When the extracted discrimination result data indicates an extracted pixel, the selector 3026 selects the extracted gradation data; otherwise, it selects image data, thus synthesizing the extracted pixel data. As a result, input image data before substitution can be restored.

As described above, according to this embodiment, efficient image data compression can be realized while maintaining quality of a character/line image.

<Modification>

A modification of the second embodiment will be described below with reference to the accompanying drawings.

Figure 16:
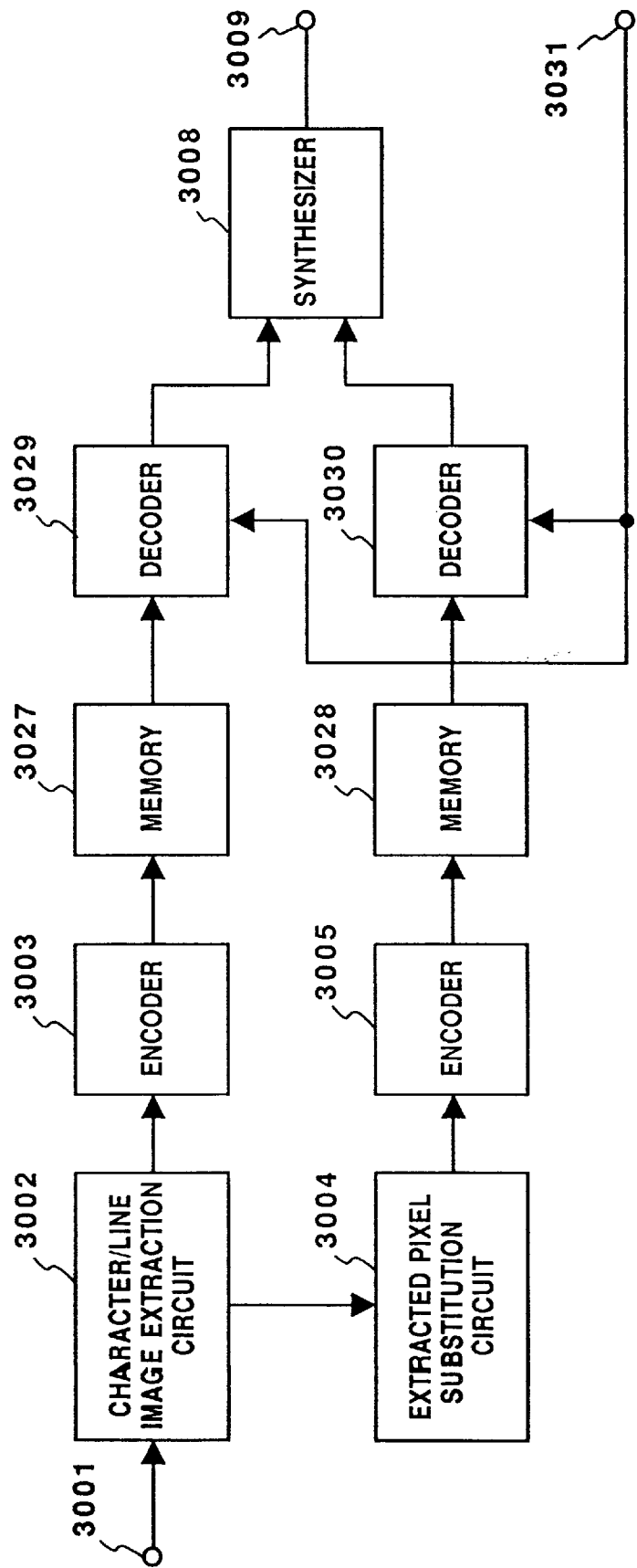
FIG. 16 is a schematic block diagram showing the arrangement of an image encoding apparatus according to a modification of the second embodiment.

FIG. 16 is a schematic block diagram showing the arrangement of an image encoding apparatus according to the modification of the second embodiment. The same reference numerals in FIG. 16 denote constituting elements having the same functions as in FIG. 10, and only a difference from the second embodiment will be described below.

As shown in FIG. 16, in this modification, the image encoding apparatus is applied to a page printer, and transmission paths 3121 and 3122 in FIG. 10 are replaced with memories 3027 and 3028, respectively. In this arrangement, data encoded by encoders 3003 and 3005 are sequentially stored in the memories 3027 and 3028, respectively. When data for one page are stored, a printer engine (not shown) is started. A sync signal (HSYNC) from the printer engine is input from an input terminal 3031, and decoders 3029 and 3030 perform decoding in synchronism with the sync signal. As a result, an image signal synchronized with the printer engine can be output from an output terminal 3009, thus executing a printing operation.

According to this modification, since character data is compressed by entropy encoding, fonts can be prevented from being blurred, and character quality can be maintained. Since character/line data which are not suitable for orthogonal transform are removed, the capacity of the memory 3028 can be greatly decreased.

<Third Embodiment>

The third embodiment of the present invention will be described below with reference to the accompanying drawings.

In an image encoding apparatus according to this embodiment, a line image portion is extracted from an original image in units of pixels, and the extracted portion is substituted with a mean value of surrounding colors. Bit map memory data corresponding to the line image portion and color information (gradation information) corresponding to the line image are encoded using orthogonal transform encoding, and encoded color information is added after DC components of the encoded block, thus compressing image information.

Figure 17:
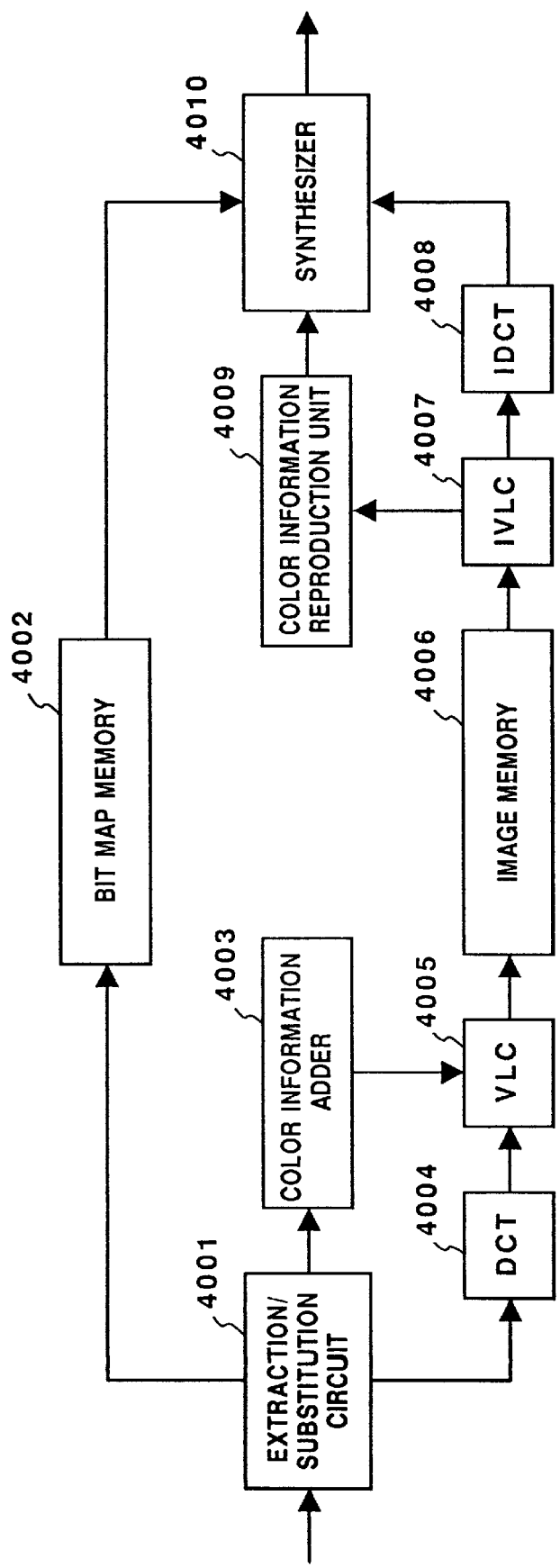
FIG. 17 is a schematic block diagram showing the arrangement of an image encoding apparatus according to the third embodiment of the present invention.

FIG. 17 is a block diagram showing the arrangement of an image encoding apparatus according to this embodiment. In FIG. 17, reference numeral 4001 denotes an extraction/substitution circuit for extracting a line image portion from an image obtained by synthesizing a natural image and a line image, and substituting the extracted portion with a mean value of surrounding colors so that the high-frequency components of frequency characteristics in an 8×8 block can be reduced. Reference numeral 4002 denotes a bit map memory for storing the extracted portion. Reference numeral 4003 denotes a color information adder for temporarily storing color information of the extracted line image portion, compressing the position information, and outputting the compressed information to a VLC 4005 (to be described later). Reference numeral 4004 denotes a DCT (Discrete Cosine Transform) for transforming 8×8 input data into spectrum data in a frequency region, and quantizing data according to quantization step information. Reference numeral 4005 denotes an encoding unit (VLC: Variable Length Code) for efficiently encoding quantized DC and AC components using variable length codes. Reference numeral 4006 denotes an image memory for storing image data compressed by the VLC 4005.

Reference numeral 4007 denotes an inverse encoding unit (IVLC: Inverse Variable Length Code) for decoding compressed image data in the frequency region to expand it into image data in an 8×8 block. Reference numeral 4008 denotes an IDCT (Inverse Discrete Cosine Transform) for restoring data in the frequency region into image data in an 8×8 block. Reference numeral 4009 denotes a color information reproduction unit for reproducing color information expanded by the IVLC 4007 in correspondence with the bit map of the extracted line image. Reference numeral 4010 denotes a synthesizer for synthesizing a full-color line image obtained by the bit map memory 4002 and the color information reproduction unit 4009, and image data obtained by the IDCT 4008.

Figure 18A:
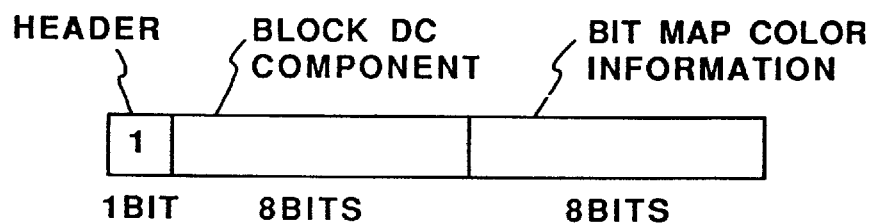
FIGS. 18A and 18B are views showing data architectures of compressed color information according to the third embodiment.
Figure 18B:
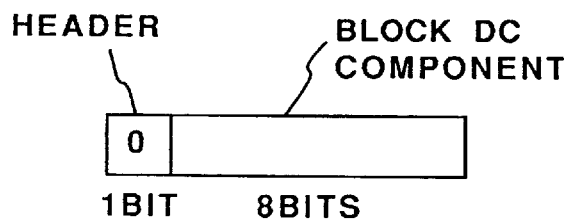

The operation of the apparatus of this embodiment with the above arrangement will be described below with reference to FIG. 17 and FIGS. 18A and 18B.

In FIG. 17, full-color data (8 bits for each of R, G, and B data) in an 8×8 block are fetched from a line buffer (not shown), and a line image portion is extracted from the input data by the extraction/substitution circuit 4001. The line image portion is extracted by edge detection and continuity detection of adjacent pixels. "1" is written at a position of the bit map memory 4002 corresponding to an extracted pixel, and "0" is written at a position of the bit map memory 4002 corresponding to a non-extracted pixel. When "1" is written in the bit map memory 4002, the color of the extracted pixel is temporarily stored in the color information adder 4003 as 8-bit data for each of R, G, and B data. When "1" is written in the bit map memory 4002, since the pixel is stored in a loss-less manner together with color information, color data of a corresponding pixel in the 8×8 block for a natural image can be any data. More specifically, the pixel extracted in the bit map memory 4002 preferentially has a color stored as the color information of the extracted pixel regardless of color data of a corresponding pixel.

In this manner, since the extracted pixel position can be replaced with any color, it is substituted with the mean value in the 8×8 block, which can be shifted in a direction to suppress high-frequency components, so as to be advantageous in compression. With this substitution, an edge conspicuous between a line image and a natural image before substitution can be eliminated, and high-frequency components are suppressed after substitution. Thus, an image, which is not almost deteriorated after high compression, and is easily compressed, can be obtained.

Then, the image data in the 8×8 block, which is easily compressed, is subjected to discrete cosine transform by the DCT 4004, thereby converting data in a real space region into data in a frequency region. The converted data in the frequency region are quantized according to quantization step information. The quantized data include DC and AC components, and are compressed by the VLC 4005. In this embodiment, the DC components are not compressed, and are stored as 8-bit data per color of R, G and B. The AC components are converted into variable length codes based on a Huffman code table. Since block DC components are stored in units of 8×8 blocks, a header is added to the beginning of the block DC components, and bit map color information is added, as shown in FIGS. 18A and 18B.

In this embodiment, color information is compressed by a method of storing a color at a color change position in consideration of the continuity of a line image, i.e., the fact that the color of a line image does not so frequently change. Therefore, when bit map color information of a line image changes, as shown in FIG. 18A, "1" is set in a header, and the 8-bit color information is added after the block DC components. When the color does not change, "0" is set in the header, and no data is added after the block DC components.

With this format, color information can be compressed to about 1/10 to 1/50 in consideration of continuity of bit map data. In this case, the data architecture in an 8×8 block for, e.g., an R (red) color has been described. The same applies to G (Green) and B (Blue). In this manner, compressed data in the frequency region are processed in units of 8×8 blocks, and are stored in the image memory 4006.

When image data is reproduced, the IVLC 4007 performs an operation opposite to that of the VLC 4005. More specifically, the DC and AC components are expanded for each color. The IDCT 4008 performs an operation opposite to that of the DCT 4004. More specifically, the data in the frequency region are converted into R, G, and B 8-bit data in the real space region in an 8×8 block. When "1" is set in the header of the DC component data in the IVLC 4007, bit map color information (8-bit data) is supplied to the color information reproduction unit 4009.

Every time 8-bit data is supplied from the IVLC 4007, the color information reproduction unit 4009 updates color information data, and latches the input data until the next data is supplied. The synthesizer 4010 for synthesizing an image overwrites line image information on the image data in the IDCT 4008. In a method of overwriting the line image information, information indicating whether or not a pixel corresponds to a line image is read out from the bit map memory 4002. When the information is "1", it is determined that the pixel corresponds to the line image, and color information of the line image is read out from the color information reproduction unit 4009, and image data at a predetermined position is written. In this case, image data processed in units of 8×8 blocks are supplied to and output by an output apparatus such as a printer through a line buffer (not shown).

In this embodiment, the memory capacity can be saved with a simple arrangement, and encoding efficiency can be improved.

<Modification>

A modification of this embodiment will be described below with reference to FIG. 19 and FIGS. 20A and 20B.

Figure 19:
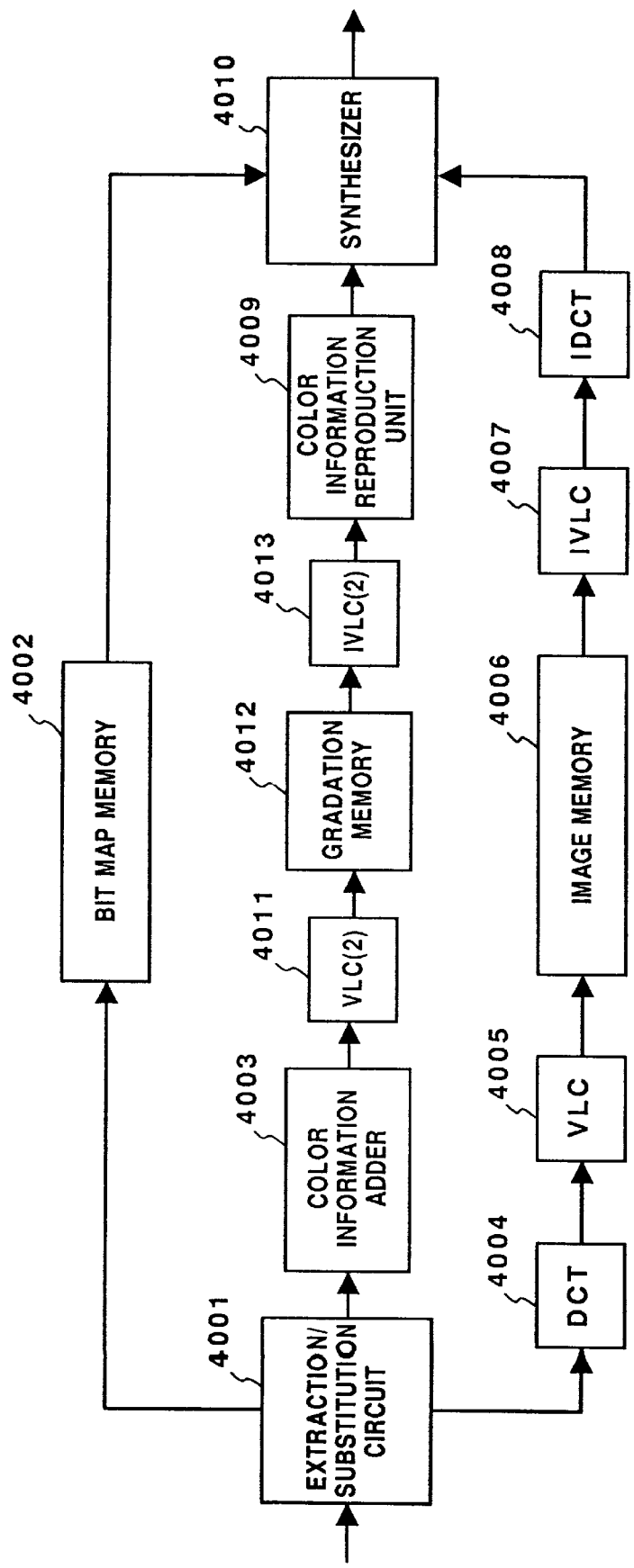
FIG. 19 is a block diagram showing the arrangement of an image encoding apparatus according to a modification of the third embodiment.

The same reference numerals in FIG. 19 denote the parts having the same functions as in the above embodiment, and a detailed description thereof will be omitted.

Figure 20A:
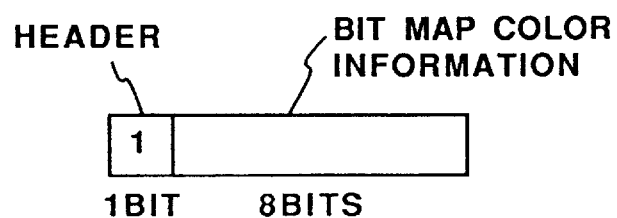
FIGS. 20A and 20B are views showing data architectures of compressed color information according to the modification of the third embodiment.
Figure 20B:
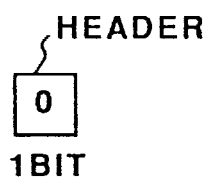

As shown in FIG. 19, an image encoding apparatus according to this modification comprises a gradation memory 4012, and color information added by the color information adder 4003 has a format, as shown in FIGS. 20A and 20B. More specifically, in the above embodiment, color information is added to DC components of image data, as shown in FIGS. 18A and 18B. However, in this modification, when bit map color information changes, "1" is set in a header, and bit map color information is added before the header. However, when the color information does not change, "0" is set in the header, and no bit map color information is added. This color information is compressed by a VLC (2) 4011, and the compressed information is stored in the gradation memory 4012. The compressed information is expanded by an IVLC (2) 4013.

According to this modification, the capacity of the gradation memory 4012 can be greatly reduced with a simple arrangement in consideration of continuity of a line image.

In the above embodiment, an 8×8 block consists of R, G, or B 8-bit data. However, the present invention is not limited to this. Color component signals are not limited to R, G, and B signals, but may be Y, M, and C signals, L*, a*, and b* signals, Y, I, and Q signals, Y, U, and V signals, and the like.

Furthermore, the orthogonal transform is not limited to the DCT, but may be Hadamard transform or discrete sine transform.

<Fourth Embodiment>

Figure 21:
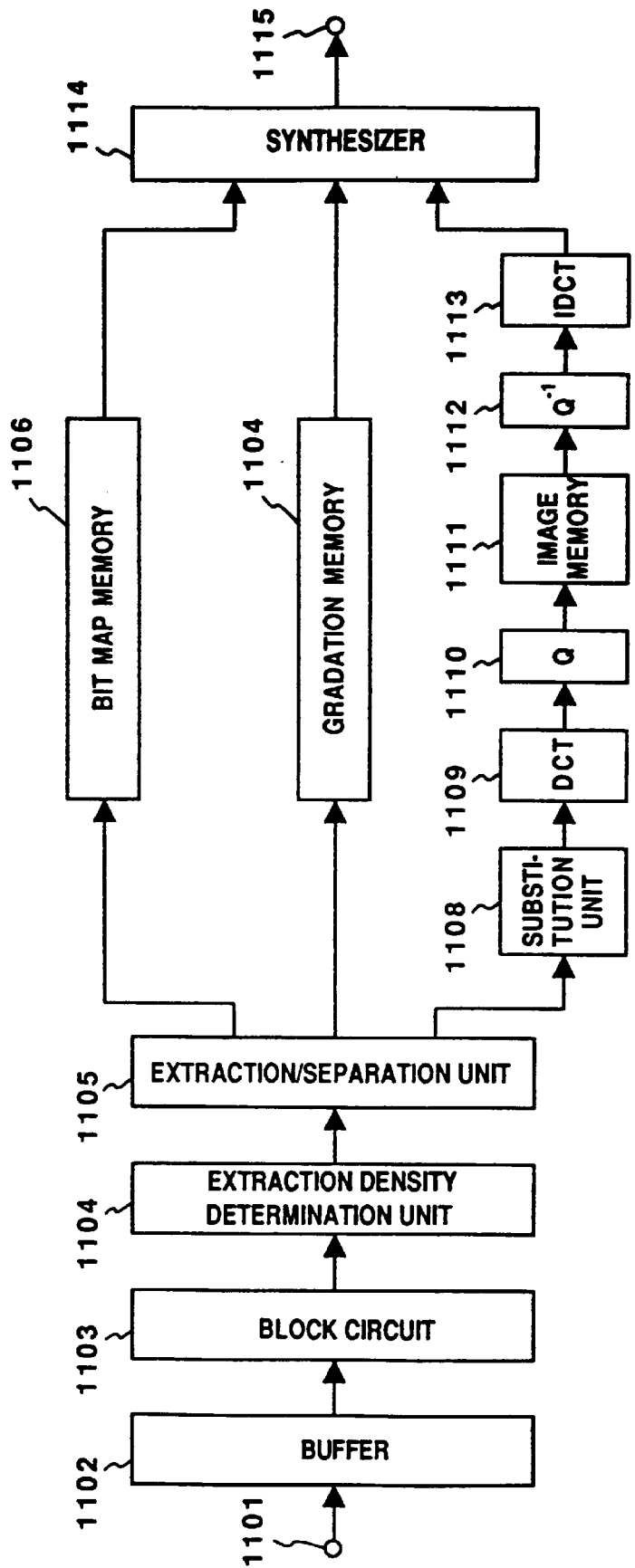
FIG. 21 is a schematic block diagram showing the arrangement of an image encoding apparatus according to the fourth embodiment of the present invention.

FIG. 21 is a block diagram showing an image output apparatus according to the fourth embodiment of the present invention. In this embodiment, a printer or the like will be exemplified as the image output apparatus.

In FIG. 21, an input terminal 1101 (corresponding to an I/O in the printer) is connected to another external apparatus such as a host computer or an image input apparatus, e.g., an image scanner. The input terminal 1101 receives not only natural image information such as a photograph input from the image input apparatus but also various images, which are edited or processed by a host computer, or in which an artificially formed character/line image is synthesized on a natural image.

Input image information is temporarily stored in a buffer 1102 comprising line buffers for several lines. The buffer is required to have a capacity corresponding to the number of lines or more used for a "block" to be described later.

The image information stored in the buffer 1102 is divided into color blocks by a block circuit 1103. This block preferably has the same size as that of a block in orthogonal transform such as DCT (discrete cosine transform; to be described later) in terms of the arrangement of the apparatus. Thus, in this embodiment, a 4×4 block will be exemplified below for the sake of simplicity.

An extraction density determination circuit 1104 determines a density to be extracted for divided 4×4 pixel blocks.

In a conventional printer, since density information of a character/line image is predetermined upon extraction of the character/line image, an image in a block is scanned to extract only a pixel having a corresponding density. For example, when the density level varies between 0 and 255, black is determined as "1255".

However, in consideration of the fact that character/line image density information is transmitted in the same format as image information, the printer must scan an image in a block once or a plurality of number of times so as to determine a portion of a specific density to be extracted, i.e., density information to be extracted.

An algorithm for determining an extraction density in this embodiment will be described in detail below.

Figure 22:
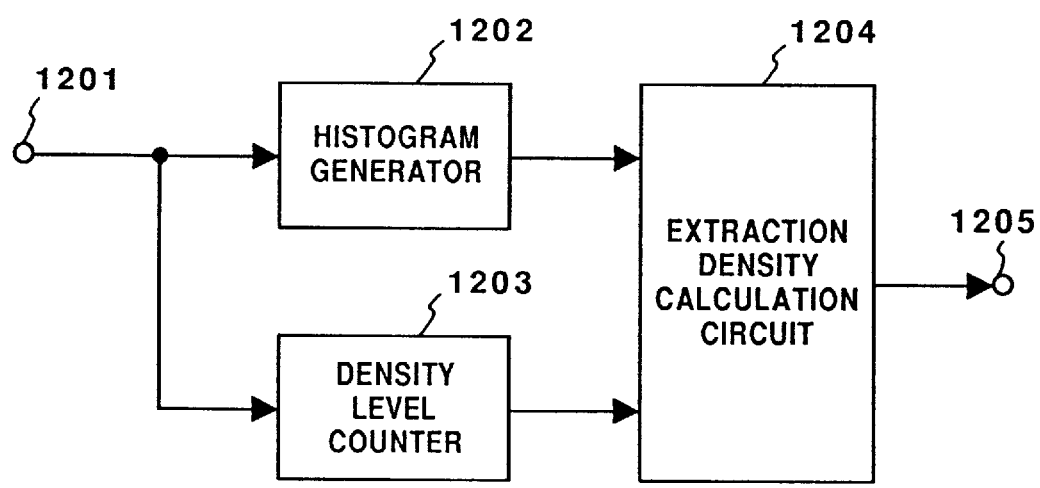
FIG. 22 is a block diagram showing the arrangement of an extraction density determination unit according to the fourth embodiment.

FIG. 22 is a functional block diagram showing an arrangement of the extraction density determination unit 1104 shown in FIG. 21. In FIG. 22, density levels obtained by sequentially scanning pixels in a block are input to an input terminal 1201. The density levels are input to a histogram generator 1202. The histogram generator 1202 stores the frequencies of density levels generated for input image information, and forms a histogram. In this embodiment, since the number of scanning pixels in the block is 16, the number of types of density levels in the block is also a maximum of 16.

Figures 23A, 23B:
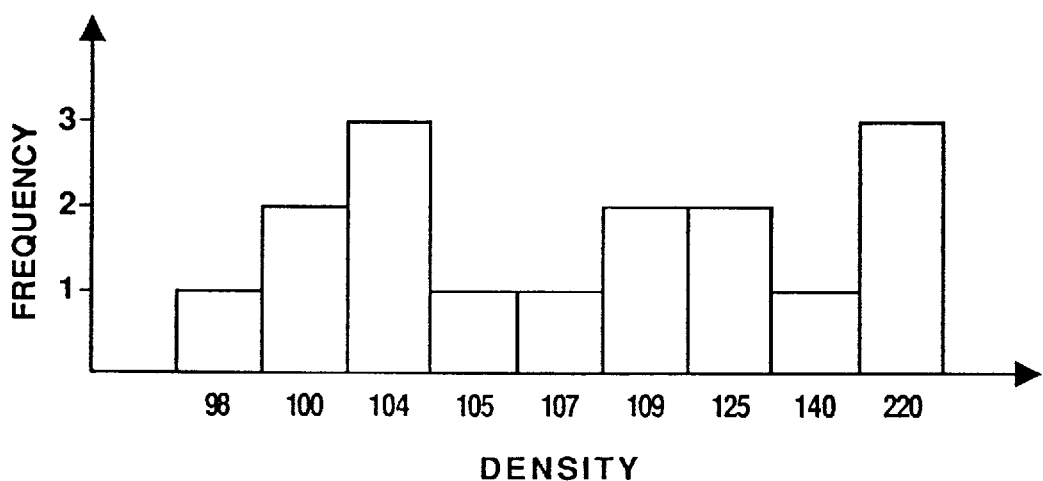
FIGS. 23A and 23B respectively show an extracted block, and a histogram formed based on the extracted block according to the fourth embodiment.

FIG. 23A shows an example of a "block", and FIG. 23B shows a histogram formed based on this block. The number of density levels in this block is 9, and the density levels "104" and "220" have the maximum frequency corresponding to three pixels.

A density level counter 1203 obtains a total sum of input density levels. In this embodiment, since the number of pixels in the block is 16, a 12-bit counter can be quite enough. The processing results for 16 pixels from the histogram generator 1202 and the density level counter 1203 are input to an extraction density calculation circuit 1204.

The extraction density calculation circuit 1204 will be described in detail below.

Figure 24:
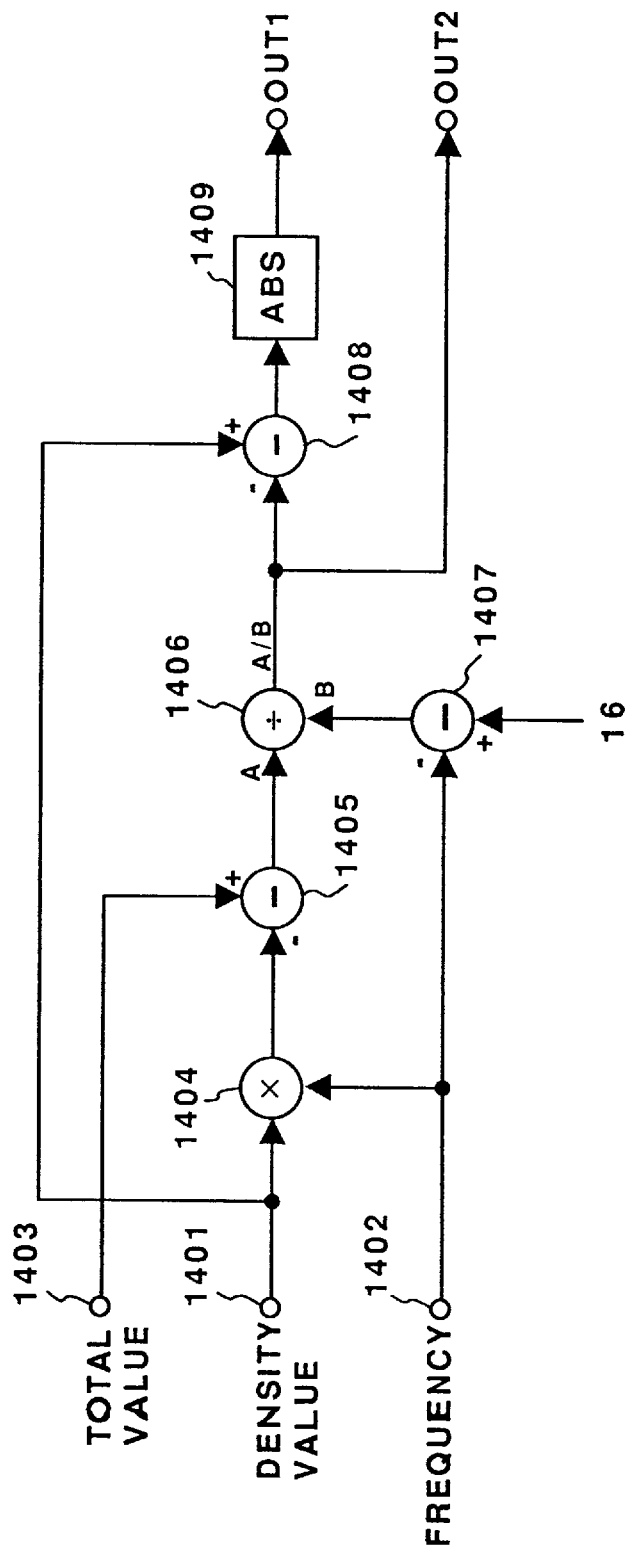
FIG. 24 is a detailed block diagram of an extraction density calculation circuit according to the fourth embodiment.

FIG. 24 is a detailed block diagram of the extraction density calculation circuit. In FIG. 24, input terminals 1401 and 1402 respectively receive the density values and the frequencies of the density levels from the histogram generator 1202 shown in FIG. 22. More specifically, the density values and frequency values of the nine density levels from "98" to "220" shown in FIG. 23A are sequentially input to these input terminals. An input terminal 1403 receives the total sum of the density levels in the block obtained by the density level counter 1203 shown in FIG. 22.

A multiplier 1404, a divider 1406, subtracters 1405, 1407, and 1408, and an ABS (absolute value) circuit 1409 perform the following calculations to obtain output values OUT1 and OUT2.

$$OUT1 = |D - \{T - (D \times M)\}/(16-m)| \quad (1)$$

$$OUT2 = \{T - (D \times M)\}/(16-M) \quad (2)$$

where

D: density value

M: frequency

T: total sum of density levels

FIG. 25 shows output values (OUT1) calculated by the extraction density calculation circuit 1204 in FIG. 24 on the basis of the density values and frequency values shown in FIGS. 23A and 23B. Note that these values are obtained by rounding fractions below the decimal point. In this case, an extraction density is determined as a density level for maximizing the value OUT1, i.e., "220".

As described above, after a pixel value to be extracted in a block is determined by the extraction density determination unit 1104 shown in FIG. 21, an extraction/separation unit 1105 separates the corresponding pixel.

In this embodiment, since the extraction density in a block has the same value, as described above, resolution information after extraction is stored in a bit map memory 1106, as shown in FIG. 26A. The extracted density level "220" is stored in a gradation memory 1107.

Information in the block after extraction is substituted with a new value by a substitution unit 1108. More specifically, a substitution value, which can improve the compression rate and can decrease distortion, is substituted with the extracted pixel, so as to facilitate the following processing of a DCT 1109 and a Q 1110.

Generally, when an artificially formed character/line image is substituted in an image such as a natural image, the number of high-frequency components is increased in an orthogonal transform space, and AC power is increased due to the magnitude of an edge. Thus, as the substitution value, a mean value of pixels other than the extracted pixel is selected to effectively decrease AC power. The mean value of pixels other than the extracted pixel corresponds to the value OUT2 shown in FIG. 24.

After all, the above-mentioned extraction density determination unit 1104 determines an extraction density using an evaluation parameter for minimizing a difference ($P_1-P_2$) between the total sum ($P_1$) of AC power obtained when orthogonal transform is performed without extracting an extraction density, and the total sum ($P_2$) of AC power obtained when an extraction density is extracted, the substitution value is substituted, and thereafter, orthogonal transform is performed.

The above-mentioned processing will be described below with reference to FIG. 23A. When the density level "220" is selected, the difference between this density level and a mean value (OUT2="110" in this case) of pixels other than "220" becomes maximum. For this reason, as shown in FIG. 26B, the density level "110" is substituted in pixel positions where the level "220" was present. More specifically, with this substitution, the total sum of AC power can be greatly decreased as a whole as compared to the orthogonal transform in the state of FIG. 23A, and the AC power of high-frequency components can also be decreased.

Image information substituted by the substitution unit 1108 is subjected to discrete cosine transform by the DCT 1109 and is quantized by the Q 1110. The quantized information is stored in an image memory 1111. Decoding is executed by inversely quantizing the information stored in the image memory 1111 by a $Q^{-1}$ 1112, and expanding the inversely quantized information by an IDCT 1113.

In a synthesizer 1114, a pixel corresponding "1" in the bit map memory 1106 is synthesized with the density level stored in the gradation memory 1107, and a pixel corresponding to "0" is synthesized with information stored in the image memory 1111. Thus, the synthesized information is output from an output terminal 1115.

In this manner, when a character/line image included in an image such as a natural image and artificially generated by, e.g., a computer, is separated, and different encoding operations are performed for these separated images, even if density information of the character/line image is unknown, the density of pixels to be extracted and separated is determined in a block extracted from image information. When a density is substituted in the extracted pixels, the character/line image can be extracted, and encoding efficiency can be improved. In addition, deterioration of image quality can be suppressed in not only the extracted pixel portion but also the remaining portion.

Especially in a computer image, since character/line image data included in a block often have substantially the same color (gradation data), the above-mentioned extraction method is effective.

<Fifth Embodiment>

The fifth embodiment of the present invention will be described below.

Figure 27:
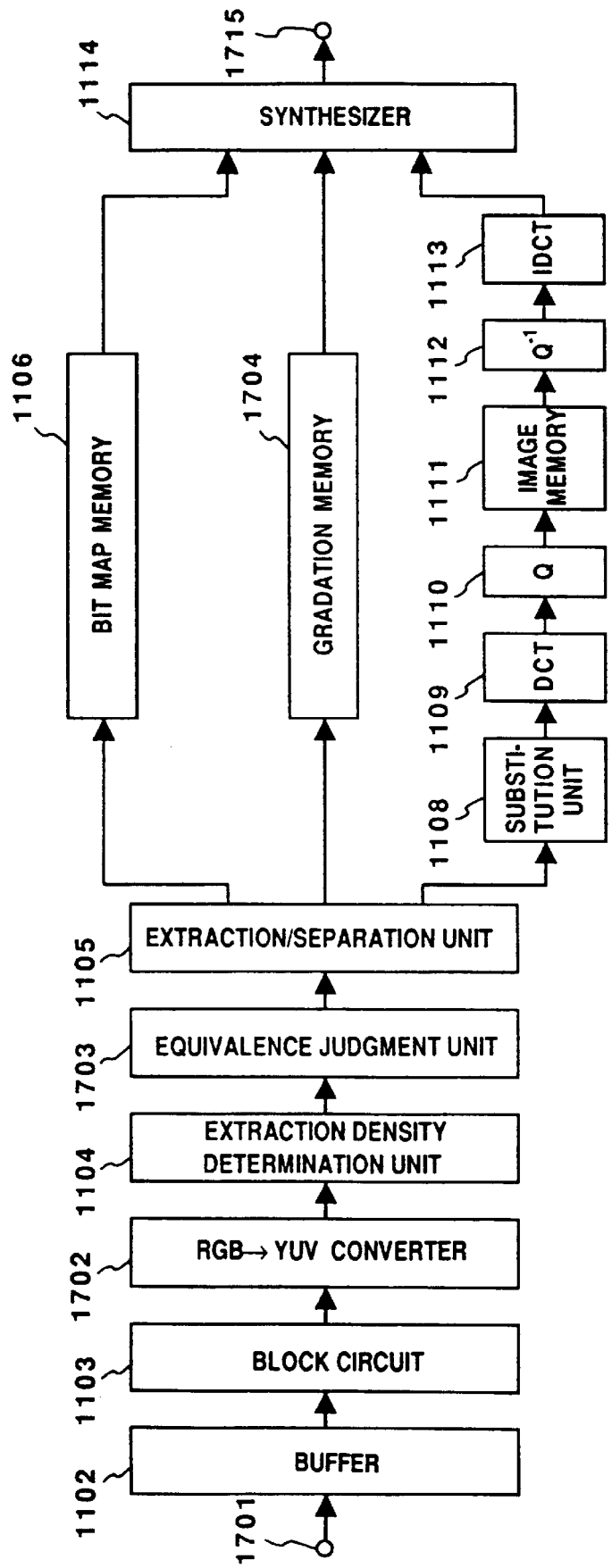
FIG. 27 is a schematic block diagram showing the arrangement of a color encoding apparatus according to the fifth embodiment of the present invention.

FIG. 27 is a block diagram showing the arrangement of a color encoding apparatus according to the fifth embodiment of the present invention. The same reference numerals in FIG. 27 denote the same parts as in the image output apparatus according to the fourth embodiment shown in FIG. 21, and a detailed description thereof will be omitted.

In FIG. 27, R, G, and B 8-bit image data are input from an input terminal 1701 in a pixel-sequential manner. A buffer 1102 comprises line buffers for several lines for each color, and a block circuit 1103 divides image data into blocks in units of colors. An RGB→YUV converter 1702 converts an RGB color coordinate system into a YUV color coordinate system. The RGB→YUV conversion is performed using conversion coefficients shown in the following equation (3), and the fractions of calculated Y, U, and V data are omitted to fall within 8-bit data.

$$\begin{bmatrix} Y \\ U \\ V \end{bmatrix} = \begin{bmatrix} 0.299 & 0.587 & 0.114 \\ -0.169 & -0.3316 & 0.5 \\ 0.5 & -0.4186 & -0.0813 \end{bmatrix} \begin{bmatrix} R \\ G \\ B \end{bmatrix} \quad (3)$$

In the color encoding apparatus of this embodiment, three blocks, i.e., Y, U, and V blocks are generated at the same position in a real space. In this case, an extraction density of the Y block is determined by an extraction density determination unit 1104 first. The determination algorithm of the extraction density is the same as that in the fourth embodiment, and a detailed description thereof will be omitted.

When the density level to be extracted from the Y block is determined, an equivalence judgment unit 1703 judges whether or not pixels indicated by the determined density level have the same value in each of the U and V blocks (i.e., judges an equivalence condition). This judgment will be explained below with reference to blocks shown in FIGS. 28A to 28C.

The block shown in FIG. 28A shows density levels of blocks extracted from image information in the form of a block like in FIG. 23A. Note that FIGS. 28A, 28B, and 28C respectively show Y, U, and V blocks at the same position in the real space. In FIG. 28A, a density level "220" is extracted, as has been described in the calculation for FIG. 23A. In the color encoding apparatus of this embodiment, the equivalence judgment unit 1703 judges whether or not pixels at addresses corresponding to "220" in FIG. 28A in each of the U and V blocks, i.e., pixels "38" in the U block and pixels "62" in the V block are equal to each other. Needless to say, both the blocks shown in FIGS. 28B and 28C satisfy the equivalence condition.

If it is determined that a predetermined pixel does not satisfy the above-mentioned equivalence condition in an extracted block, it is determined that a portion to be extracted is not in a single color, and extraction/separation is inhibited. However, if it is determined in equivalence judgment that the equivalence condition is satisfied, an extraction/separation unit 1105 extracts/separates corresponding pixels. The extracted three pieces of color information corresponding to three colors Y, U, and V are stored in a gradation memory 1704 as 24-bit information.

In this manner, the density of pixels to be extracted/separated is determined in a block extracted from full-color image information in units of colors, and a density is substituted in these pixels. Thus, a color line image or color character synthesized in full-color image information can be extracted. As a result, the same colors can be maintained, and efficient encoding can be realized.

In the fifth embodiment, a description has been made based on the YUV color coordinate system. However, color components are not limited to Y, U, and V, but may be R, G, and B or various other color components.

Color coordinate conversion from the RGB system to the YUV system may be performed using an LUT (look-up table) in addition to the above-mentioned calculation.

The fourth and fifth embodiments may be applied to either a system consisting of a plurality of apparatuses such as a scanner, an interface, a printer, and the like, or an apparatus consisting of a single apparatus such as a copying machine. The above embodiments may also be applied to a case wherein the system or apparatus is realized by supplying a program stored in, e.g., a floppy disk, an IC card, or the like thereto.

In this manner, even when density information of a character/line image to be separated from a multi-value image is unknown, a density of pixels to be extracted is determined in an extracted predetermined block, the pixels are separated, and the density level is substituted. Thus, a multi-value image can be efficiently encoded.

In addition, not only a halftone black character/line image but also a character/line image in a single color in full-color image information can be extracted, and image quality of an extracted portion can be prevented from being deteriorated.

<Sixth Embodiment>

Figure 29:
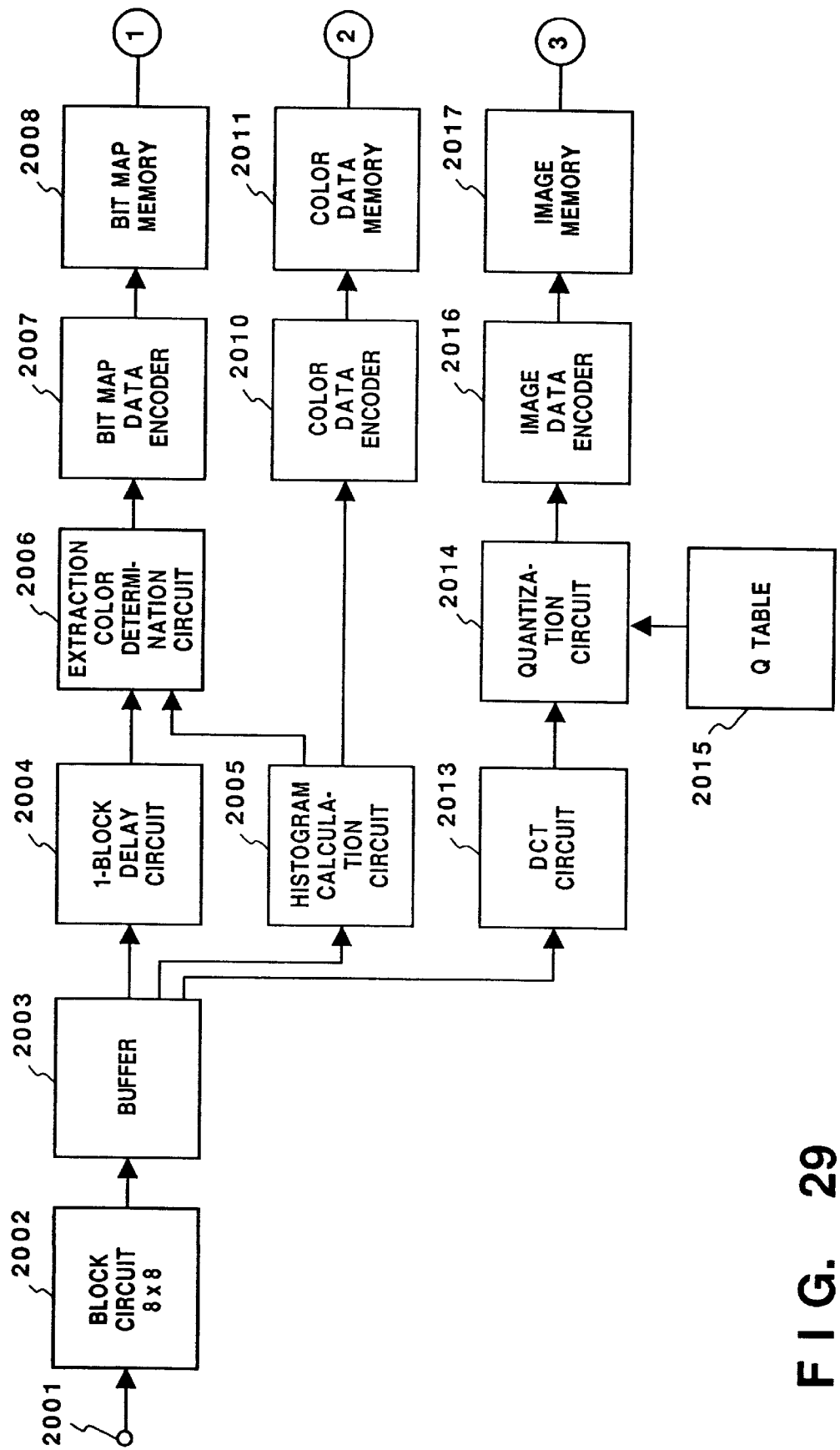
FIGS. 29 and 30 are block diagrams showing the arrangement of an image encoding apparatus according to the sixth embodiment of the present invention.
Figure 30:
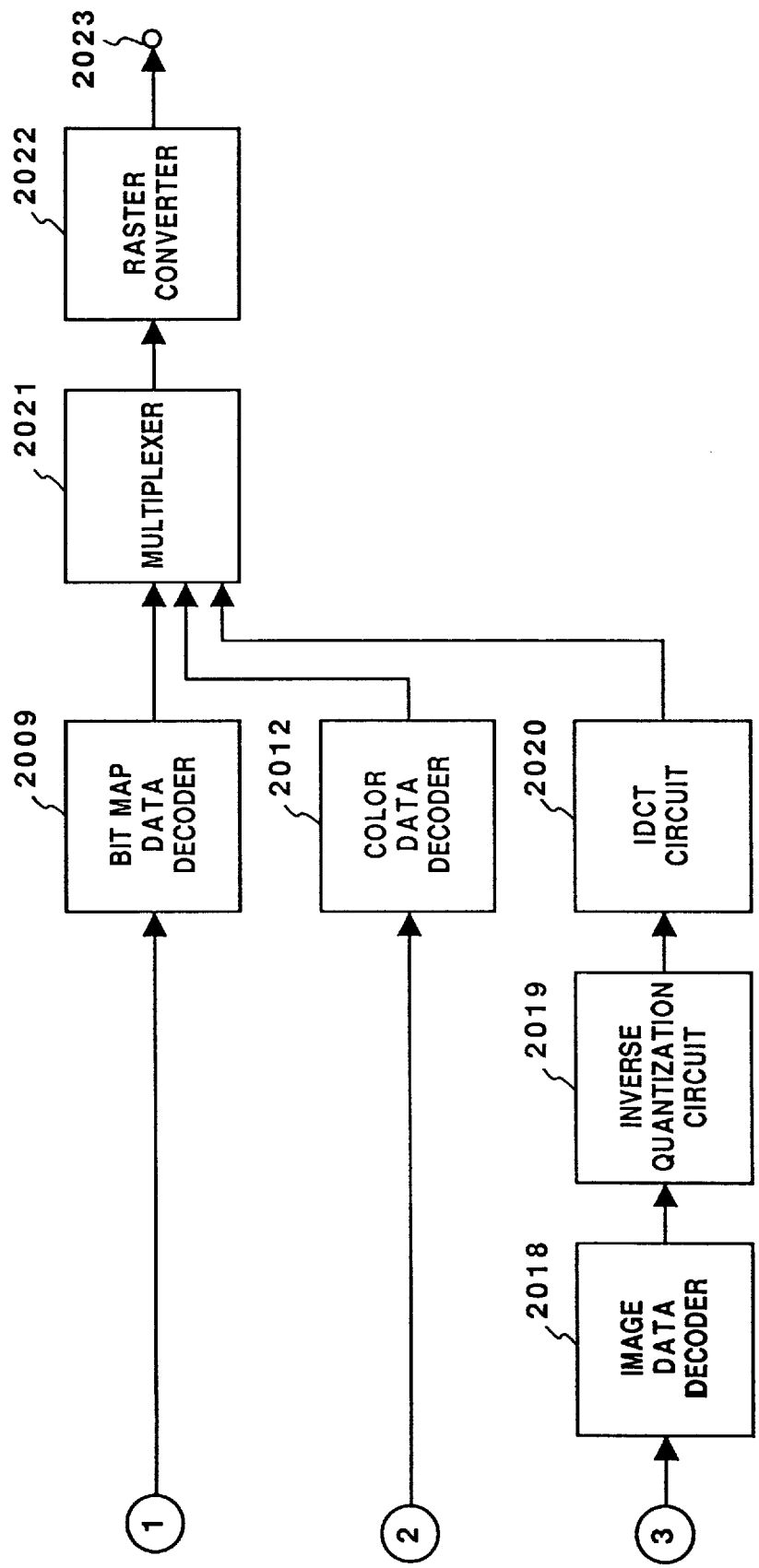

FIGS. 29 and 30 are block diagrams showing the arrangement of an image encoding apparatus according to the sixth embodiment. First, a process from an input operation of image information to a storage operation to memories will be described below with reference to FIG. 29.

Image information including both a multi-value image such as a natural image and a character or line image is input from, e.g., a host computer to an input terminal 2001. The input image information is divided into blocks consisting of 8×8 pixels by a block circuit 2002, and the divided blocks are stored in a buffer 2003. The image information stored in the buffer 2003 is input to a histogram calculation circuit 2005, and the histogram of a total of 64 pixel data is calculated. Pixel data corresponding to the maximum frequency in the histogram is supplied to an extraction color determination circuit 2006.

One image information block is delayed by a scan time by a one-block delay circuit 2004 in correspondence with a processing time in the histogram calculation circuit 2005, and the delayed block is input to the extraction color determination circuit 2006. The extraction color determination circuit 2006 compares the input image information with pixel data corresponding to the maximum frequency of the histogram in units of pixels. When a coincidence is found between the two pixels, the circuit 2006 sets the corresponding pixel to be "1", and supplies it to a bit map data encoder 2007. However, when the two pixels do not coincide with each other, the circuit 2006 sets the corresponding pixel to be "0", and supplies it to the bit map data encoder 2007. The binary image data supplied to the bit map data encoder 2007 are reversibly encoded, and the encoded results are stored in a bit map memory 2008.

The density data calculated by the histogram calculation circuit 2005 is supplied to the extraction color determination circuit 2006, and is also supplied to a color data encoder 2010. The density data is reversibly encoded by the encoder 2010, and the encoded result is stored in a color data memory 2011.

On the other hand, a DCT (discrete cosine transform) circuit 2013 performs DCT of image information read out from the buffer 2003, and the transformed image information is quantized by a quantization circuit 2014 using a Q table. The quantized image information is non-reversibly encoded by an image data encoder 2016, and is stored as a compressed image in an image memory 2017.

A process until image information stored in the memories is output to an output device will be described below with reference to FIG. 30.

The binary data such as a character/line image stored in the bit map memory 2008 are decoded by a bit map data decoder 2009, and the decoded data are supplied to a multiplexer 2021. The color information stored in the color data memory 2011 is decoded by a color data decoder 2012, and the decoded information is supplied to the multiplexer 2021. The image information stored in the image memory 2017 is decoded by an image data decoder 2018, and the decoded image information is inversely quantized by an inverse quantization circuit 2019. The inversely quantized image information is supplied to an IDCT (inverse discrete cosine transform) circuit 2020. The image information subjected to IDCT is supplied to the multiplexer 2021.

In the multiplexer 2021, the character/line image pixel portion (binary data "1") supplied from the bit map data decoder 2009 is converted to the value of the color information supplied from the color data decoder 2012, e.g., 24-bit image information per pixel. The image information is compared with the image information supplied from the IDCT circuit 2020. In a pixel portion where the image data from the bit map data decoder 2009 is "1", image data from the color decoder 2012 is selected; in a pixel portion where the image data from the bit map data decoder 2009 is "0", image data from the IDCT circuit 2020 is selected. The selected image data are multiplexed, and the multiplexed data are supplied to a raster converter 2022. The image information supplied to the raster converter 2022 is raster-converted, and thereafter, is output to an output device (not shown), e.g., a page printer from an output terminal 2023.

In this embodiment, input image data is full-color data having, e.g., R, B, and B 8-bit gradation data, and is divided into blocks for each of R, G, and B. The divided image data are stored in the corresponding buffers. A histogram is calculated in units of buffers, i.e., in units of R, G, and B colors, and extraction colors are determined. The extraction pixel regions and extraction colors (color data) obtained in correspondence with R, G, and B are multiplexed by a multiplexer (not shown). The extraction pixel region is reversibly encoded as a binary image by the bit map data encoder 2007, and the encoded data is stored in the bit map memory 2008. The 24-bit one full-color data per block is reversibly encoded by the color data encoder 2010, and the encoded data is stored in the color data memory 2011.

Note that input image data is not limited to R, G, and B data, but may be, e.g., L*, a*, and b* data or Y, U, and V data. When the input image data are R, G, and B data, the RGB system may be converted into the YUV system.

Furthermore, in this embodiment, processing is performed in units of R, G, and B planes. However, this embodiment is not limited to this, and R, G, and B data may be simultaneously processed as 24-bit data.

The calculation processing in the histogram calculation circuit 2005 described above will be described below with reference to the flow charts shown in FIGS. 31A to 31C.

Figure 31A:
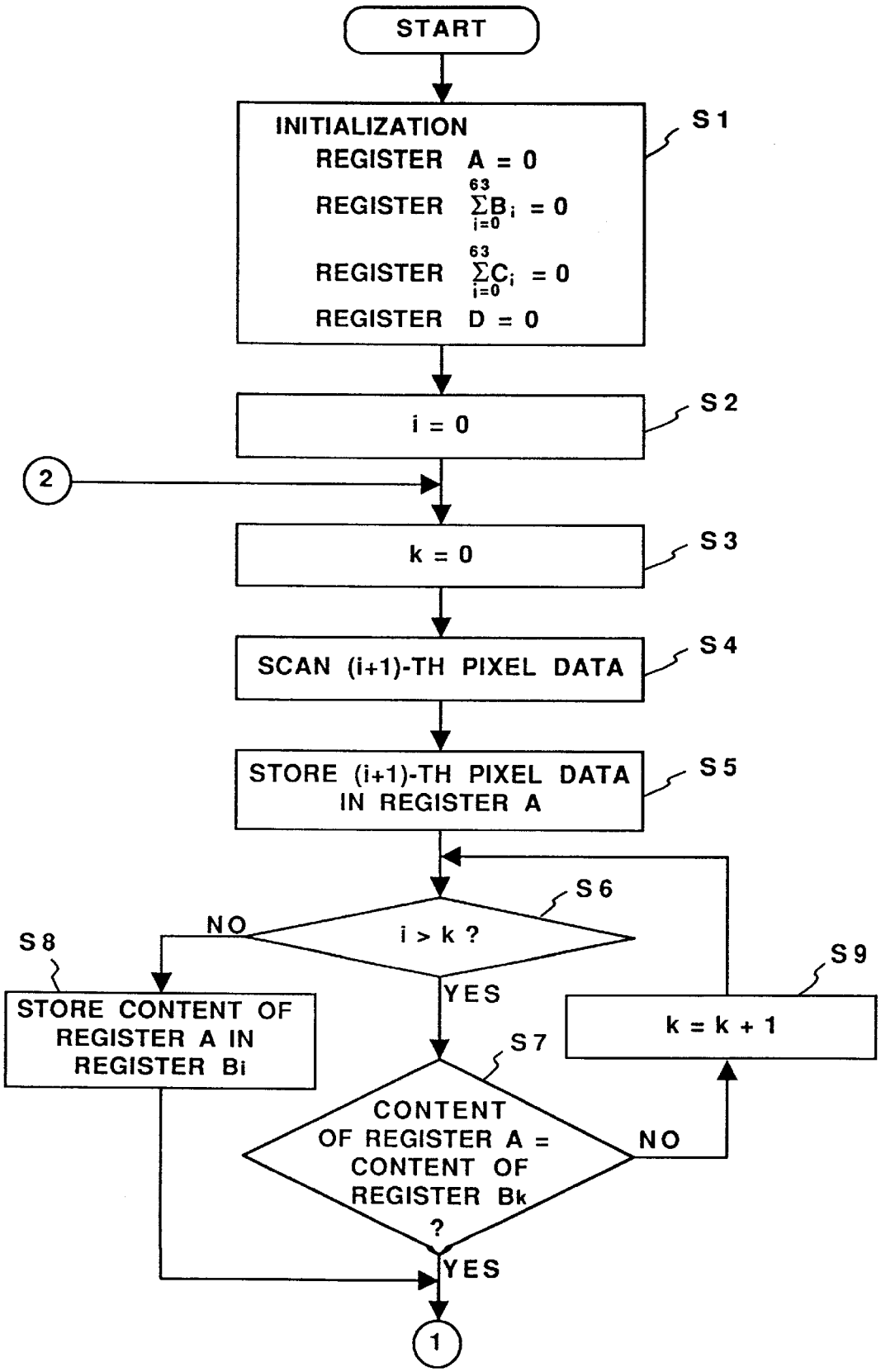
Figure 31B:
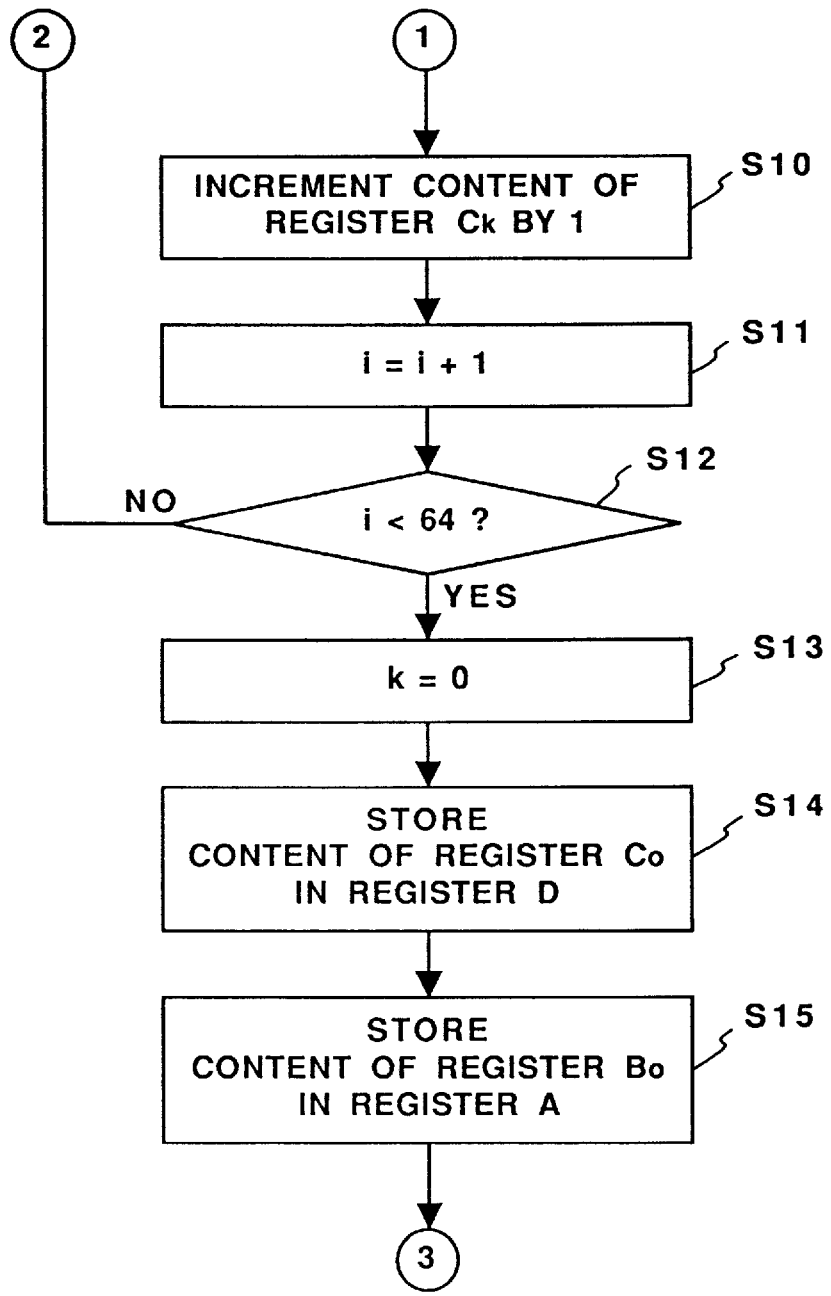

In step S1 in FIG. 31A, a total of 130 registers, i.e., registers A, $B_0$, $B_1$, ..., $B_{63}$, $C_0$, $C_1$, ..., $C_{63}$, and D are initialized to "0". The register A temporarily stores fetched pixel data, the registers $B_n$ (n=0 to 63) store pixel data having different densities, and the registers $C_m$ (m=0 to 63) are used for counting histogram values of pixel data stored in the registers $B_n$. The register D stores the maximum value of the histogram.

In steps S2 and S3, i=0 and k=0 are set. In steps S4 and S5, an (i+1)-th pixel in an 8×8 block is fetched, and is stored in the register A. In steps S6, S7, and S9, it is checked if there are pixel data having the same density as the content of the register A in pixel data up to i-th pixel data. More specifically, in step S6, i is compared with k. If i>k, the flow advances to step S7 to check if the content of the register A is equal to the content of the register $B_k$. If the contents of the two registers are not equal to each other, the flow advances to step S9, and k is incremented by 1. The flow then returns to step S6, and the above-mentioned processing is repeated. However, if the contents of the two registers are equal to each other, the flow advances to step S10 in FIG. 31B, and the content of the histogram register $C_k$ is incremented by 1.

On the other hand, if it is determined in step S6 that i=k, the flow advances to step S8, and the (i+1)-th pixel data is newly stored. More specifically, the content of the register A is stored in the register $B_i$. In step S10, the content of the histogram register $C_k$ corresponding to the pixel data is incremented by 1. In step S11, i as an index of pixel data is incremented by 1. In step S12, it is checked if processing is completed for one block (64 pixel data). If NO in step S12, the flow returns to step S3, and histogram generation processing is repeated.

Thereafter, when a histogram for 64 pixels is formed (i=64), the flow advances to step S13 to obtain the maximum value of the histogram.

In step S13, the index k is initialized to "0", and in steps S14 and S15, the contents of the registers $C_0$ and $B_0$ are respectively stored in the registers D and A. In step S16 in FIG. 31C, k is incremented by 1. In step S17, it is checked if k<64, thereby checking if processing is completed for all the pixels. If it is determined that the processing is being executed (k<64), the flow advances to step S18 to compare the contents of the registers D and $C_k$. If the content of the register $C_k$ is equal to or smaller than the content of the register D ($D \geq C_k$), the flow returns to step S16. However, if the content of the register $C_k$ is larger than the content of the register D ($D<C_k$), the flow advances to step S19, and the content of the register $C_k$ is stored in the register D. In step S20, the content of the register $B_k$ as the density of the corresponding pixel data is stored in the register A, and the flow returns to step S16.

Upon repetition of the above-mentioned processing, when the processing is completed for pixel data in one block, the flow advances from step S17 to step S21, and the content of the register A, i.e., the pixel data having a density corresponding to the maximum value of the histogram is supplied to the extraction color determination circuit 2006 and the color data encoder 2010.

In this manner, according to this embodiment, image quality of a character/line image can be prevented from being deteriorated, and efficient image data compression can be performed.

<Modification>

A modification of the sixth embodiment of the present invention will be described below with reference to the accompanying drawings.

Figure 32:
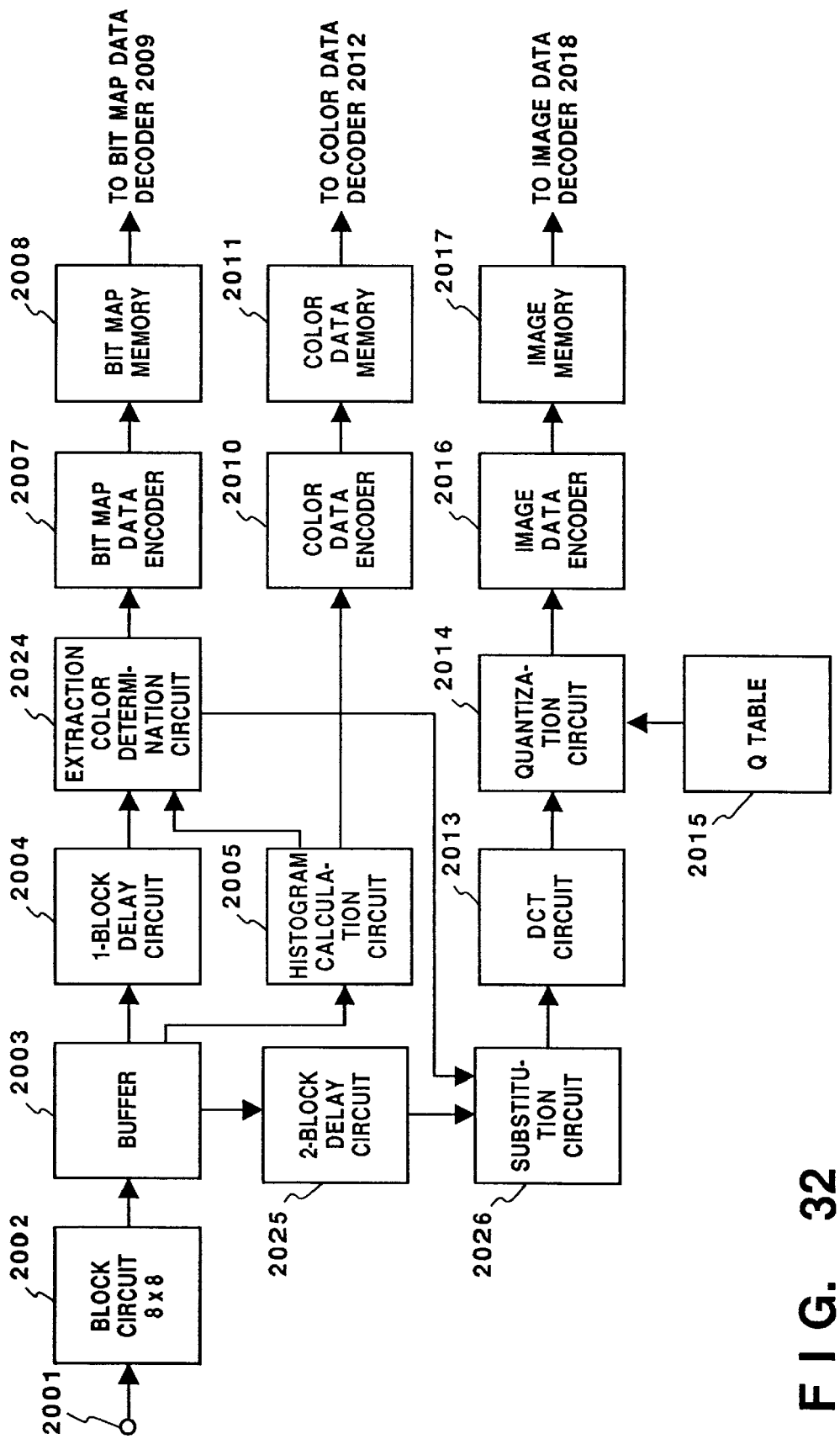
FIG. 32 is a block diagram showing the arrangement of the first half portion of an image encoding apparatus according to a modification of the sixth embodiment.

FIG. 32 is a block diagram showing the arrangement of the former half portion of an image encoding apparatus of this embodiment. Note that the arrangement of the latter half portion is the same as that shown in FIG. 30. The same reference numerals in FIG. 30 denote blocks having the same functions as in the above embodiment. In this modification, a function of performing substitution for an extracted portion of a non-extracted image is added to the above embodiment.

FIGS. 33 to 35 show extracted and non-extracted images for one block. FIG. 33 shows an original image before extraction, FIG. 34 shows an extracted image, and FIG. 35 shows a non-extracted image. The extracted portion (blank portion) in FIG. 35 is substituted with another image, as shown in FIG. 36.

A process from an input operation of image information to a storage operation to memories will be explained below with reference to FIG. 32. In FIG. 32, image information output from, e.g., a host computer is input from the input terminal 2001. The input image information is divided into blocks by the block circuit 2002, and the blocks are stored in the buffer 2003. A histogram is calculated based on the image information stored in the buffer 2003 by the histogram calculation circuit 2005, and pixel data corresponding to the maximum value of the histogram is supplied to an extraction color determination circuit 2024. The image information output from the buffer 2003 is also delayed by a histogram calculation processing time by the one-block delay circuit 2004, and the delayed information is fetched by the extraction color determination circuit 2024.

In the extraction color determination circuit 2024, the image information input from the buffer 2003 is compared with the pixel data corresponding to the maximum value of the histogram input from the histogram calculation circuit 2005 in units of pixels. When a coincidence is found between the two pixels, "1" is supplied to the bit map data encoder 2007, and "0" is supplied to a substitution circuit 2026. On the other hand, when a coincidence is not found between the two pixels, "0" is supplied to the bit map data encoder 2007, and "1" is supplied to the substitution circuit 2026. The binary image data supplied to the bit map data encoder 2007 is stored in the bit map memory 2008 through the same process as in the sixth embodiment. The pixel data supplied to the color data encoder 2010 is also stored in the color data memory 2011 through the same process as in the sixth embodiment.

The image information output from the buffer 2003 is delayed by an extraction color determination time in the extraction color determination circuit 2024 by a two-block delay circuit 2025, and the delayed information is fetched by the substitution circuit 2026. In the substitution circuit 2026, the pixels of the image information from the buffer 2003 are compared with the binary data supplied from the extraction color determination circuit 2024. A pixel corresponding to binary data "0" is substituted with a value (a mean value of non-extracted pixels) calculated in advance by a substitution data calculation circuit (not shown), and a pixel corresponding to binary data "1" is not substituted.

The image data substituted as described above is stored as a compressed image in the image memory 2017 through the same process as in the above-mentioned sixth embodiment. Note that a process for outputting image information from the memories to the decoders, and then outputting the image information to the output device is the same as that in the sixth embodiment, and a detailed description thereof will be omitted here.

In this manner, image data can be compressed at a higher compression ratio.

In this modification, the mean value of the non-extraction portion is used as substitution data. However, this modification is not limited to this. For example, a value for minimizing a mean square error may be used, or a quite different value may be used with reference to a table.

The sixth embodiment and its modification may be applied to either a system consisting of a plurality of apparatuses such as a scanner, an interface, a printer, and the like, or an apparatus consisting of a single apparatus such as a copying machine. The above embodiment and its modification may also be applied to a case wherein the system or apparatus is realized by supplying a program stored in, e.g., a floppy disk, an IC card, or the like thereto.

<Seventh Embodiment>

The seventh embodiment of the present invention will be described in detail below with reference to the accompanying drawings.

Figure 37:
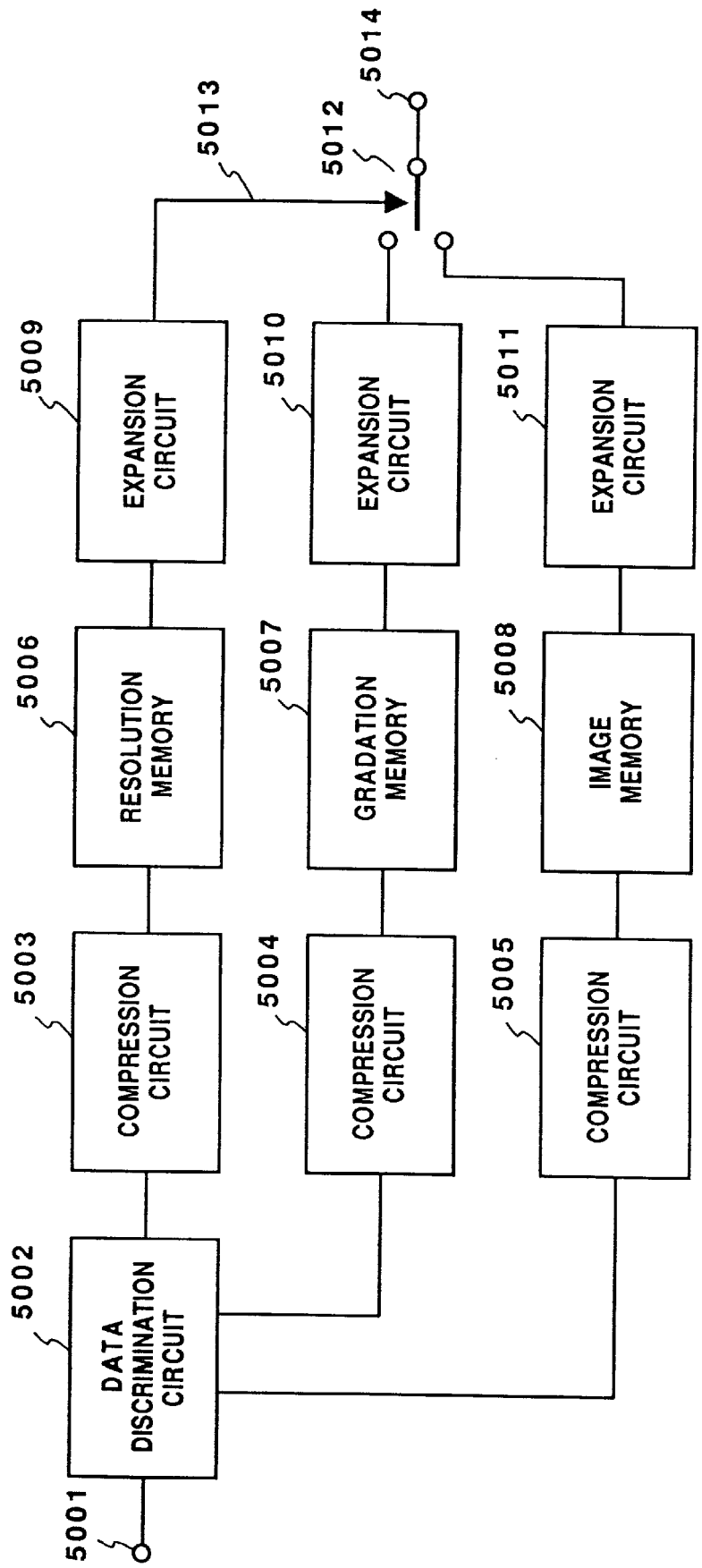
FIG. 37 is a block diagram showing the arrangement of an image encoding apparatus according to the seventh embodiment of the present invention.

FIG. 37 is a block diagram showing the arrangement of an image encoding apparatus according to this embodiment.

In FIG. 37, reference numeral 5001 denotes an input terminal; 5002, a data discrimination circuit; 5003, 5004, and 5005, compression circuits; 5006, a resolution memory; 5007, a gradation memory; 5008, an image memory; 5009, 5010, and 5011, expansion circuits; 5012, a selector; and 5014, an output terminal. The input terminal 5001 receives image data divided into blocks having a predetermined size (e.g., 8×8 pixel blocks) from, e.g., a host computer. The data discrimination circuit 5002 analyzes the data content, and extracts a text image (including color characters) in a block. The extracted text image data are stored as bit map data (resolution information in units of pixels) and gradation data (color data indicating a color of a character) in corresponding memories, and non-extracted pixels in a block are stored in another memory as image data [full-color data (8 bits for each of R, G, and B) in units of pixels].

A method of extracting a text image in the data discrimination circuit 5002 will be described below. A histogram is generated based on the density values (colors) of pixels in one block, and the maximum histogram is selected from density values exceeding a predetermined threshold value of the histogram. More specifically, all the pixels corresponding to the largest number of density values in the block are extracted as a typical density value (typical color) of the text image in the block. Therefore, the pixels having the same density value are extracted, and an image having a constant density such as a text image is extracted. When there is no density exceeding the threshold value, it is determined that no text image is present, and text image data is not extracted.

Of the data discriminated by the above-mentioned data discrimination circuit 5002, bit map data is input to the compression circuit 5003, gradation data is input to the compression circuit 5004, and image data is input to the compression circuit 5005. As for the bit map data, in order to maintain high resolution, reversible encoding is used as a compression method, and the bit map data is supplied to the resolution memory 5006 for storing one bit per pixel as a compressed data. The gradation data represents gradation (color) of the extracted text. When full-color (256-level) pixels are used as an input image, three planes, i.e., red (R), green (G), and blue (B) planes as the primary colors, are required, and 8-bit data for each plane per block, i.e., a total of 24-bit data is required.

Figure 38A:
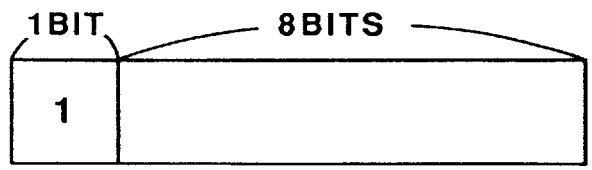
FIGS. 38A and 38B are views showing architectures of data output from a header information adding circuit according to the seventh embodiment.
Figure 38B:
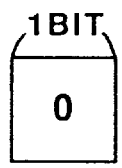

When gradation data is directly stored in a memory, a considerable memory capacity is required. In general, the gradation data is compressed by the compression circuit 5004, and the compressed data is stored. As a compression method, since gradation (color) data of text images in adjacent blocks have a correlation, and gradation (color) data of a text extracted in units of blocks often continuously have the same value, only when gradation data in a previous block is different from gradation data in a currently processing block, the gradation data is output, thereby compressing data. In this case, a total of 9-bit data including 8-bit gradation data and a 1-bit header (FIG. 38A) is input to the compression circuit 5004. When the value of header information is "1", the compression circuit directly outputs input data; when it is "0", the compression circuit outputs only header information (1 bit), as shown in FIG. 38B, thereby compressing data. In this case, the reason why 8-bit data is used in place of 24-bit data (full-color data) is that the color of a character is not so deteriorated by 8-bit data even when 256 colors are used.

The image data is compressed by the compression circuit 5005. In this case, in order to increase the compression ratio, the image data is compressed using non-reversible encoding such as ADCT (Adaptive Discrete Cosine Transform), and the compressed data is stored in the image memory 5008. The data stored in the memories 5006 to 5008 are respectively expanded by the expansion circuits 5009, 5010, and 5011, and are output as output data. The control terminal of the selector 5012 receives bit map data output from the resolution memory 5006, and expanded by the expansion circuit 5009 through a signal line 5013. When the value of the bit map data is "1", the selector 5012 selects data at a terminal a, i.e., the gradation data of the text; when it is "0", the selector selects data at a terminal b, i.e., the image data. The selected data is supplied to the output terminal 5014 through a terminal c.

When an image including both a text image such as a character or line image, and an image such as a natural image is to be stored, image data are compressed by the image encoding apparatus comprising the plurality of compression circuits described above, and the compressed data are stored.

Figure 39:
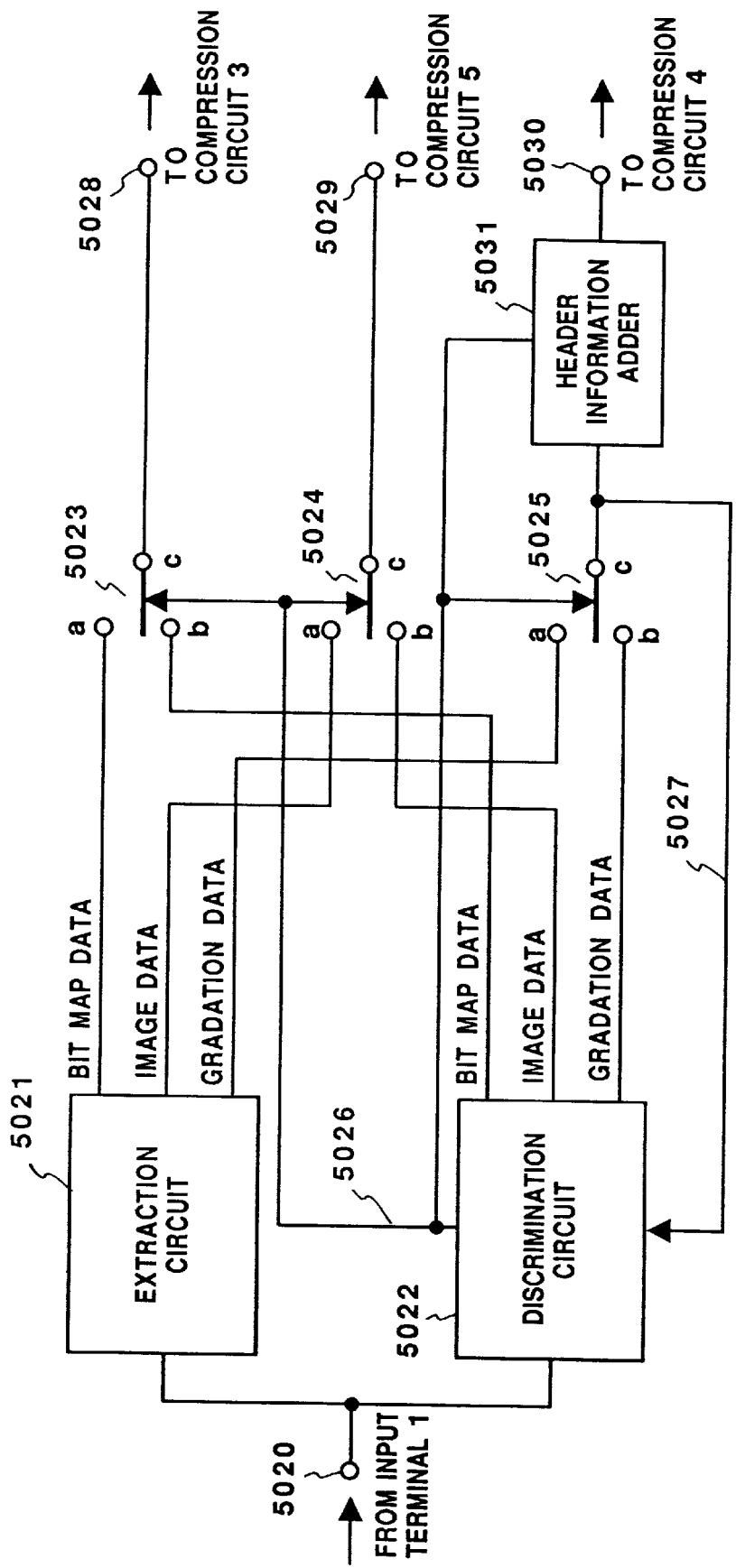
FIG. 39 is a block diagram showing the arrangement of a data discrimination circuit according to the seventh embodiment.

FIG. 39 is a diagram showing the arrangement of the data discrimination circuit of this embodiment. In FIG. 39, reference numeral 5020 denotes an input terminal; 5021, an extraction circuit; 5022, a determination circuit; 5023, 5024, and 5025, selectors; 5031, a header information adder; and 5028, 5029, and 5030, output terminals. The overall circuit shown in FIG. 39 corresponds to the data discrimination circuit 5002 shown in FIG. 37.

Data are input from the input terminal 5020 in units of blocks, and are supplied to the extraction circuit 5021 and the determination circuit 5022. The text image extraction method in the extraction circuit 5021 is attained by using the histogram of density values of pixels described above. Bit map data of a text image, image data, and gradation data extracted by the extraction circuit 5021 are respectively supplied to terminals a of the selectors 5023, 5024, and 5025. On the other hand, the determination circuit 5022 extracts a text image from input data in units of blocks in the same manner as in the extraction circuit 5021, and extracted bit map data, image data, and gradation data are respectively supplied to terminals b of the selectors 5023, 5024, and 5025. Gradation data extracted from a block (previous block) input in the immediately preceding step is fed back through a signal line 5027, and is input to the above-mentioned determination circuit 5022. The discrimination circuit 5022 uses the fed-back gradation data, and preferentially extracts pixels corresponding to gradation data having the same density value as the fed-back gradation data when it extracts a text image from an input block.

Figure 40:
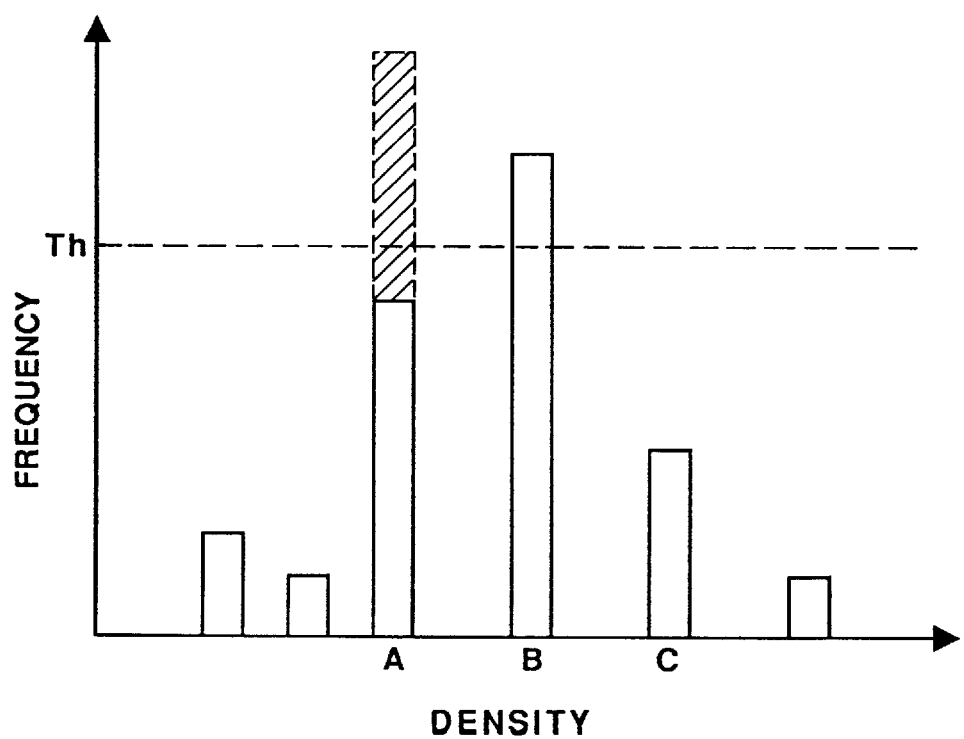
FIG. 40 is a view showing an increase in value of a histogram in a judgment circuit according to the seventh embodiment.

More specifically, in a histogram shown in FIG. 40, the histogram value of the fed-back gradation data in the previous block is increased by a predetermined value, so that pixels corresponding to the gradation data can be easily extracted. In this case, the increment of the histogram can be arbitrarily set. At this time, when there is no pixel corresponding to the gradation data of the previous block, the histogram value is not increased.

Therefore, when gradation data of the previous block corresponds to a density A in FIG. 40, although the mode value of a histogram in only the current block is B, the histogram value of the density A is increased by a value corresponding to a hatched portion, so that gradation data to be extracted in the current block becomes A.

With the above-mentioned method, when gradation data extracted by the determination circuit 5022 is equal to the gradation data in the previous block, 1-bit determination data having a value "0" is output through a signal line 5026 shown in FIG. 39; otherwise, determination data having a value "1" is output. The determination data is input to the selectors 5023, 5024, and 5025, and the header information adder 5031. When the determination data has a value "0", the selectors 5023, 5024, and 5025 connect their control terminals c to the terminal b side; when the determination data has a value "1", they connect their control terminals c to the terminal a side. Therefore, based on the above-mentioned determination data, when the gradation data in the previous block is also selected in the current block, data output from the determination circuit 5022 is selected; otherwise, data output from the extraction circuit 5021 is selected. The gradation data selected by the selector 5025 is input to the header information adder 5031. The adder 5031 adds the determination data (1 bit) to the gradation data (8 bits) using the value of the determination data input at the same time as header information, as shown in FIG. 38A, and outputs a total of 9-bit data.

In this manner, the data output from the selectors 5023 and 5024, and the header information adder 5031 are supplied to the output terminals 5028, 5029, and 5030, and become output data of the data discrimination circuit 5002 shown in FIG. 37.

As described above, according to the present invention, by utilizing the correlation of text images in adjacent blocks, fed-back gradation data extracted in the previous block is preferentially extracted in a process of extracting gradation (color) data in the current block, thus enhancing the compression effect, and saving the capacity of the gradation memory.

<Modification>

A modification of the seventh embodiment will be described in detail below with reference to the accompanying drawings.

Figure 41:
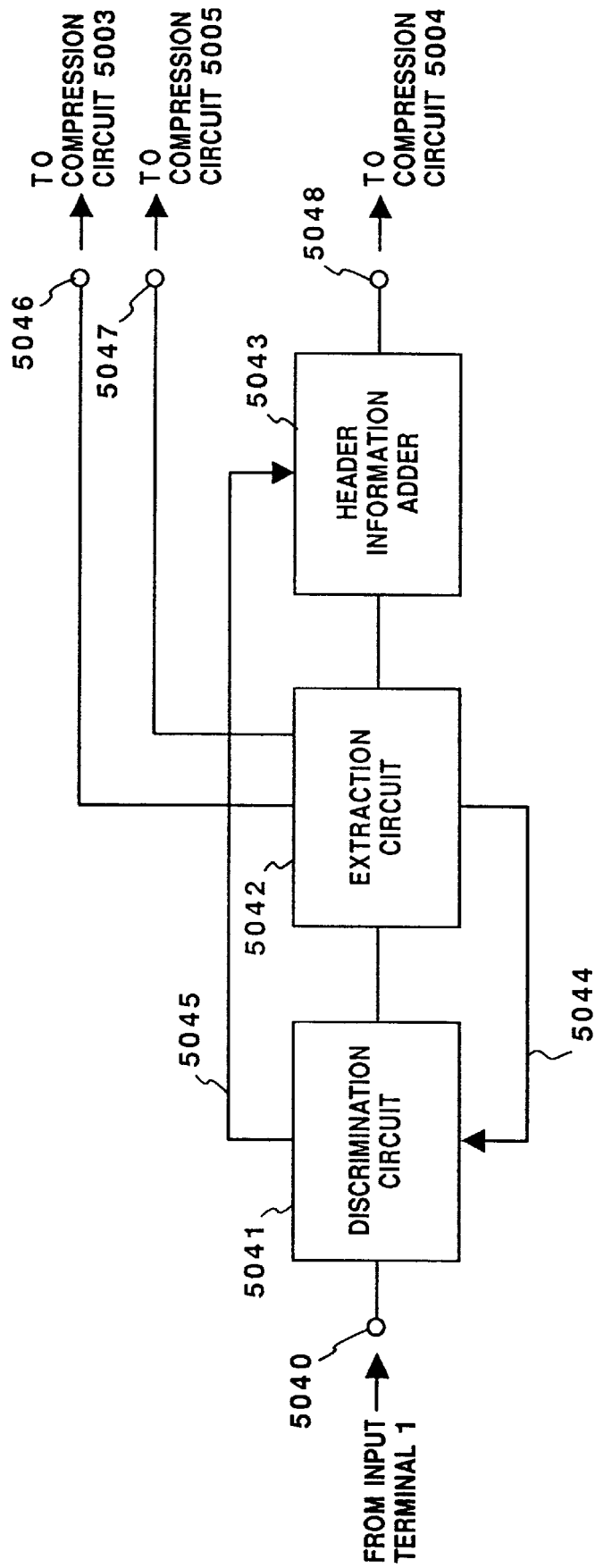
FIG. 41 is a block diagram showing the arrangement of a data discrimination circuit according to a modification of the seventh embodiment.

FIG. 41 is a diagram showing the arrangement of a data discrimination circuit according to this modification. In FIG. 41, reference numeral 5040 denotes an input terminal; 5041, a determination circuit; 5042, an extraction circuit; 5043, a header information adder; and 5046, 5047, and 5048, output terminals. Only the difference from the data discrimination circuit according to the above embodiment will be explained below.

Input data in units of blocks input from the input terminal 5040 is input to the determination circuit 5041. The extraction result of gradation data in the previous block in the extraction circuit 5042 is fed back through a signal line 5044, and is input to the determination circuit 5041. The determination circuit 5041 increases the histogram value to preferentially select the gradation data in the previous block using the same method as in the above embodiment. The circuit 5041 checks if gradation data is selected after the histogram value is increased, and outputs the determination result as 1-bit data onto a signal line 5045. More specifically, the circuit 5041 determines if a portion corresponding to the gradation data in the previous block can be a mode value in the histogram. When the determination data is output, the data input to the determination circuit 5041 is directly output, and is input to the extraction circuit 5042. The data input to the extraction circuit 5042 is subjected to extraction in the same manner as in the above embodiment, and bit map data and image data are respectively supplied to the output terminals 5046 and 5047. The gradation data output from the extraction circuit 5042 is input to the header information adder 5043. The operation of the header information adder is the same as that in the above embodiment, and a detailed description thereof will be omitted.

In this manner, according to this modification, since gradation data in the previous block is preferentially selected, the operation of the determination circuit is limited to an operation for checking if the gradation data in the previous block is selected, and the actual extraction process depends on only the extraction circuit, thus simplifying the circuit arrangement.

Note that data input from the input terminal 5001 may be, e.g., a command in a page description language such as a post-script language. In this case, the data discrimination circuit 5002 analyzes the command to output bit map data, image data, and gradation data.

When input data is image data in units of pixels, and includes a character (including a color character), it can be separated into bit map data and image data by, e.g., a known image separation technique.

The output terminal 5014 can be connected to a hard copy apparatus such as a laser beam printer or an ink-jet printer, or a soft copy apparatus such as a display. The ink-jet printer may include a bubble-jet type printer in which the ink is heated to cause liquid film boiling by thermal energy, thereby emitting liquid droplets by pressure of generated gas, as disclosed in the U.S. Pat. No. 4,723,129.

As the compression algorithm, various other compression methods such as vector quantization may be used in addition to the above-mentioned ADCT using DCT (Discrete Cosine Transform).

The resolution memory 5006 may store raw bit map data in units of pixels in place of compressed data.

<Eighth Embodiment>

Figure 42:
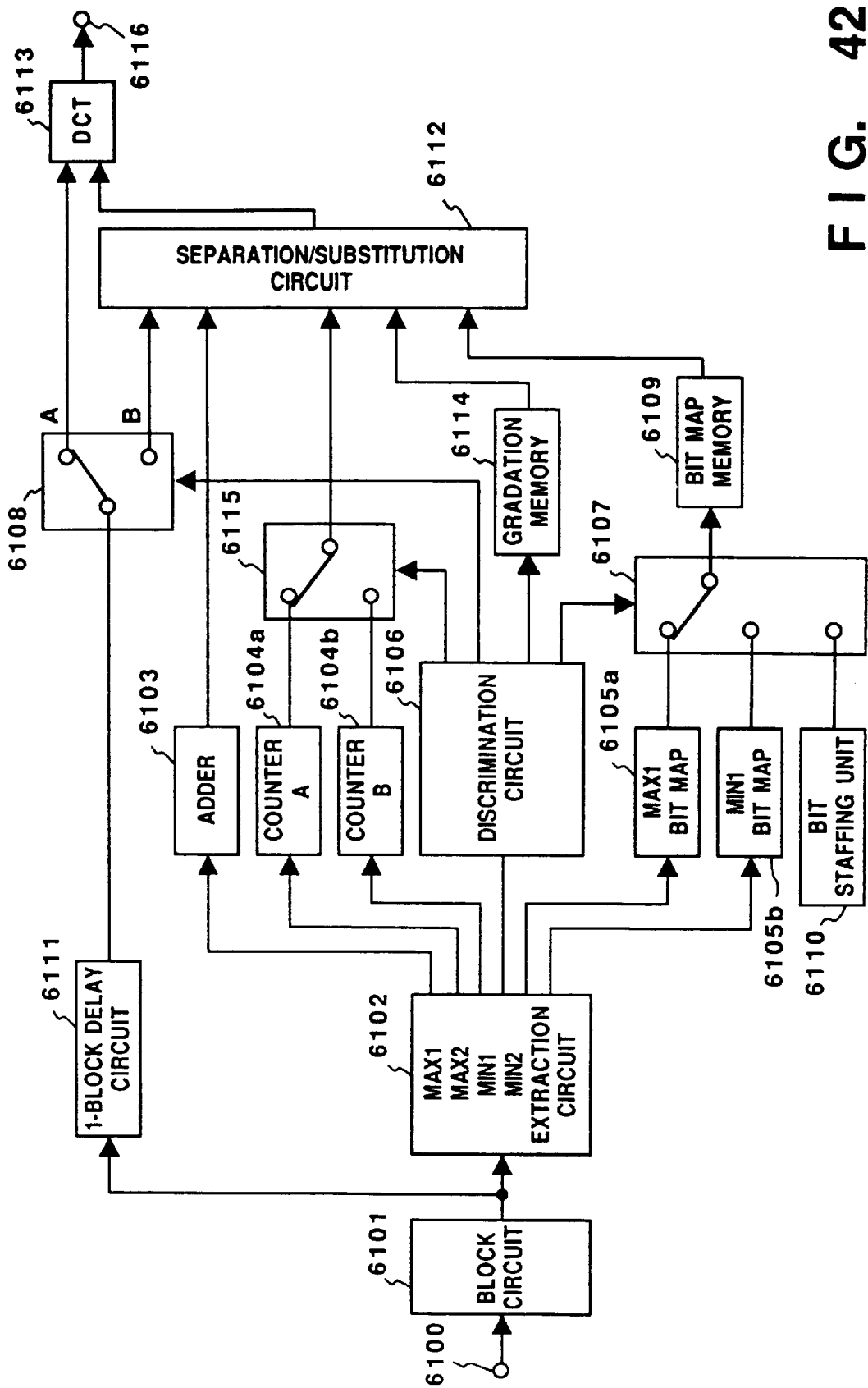
FIG. 42 is a schematic block diagram showing the arrangement of an image compression apparatus according to the eighth embodiment of the present invention.

FIG. 42 is a schematic block diagram showing the arrangement of an image compression apparatus according to the eighth embodiment of the present invention. In FIG. 42, reference numeral 6100 denotes an input terminal for receiving a multi-value image signal. An input signal is image data obtained by mixing a halftone image having gradation, a CG image created by a computer, a character/line image, and the like without distinctions. The input multi-value image signal is stored in a line buffer (not shown) for eight lines, and is extracted into an 8×8 pixel block by a block circuit 6101. This embodiment will be explained using 8×8 DCT. However, other orthogonal transform methods, and block sizes other than 8×8 may be employed, as a matter of course.

Reference numeral 6102 denotes an intra-block extraction circuit for extracting a level having the maximum value (to be referred to as MAX1 hereinafter) among 64 pixels in one block, a level having the second maximum value (to be referred to as MAX2 hereinafter), a level having the minimum value (to be referred to as MIN1 hereinafter), and a level having the second minimum value (to be referred to as MIN2 hereinafter). When 64 pixels in a block have the same level, MAX1=MAX2=MIN2=MIN1. When 64 pixels have only two levels, these levels correspond to MAX1=MIN2 and MAX2=MIN1. When 64 pixels have three levels, these levels correspond to MAX1, MAX2=MIN2, MIN1. When 64 pixels have four or more levels, MAX1>MAX2>MIN2>MIN1 is satisfied. This extraction circuit comprises four registers MAX1, MAX2, MIN2, and MIN1, and a comparator, and simultaneously with the end of scanning for 64 pixels, four levels are obtained. Reference numeral 6103 denotes an adder for obtaining the total sum of all the levels of input 64 pixels. In this case, since the gradation data of input pixels is expressed by 8 bits, and one block consists of 64 pixels, the sum is a value within a maximum of 14 bits.

Reference numerals 6104a and 6104b denote counters A and B for respectively counting pixels corresponding to levels MAX1 and MIN1 extracted by the extraction circuit 6102 in one block. Reference numerals 6105a and 6105b denote bit maps for 64 bits for indicating the positions of pixels corresponding to levels MAX1 and MIN1 extracted by the extraction circuit 6102 in one block. More specifically, the MAX1 bit map 6105a forms a bit map such that pixels corresponding to level MAX1 in the block are "1", and other pixels are "0". The MIN1 bit map 6105b forms a bit map such that pixels corresponding to level MIN1 in the block are "1", and other pixels are "0". The extraction circuit 6102 repetitively registers and updates data in the corresponding registers upon scanning of 64 pixels. When the level MAX1 is updated, the counter A 6104a and the bit map 6105a are reset in synchronism with each other, and when the level MIN1 is updated, the counter B 6104b and the bit map 6105b are reset in synchronism with each other.

Reference numeral 6106 denotes a discrimination circuit for outputting one of three discrimination results indicating that pixels corresponding to the level MAX1 extracted by the extraction circuit 6102 are separated, that pixels corresponding to the level MIN1 are separated, or pixels are not separated. The discrimination circuit 6106 will be described in detail later. The discrimination result is supplied to switches 6115, 6107, and 6108. When the discrimination result indicates that pixels corresponding to the level MAX1 are separated, the switch 6115 selects the output from the counter A 6104a which counts the number of pixels corresponding to the level MAX1. In addition, the switch 6107 selects the output from the MAX1 bit map 6105a, and the selected bit map is stored in a bit map memory 6109. Similarly, when the discrimination result indicates that pixels corresponding to the level MIN1 are separated, the switch 6115 selects the output from the counter B 6104b which counts the number of pixels corresponding to the level MIN1. In addition, the switch 6107 selects the output from the MIN1 bit map 6105b, and the selected bit map is stored in the bit map memory 6109. When the discrimination result indicates that pixels are not separated, the switch 6107 selects an output from a bit staffing unit 6110, and all "0"s for 64 pixels are stored in the bit map memory 6109. The above-mentioned bit map memory 6109 stores separated, pixels in each block as "1", and has a capacity corresponding to the number of bits (pixels) of an input image.

When the discrimination results indicates that pixels corresponding to one of MAX1 and MIN1 are to be separated, a lower terminal (FIG. 42; a terminal B) of the switch 6108 is selected, and information (information of the same block as that used in extraction and discrimination) for one block, which is delayed by 64 pixels in a 1-block delay circuit 6111, is input to a separation/substitution circuit 6112. More specifically, since the scanning operation for one block is performed in the extraction circuit 6102, information in the same block is delayed by one block, and the delayed information is input (a time in the above-mentioned discrimination is ignored). If the discrimination result indicates that pixels are not separated, a terminal A in the switch 6108 is selected, and information in one block is transmitted to a DCT circuit 6113 without being processed. When the discrimination circuit 6106 selects one of MAX1 and MIN1, the selected level value is stored in a gradation memory 6114. The gradation memory 6114 is assigned with 8 bits per block, and has a capacity corresponding to the number of bytes (pixels/64) of an input image.

The separation/substitution circuit 6112 separates pixels corresponding to addresses from which "1" is read out from the bit map memory 6109, and substitutes the separated pixels with a predetermined value. In this embodiment, a method employing a substitution value as a mean value of levels of non-separated pixels in 64 pixels will be described. More specifically, when data input from the adder 6103 to the separation/substitution circuit 6112 is represented by T, an input from the counter A 6104a or B 6104b is represented by C, and an input from the gradation memory 6114 is represented by G, a substitution value TR is calculated by the following equation:

$$TR=(T-C\times G)/(64-C) \quad (4)$$

More specifically, all the separated pixel portions are substituted with the substitution value TR, and are input to the DCT circuit 6113. The DCT circuit 6113 performs DCT (discrete cosine transform) of the input data, and outputs the transformed data to an output terminal 6116. After DCT coefficients are quantized, the data are stored in a memory (not shown).

When data encoded by the above-mentioned arrangement is to be decoded, the value of a block stored in the gradation memory is substituted in pixels subjected to IDCT (inverse discrete cosine transform) and corresponding to "1" on the bit map memory, thereby restoring the separated portion without impairing resolution and gradation.

Figure 43:
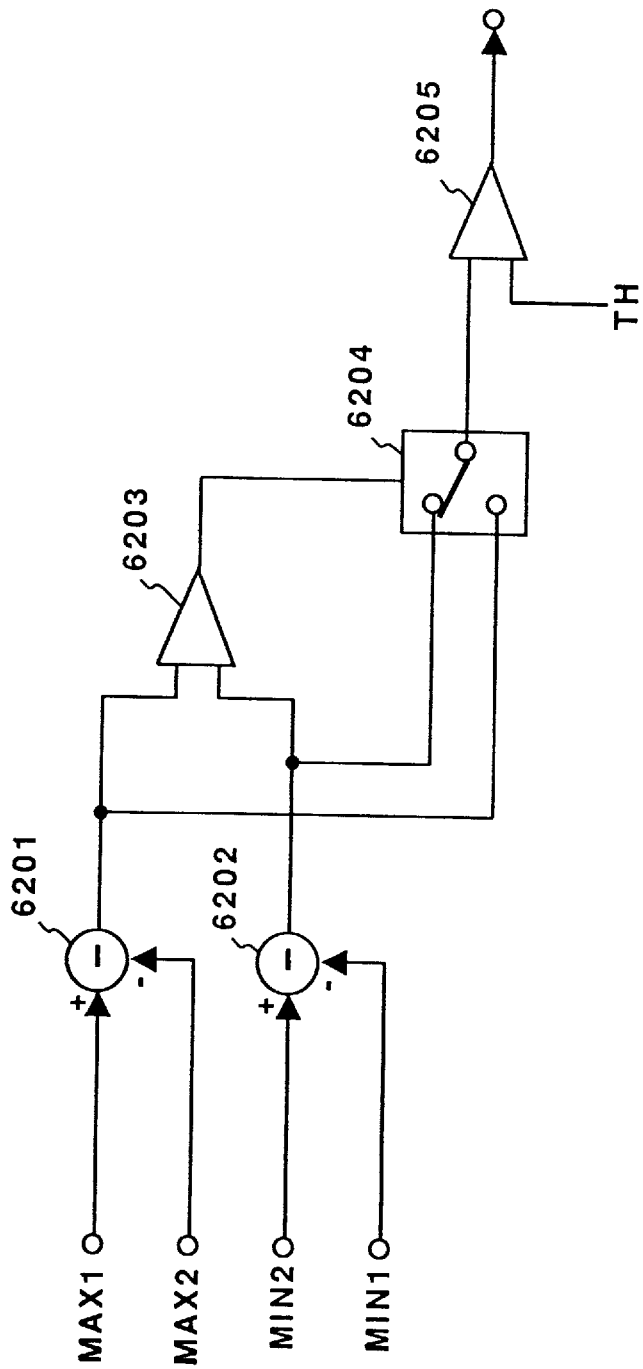
FIG. 43 is a diagram showing the detailed arrangement of a discrimination circuit in the eighth embodiment.

FIG. 43 is a block diagram showing the detailed arrangement of the above-mentioned discrimination circuit 6106.

As shown in FIG. 43, signals MAX1, MAX2, MIN2, and MIN1 are input to subtracters 6201 and 6202, and (MAX1−MAX2) and (MIN2−MIN1) are calculated. The differences (MAX1−MAX2) and (MIN2−MIN1) are compared with each other by a comparator 6203, and a larger difference is selected by a switch 6204. The selected signal is compared with a given threshold value (TH) by a comparator 6205 to discriminate if separation is performed. More specifically, when the contrast difference (MAX1−MAX2) or (MIN2−MIN1) has a given magnitude, the larger contrast difference is selected as an object to be separated.

The above-mentioned discrimination will be explained below using actual image information. FIG. 44A shows one block extracted from an image obtained by synthesizing a line image, artificially generated by a computer, on 8-bit data of a given natural image. In this block, the outputs from the extraction circuit 6102 are MAX1=171, MAX2=170, MIN2=104, and MIN1=20. The discrimination circuit shown in FIG. 43 calculates these values to yield MAX1−MAX2=1 and MIN2−MIN1=84. Thus, MIN2−MIN1 is compared with the given threshold value TH. For example, when TH=40 is fixed, MIN2−MIN1>TH is satisfied. Thus, pixels corresponding to MIN1 are assumed as artificially generated pixels, and are separated.

FIG. 44C shows a block obtained by substituting a mean value "146" of 55 non-separated pixels (64−9=55) at positions where separated MIN1 pixels, i.e., "20" pixels are present. FIGS. 44B and 44D show generated DCT components obtained by DCT-transforming the blocks shown in FIGS. 44A and 44C (11-bit precision; DC components are offset from input pixels).

As can be seen from comparison between FIGS. 44B and 44D, when separation is successful, large coefficients in a DCT high-frequency region are removed, and quantization with high encoding efficiency can be performed since generated coefficients are concentrated in a low-frequency region.

FIGS. 45A and 45B also show blocks each obtained by synthesizing a line image having a value "20", generated by a computer, on a natural image like in FIG. 44A. In the case of FIG. 45A, MAX1=74, MAX2=64, MIN2=12, and MIN1=10, and the discrimination circuit shown in FIG. 43 discriminates that pixels are not separated. In the case of FIG. 45B, MAX1=88, MAX2=70, MIN2=32, and MIN1=20, and TH>(MAX1−MAX2)>(MIN2−MIN1) is satisfied. Thus, it is discriminated like in FIG. 45A that pixels are not separated (TH=40). However, automatic separation of a signal artificially generated by a computer aims at preventing generation of ringing noise such as mosquito noise due to rough quantization of high-frequency components, and also at preventing deterioration of visual image quality without increasing the encoding amount. More specifically, even when a value "20" cannot be separated in the blocks shown in FIGS. 45A and 45B, no serious influence appears for the following reasons.

First, line image information "20" is not conspicuous in an input image itself. More specifically, in the case of FIG. 45A, both pixels having levels exceeding and below "20" are present within one block, and a natural image portion exists across level "20". In the case of FIG. 45B, pixels have a small contrast difference although they do not exist across level "20", and a natural image consists of levels near "20". Since a line image of level "20" is not conspicuous, even if AC components are quantized by quantization after DCT, no visually outstanding influence appears although the amplitude slightly changes.

Second, since a contrast difference does not change much after a line image of level "20" is synthesized (since the line image does not form an edge having a large contrast difference), high-frequency AC components are generated not to have large coefficients by DCT without separation. Image quality deterioration is mainly caused by a quantization error of high-frequency AC components. In this case, however, since AC components are small, the influence of the quantization error can be small. More specifically, visual deterioration of an output image is small even when DCT, quantization, inverse quantization, and IDCT are performed without separation.

Figure 46:
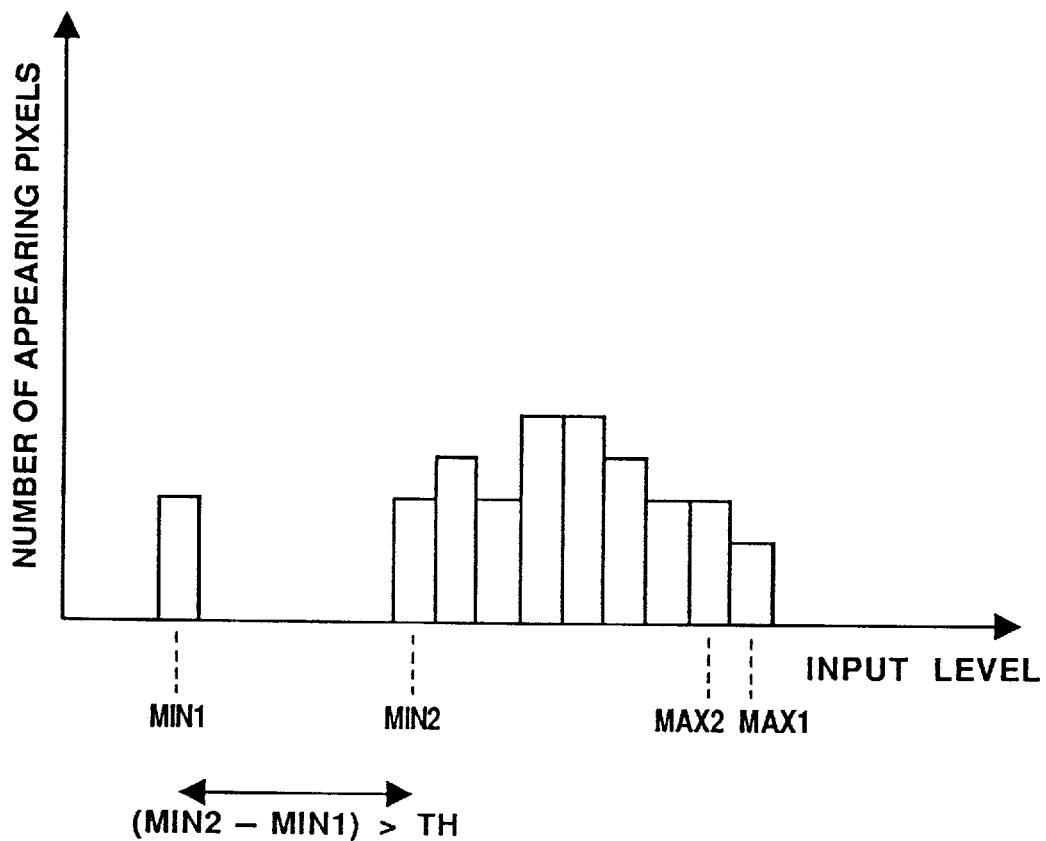
FIG. 46 is a view for explaining discrimination of this embodiment using a histogram.

FIG. 46 shows the histogram of the above-mentioned discrimination for the sake of easy understanding. A case wherein a histogram for one block is separated into two groups, as shown in FIG. 46, i.e., a case wherein a group of levels of a natural image is separated from an artificial line image having the same level, is discriminated by extracting MAX1, MAX2, MIN2, and MIN1. In general DTP (desk top publishing), a character/line image to be synthesized in a natural image often has a level different from the levels of the natural image and a background image, i.e., a value exceeding a given level difference.

As described above, according to this embodiment, an artificially generated character/line image can be automatically extracted and separated by a very simple method without forming a histogram of levels in a block.

<First Modification of Discrimination Circuit>

Figure 47:
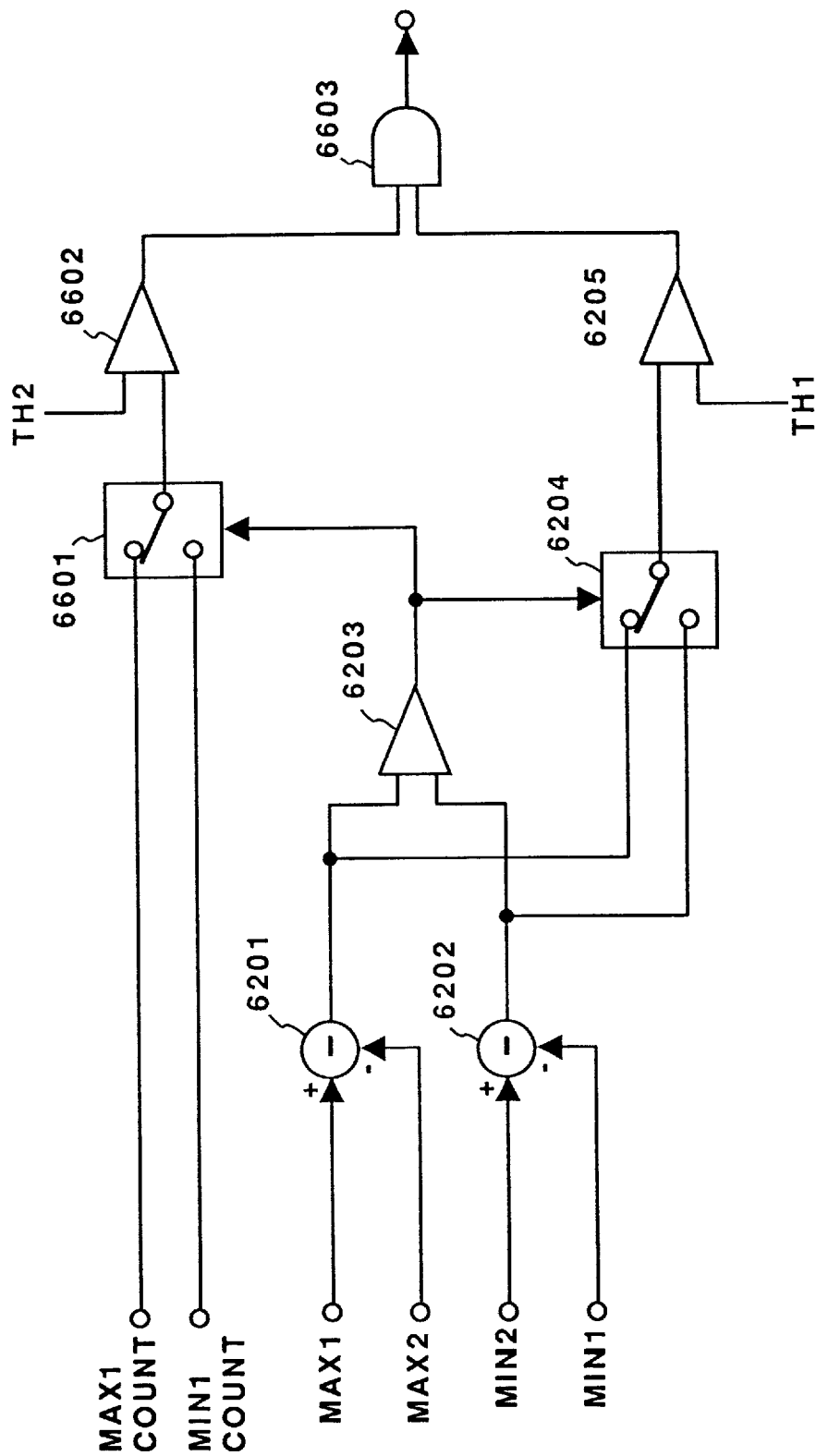
FIG. 47 is a diagram showing the detailed arrangement of a discrimination circuit according to the first modification of the eighth embodiment.

FIG. 47 is a block diagram showing the arrangement of the discrimination circuit 6106 of this modification. In this modification, outputs from the counters A 6104a and B 6104b shown in FIG. 42 are input to the discrimination circuit 6106. In FIG. 47, MAX1count is the input from the counter A 6104a, and MIN1count is the input from the counter B 6104b. Note that the inputs MAX1, MAX2, MIN2, and MIN1 are the same as those in FIG. 43. The same reference numerals in FIG. 47 denote the same parts as in FIG. 43.

In the circuit shown in FIG. 47, (MAX1−MAX2) and (MIN2−MIN1) are calculated, and are compared with each other by the comparator 6203 in the same manner as in the circuit shown in FIG. 43. However, unlike in FIG. 43, the comparison result is supplied to a switch 6601. More specifically, when the comparator 6203 selects (MAX1−MAX2), the switch 6601 selects MAX1count; when the comparator selects (MIN2−MIN1), the switch selects MIN1count. The switch 6204 and the comparator 6205 are the same as those in the circuit shown in FIG. 43, and a detailed description thereof will be omitted. In this modification, the number of pixels in a block corresponding to MAX1 or MIN1 selected by the switch 6601 is compared with a given threshold value (TH2) by a comparator 6602.

More specifically, this discrimination circuit additionally takes into consideration of a condition that the pixels to be extracted corresponding to MAX1 or MIN1 must be equal to or larger in number than the predetermined number of pixels (TH2) in one block. This conditions allows judgment of whether only one pixel having an outstanding value in a block is an artificially generated character/line image or a noise component of an input image even when the condition shown in, e.g., FIG. 43 is satisfied. This also depends on the characteristics of a system which mounts the image compression apparatus of the present invention. In this case, whether or not pixels are separated is decided by an AND gate 6602 based on two conditions from the comparators 6205 and 6602.

<Second Modification of Discrimination Circuit>

Figure 48:
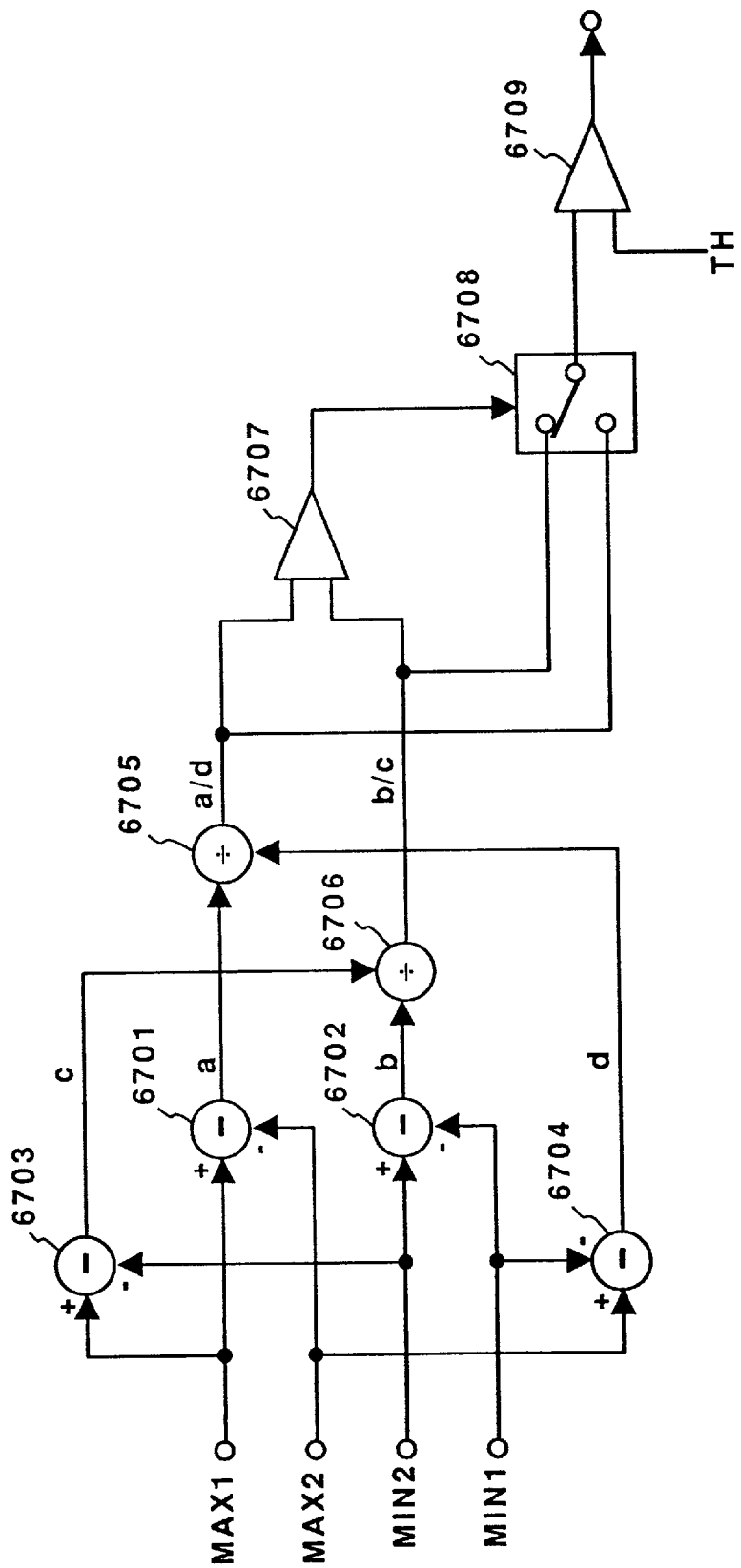
FIG. 48 is a diagram showing the detailed arrangement of a discrimination circuit according to the second modification of the eighth embodiment.

FIG. 48 is a block diagram showing the second modification of the discrimination circuit 6106. As shown in FIG.

48, extracted MAX1, MAX2, MIN2, and MIN1 are input to subtracters 6701 to 6704, and MAX1−MAX2 (=a), MIN2−MIN1 (=b), MAX1−MIN2 (=c), and MAX2−MIN1 (=d) are respectively calculated by these subtracters. The calculated a, b, c, and d are input to dividers 6705 and 6706 to obtain a/d and b/c. A comparator 6707 compares a/d and b/c like in the circuit shown in FIG. 43, and a switch 6708 selects a larger value. The selected value is compared with a given threshold value TH by a comparator 6709 to discriminate whether or not pixels are separated. More specifically, in the circuit shown in FIG. 43, discrimination is made based on the contrast difference, while in the discrimination circuit of this modification, discrimination is made based on the contrast ratio.

Discrimination in this modification will be explained below using actual image information shown in FIG. 49. FIG. 49 shows a block obtained by synthesizing a line image of level "20" on a natural image. In the block shown in FIG. 49, MAX1=39, MAX2=38, MIN2=31, and MIN1=20 are obtained, and the discrimination circuit shown in FIG. 43 determines that pixels are not separated. However, in this discrimination circuit, a=1, b=11, c=8, and d=18 are obtained, and b/c>a/d is satisfied. If b/c=1.375, and for example, the threshold value TH=1.3, pixels corresponding to MIN1are separated.

In this modification, dividers are used for the sake of simplicity. In practice, a comparison of b/c>a/d may be replaced with a comparison of b×d>a×c using multipliers. Alternatively, when dividers are used, numerators may be bit-shifted to remove fractions.

The discrimination of this modification will be described in more detail with reference to the histogram shown in FIG. 50. When the histogram of one block is separated into two groups, as shown in FIG. 50, this modification is effective when the contrast of levels of a natural image in a block is small. More specifically, even if b (=MIN2−MIN1) in FIG. 50 remains the same, the importance (conspicuousness) of MIN1 varies depending on whether the contrast (corresponding to c (=MAX1−MIN2)) of a background natural image is large or small. More specifically, the ratio of the contrast (c) in a natural image to the contrast (b) between a level assumed as a character/line image portion and a level of a natural image closest to that of the line image, can be used in discrimination of separation.

<Ninth Embodiment>

The ninth embodiment of the present invention will be described in detail below with reference to the accompanying drawings.

Figure 51:
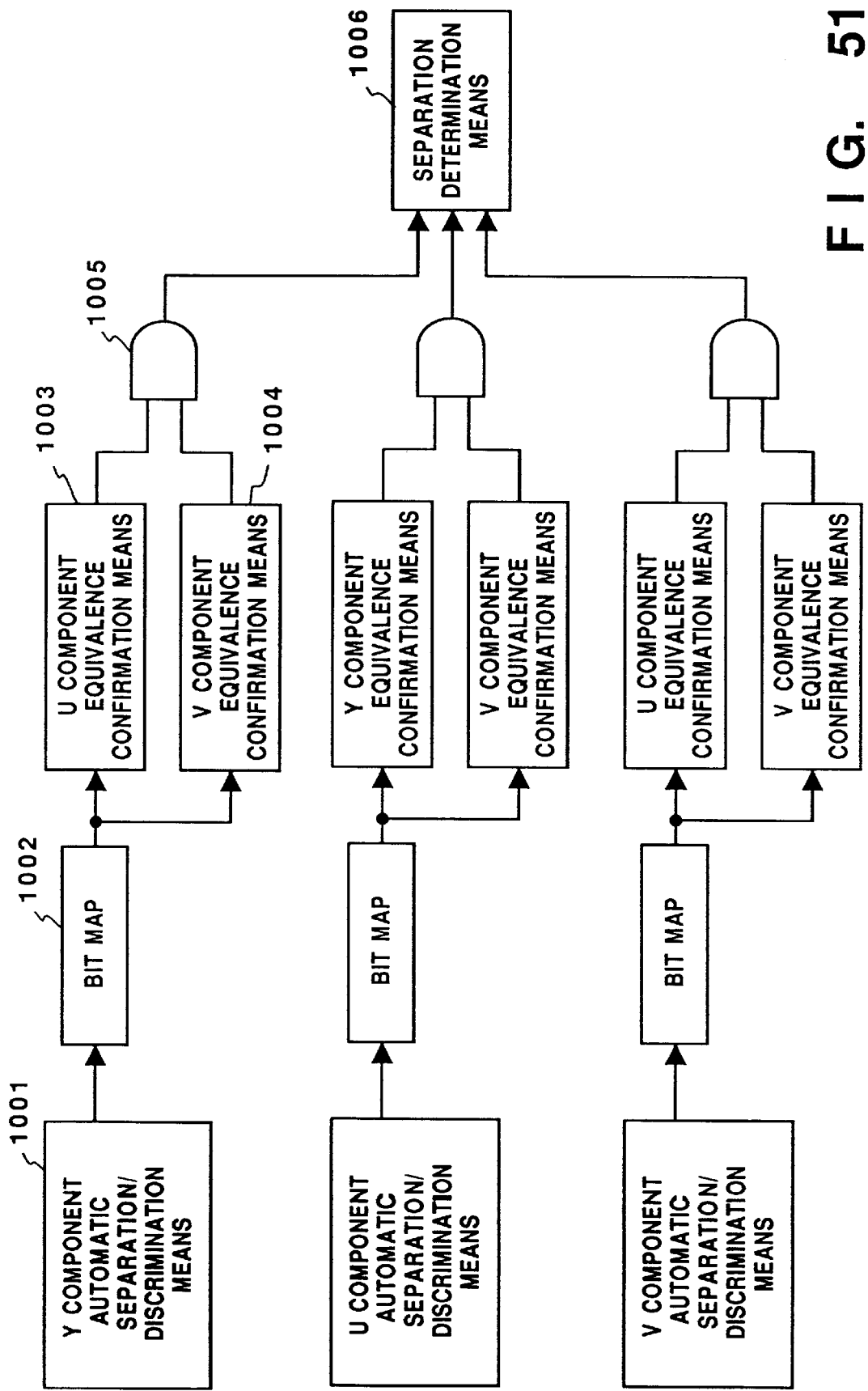
FIG. 51 is a schematic block diagram showing the arrangement of an image compression apparatus according to the ninth embodiment of the present invention.

In FIG. 51, the present invention is applied to a color image compression apparatus as the ninth embodiment. Assume that color image information is input in three planes, i.e., R (red), G (green), and B (blue) planes. Since input R, G, and B data have strong correlations among colors, they are converted into a Y (luminance), U, V (color differences) color space to eliminate the correlations.

In FIG. 51, reference numeral 1001 denotes a Y component automatic separation discrimination means, which discriminates using four values MAX1, MAX2, MIN2, and MIN1 whether or not pixels are automatically separated. In this embodiment, when a discrimination condition is satisfied, and a bit map 1002 in which pixels assumed as Y-component character portions are set to be "1" is formed, it is confirmed whether or not pixels can be separated in other color planes in the same block using the formed bit map. In this confirmation, whether or not pixels corresponding "1" in the bit map have the same values (to be referred to as equivalence hereinafter) in both the U and V component planes is discriminated (by U and V component equivalence confirmation means 1003 and 1004). Reference numeral 1005 denotes an AND gate, which discriminates if pixels corresponding to "1" in the bit map 1002 have the equivalence in both the U and V component planes, and supplies a discrimination result to a separation determination means 1006.

This discrimination will be described below using actual image information. FIGS. 52A to 52C show pieces of information of a given image in one block on the same spatial coordinate system, and correspond to Y, U, and V planes. When separation discrimination is performed by the discrimination circuit 6106 shown in FIG. 43, pixels corresponding to level MIN1 "20" are separated, and a bit map to be formed is as shown in FIG. 52D. Equivalence confirmation of the U and V planes is performed using FIG. 52D. In FIG. 52B, all the pixels corresponding to "1" in FIG. 52D have a value "130", and satisfy an equivalence condition. Whether or not the value "130" appears in other pixels is not a problem, but when a pixel having a value other than "130" is present although it corresponds to "1" on the bit map, the equivalence condition is not satisfied. In FIG. 52C, all the pixels corresponding to "1" in FIG. 52D have a value "108", and satisfy an equivalence condition. More specifically, pixels having a value of a given color, which are artificially generated by, e.g., a computer, can assume pixels having the same values in Y, U, and V planes. If the equivalence conditions of the remaining two planes are confirmed based on a bit map as a result of successful separation from a given plane, and the equivalence conditions are not satisfied, it can be determined that separated pixels do not correspond to pixels having a value of one color.

In FIG. 51, automatic separation discrimination operations using U and V components are also performed in addition to the automatic separation discrimination using the Y components. When separation discrimination conditions are satisfied, equivalence confirmation means are executed using color components other than a plane used in separation discrimination. The separation determination means receives signals indicating whether or not the corresponding color components are to be separated, and determines if separation is performed. This determination is made in the priority order of, e.g., separation in the Y component plane→separation in the U component plane→separation in the V component plane.

In this manner, color image information is separated into color components, and whether or not blocks in the same space are separated is discriminated in units of color components. Therefore, even when pixels are separated based on the contrast difference, they can be focused to positions near a given point in a color space. In other words, when it is determined according to this method that pixels cannot be separated, the color of a background natural image is very close to the color of a synthesized character/line image, i.e., image quality is not so deteriorated even when compression/expansion is performed without separation.

Various conditions have been described. However, these conditions may be solely used or may be used in combination, as a matter of course.

This embodiment may be applied to either a system consisting of a plurality of apparatuses, or an apparatus consisting of a single apparatus. This embodiment may also be applied to a case wherein the system or apparatus is realized by supplying a program.

As described above, according to this embodiment, a character/line image portion generated by a computer, and synthesized on a natural image in one block can be automatically and precisely identified and separated with a very simple arrangement. Since both the resolution and gradation of the separated character/line image portion can be preserved, encoding with high efficiency can be realized in the case of a synthesized image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting image data representing an image;
   determining means for determining whether or not a high frequency component, to be eliminated, of the image data exists on the basis of a frequency distribution of densities corresponding to a plurality of pixels in a block;
   eliminating means for eliminating the high frequency component of the image from the image data in accordance with the determination result by said determining means;
   converting means for performing, in units of blocks, spatial frequency conversion on the image data output from said eliminating means;
   first encoding means for encoding the image data converted by said converting means; and
   second encoding means for encoding the high frequency component eliminated by said eliminating means.

2. The apparatus according to claim 1, wherein said input means inputs multi-value image data.

3. The apparatus according to claim 1, wherein said converting means performs the spatial frequency conversion by using an orthogonal transformation.

4. The apparatus according to claim 1, wherein said eliminating means forms a histogram of the image data in the block, so as to extract the density distribution of the block.

5. The apparatus according to claim 1, wherein said eliminating means substitutes image data which generates the high frequency component with a predetermined value.

6. An image processing comprising:
   an inputting step of inputting image data representing an image;
   a determining step of determining whether or not a high frequency component, to be eliminated, of the image data exists on the basis of a frequency distribution of densities corresponding to a plurality of pixels in a block;
   an eliminating step of eliminating the high frequency component of the image from the image data in accordance with the determination result at said determining step;
   a converting step of performing, in units of blocks, spatial frequency conversion on the image data output at said eliminating step;
   a first encoding step of en coding the image data converted at said converting step; and
   a second encoding step of encoding the high frequency component eliminated at said eliminating step.

* * * * *

UNITED STATES PATENT AND TRADEMARK OFFICE
CERTIFICATE OF CORRECTION

PATENT NO. : 5,818,970

DATED : October 6, 1998

INVENTOR(S): HISASHI ISHIKAWA ET AL.          Page 1 of 2

It is certified that error appears in the above-identified patent and that said Letters Patent is hereby corrected as shown below:

ON COVER PAGE AT [56] REFERENCES CITED, U.S. PATENT DOCUMENTS

"Mizuro" should read --Mizuno--.

COLUMN 3

Line 17, "is" should read --is a--;
Line 20, "is" should read --is a--.

COLUMN 7

Line 30, "and" should be deleted.

COLUMN 16

Line 33, ""1255"." should read --"255".--.

COLUMN 17

Line 14, "(16-m)|" should read --(16-M)|--.

COLUMN 21

Line 5, "R, B," should read --R, G,--.

COLUMN 31

Line 66, "ing "1"" should read --ing to "1"--.

UNITED STATES PATENT AND TRADEMARK OFFICE
CERTIFICATE OF CORRECTION

PATENT NO. :   5,818,970

DATED       :   October 6, 1998

INVENTOR(S):   HISASHI ISHIKAWA ET AL.

It is certified that error appears in the above-identified patent and that said Letters Patent is hereby corrected as shown below:

COLUMN 34

Line 28, "en coding" should read --encoding--.

Signed and Sealed this

Eighth Day of June, 1999

Attest:

Q. TODD DICKINSON

Attesting Officer    Acting Commissioner of Patents and Trademarks